US011803276B2

(12) United States Patent
Patel et al.

(10) Patent No.: US 11,803,276 B2
(45) Date of Patent: Oct. 31, 2023

(54) FORCE SENSING ARCHITECTURES

(71) Applicant: Apple Inc., Cupertino, CA (US)

(72) Inventors: Dhaval C. Patel, San Jose, CA (US);
Eugene C. Cheung, Redwood City, CA (US); Pey-Jiun Ko, Redwood City, CA (US); Po-Jui Chen, Taipei (TW); Robert W. Rumford, Santa Clara, CA (US); Steve L. Terry, Cupertino, CA (US); Wei Lin, Santa Clara, CA (US); Xiaofan Niu, Campbell, CA (US); Xiaoqi Zhou, Cupertino, CA (US); Yi Gu, Palto Alto, CA (US); Yindar Chuo, San Jose, CA (US); Rasmi R. Das, Sunnyvale, CA (US); Steven M. Scardato, Sunnyvale, CA (US); Se Hyun Ahn, Cupertino, CA (US); Victor H. Yin, Cupertino, CA (US); Wookyung Bae, San Jose, CA (US); Christopher L. Boitnott, Cupertino, CA (US); Chun-Hao Tung, San Jose, CA (US); Mookyung Son, Cupertino, CA (US); Sunggu Kang, San Jose, CA (US); Nathan K. Gupta, San Francisco, CA (US); John Z. Zhong, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/116,907

(22) Filed: Dec. 9, 2020

(65) Prior Publication Data
US 2021/0089168 A1 Mar. 25, 2021

Related U.S. Application Data

(63) Continuation of application No. 15/435,649, filed on Feb. 17, 2017, now abandoned.
(Continued)

(51) Int. Cl.
G06F 3/044 (2006.01)
G02F 1/1339 (2006.01)
(Continued)

(52) U.S. Cl.
CPC ............ G06F 3/0443 (2019.05); G01L 1/146 (2013.01); G02F 1/13394 (2013.01);
(Continued)

(58) Field of Classification Search
CPC . G06F 2203/04105; G06F 2203/04106; G06F 3/041; G06F 3/0447; G06F 3/0446;
(Continued)

(56) References Cited

U.S. PATENT DOCUMENTS 4,675,569 A 6/1987 Bowman et al.
4,712,037 A 12/1987 Verbeek
(Continued)

FOREIGN PATENT DOCUMENTS

CN 101046720 10/2007
CN 101071354 11/2007
(Continued)

OTHER PUBLICATIONS

Bau, et al., "TeslaTouch: Electrovibration for Touch Surfaces," UIST'10, Oct. 3-6, 2010, New York, New York USA, 10 pages.
(Continued)

*Primary Examiner* — Dismery Mercedes
(74) *Attorney, Agent, or Firm* — Brownstein Hyatt Farber Schreck, LLP

(57) ABSTRACT

An electronic device with a force sensing device is disclosed. The electronic device comprises a user input surface defining an exterior surface of the electronic device, a first capacitive sensing element, and a second capacitive sensing element capacitively coupled to the first capacitive sensing element. The electronic device also comprises a first spacing
(Continued)

layer between the first and second capacitive sensing elements, and a second spacing layer between the first and second capacitive sensing elements. The first and second spacing layers have different compositions. The electronic device also comprises sensing circuitry coupled to the first and second capacitive sensing elements configured to determine an amount of applied force on the user input surface. The first spacing layer is configured to collapse if the applied force is below a force threshold, and the second spacing layer is configured to collapse if the applied force is above the force threshold.

6 Claims, 32 Drawing Sheets

Related U.S. Application Data

(60) Provisional application No. 62/395,888, filed on Sep. 16, 2016, provisional application No. 62/382,140, filed on Aug. 31, 2016, provisional application No. 62/297,676, filed on Feb. 19, 2016.

(51) Int. Cl.
  *G06F 3/041* (2006.01)
  *G01L 1/14* (2006.01)
  *G01L 9/00* (2006.01)

(52) U.S. Cl.
  CPC .......... *G02F 1/13398* (2021.01); *G06F 3/041* (2013.01); *G06F 3/0412* (2013.01); *G06F 3/0446* (2019.05); *G06F 3/0447* (2019.05); *G01L 9/0052* (2013.01); *G06F 3/04146* (2019.05); *G06F 2203/04102* (2013.01); *G06F 2203/04105* (2013.01)

(58) Field of Classification Search
  CPC ........... G06F 2203/04104; G06F 3/044; G06F 3/04144; G06F 3/0414; G06F 3/0488; G06F 3/0412; G06F 3/0445; G06F 2203/04112; G06F 3/014144; G06F 2203/04102; G01L 1/146; G01L 1/18; G01L 9/0072; G01L 19/0092; G01L 19/146; G01L 5/0028; G01L 5/0052; G02F 1/13394; G02F 1/13396; G02F 1/13398; G02F 1/133394

See application file for complete search history.

(56) References Cited

U.S. PATENT DOCUMENTS

| | | | |
|---|---|---|---|
| 4,989,457 | A | 2/1991 | Berger et al. |
| 5,447,074 | A | 9/1995 | Polaert et al. |
| 5,543,589 | A | 8/1996 | Buchana et al. |
| 5,553,500 | A | 9/1996 | Grahn et al. |
| 5,680,160 | A | 10/1997 | LaPointe |
| 5,917,165 | A | 6/1999 | Platt et al. |
| 5,942,733 | A | 8/1999 | Allen et al. |
| 6,501,529 | B1 * | 12/2002 | Kurihara ................ G06F 3/045 345/173 |
| 7,114,402 | B2 | 10/2006 | Winkler et al. |
| 7,154,481 | B2 | 12/2006 | Cross et al. |
| 7,211,885 | B2 | 5/2007 | Nordal et al. |
| 7,511,702 | B2 | 3/2009 | Hotelling |
| 7,538,760 | B2 | 5/2009 | Hotelling et al. |
| 7,598,652 | B2 | 10/2009 | Kornbluh et al. |
| 7,791,596 | B2 | 9/2010 | Errico et al. |
| 7,926,351 | B2 | 4/2011 | Masaki et al. |
| 8,031,275 | B2 | 10/2011 | Lee |
| 8,094,134 | B2 | 1/2012 | Suzuki et al. |
| 8,169,332 | B2 | 5/2012 | Son |
| 8,199,122 | B2 | 6/2012 | Yamamoto et al. |
| 8,228,306 | B2 | 7/2012 | Long et al. |
| 8,305,241 | B2 | 11/2012 | Wang et al. |
| 8,319,743 | B2 * | 11/2012 | No ........................ G06F 3/0447 345/173 |
| 8,339,775 | B2 | 12/2012 | Degner et al. |
| 8,345,013 | B2 | 1/2013 | Heubel et al. |
| 8,350,973 | B2 | 1/2013 | Miyazaki et al. |
| 8,434,951 | B2 | 5/2013 | Wittenberg |
| 8,446,551 | B2 | 5/2013 | Gu |
| 8,542,203 | B2 | 9/2013 | Serban et al. |
| 8,547,350 | B2 | 10/2013 | Anglin et al. |
| 8,547,623 | B2 | 10/2013 | Parry-Jones |
| 8,564,559 | B2 | 10/2013 | Hou |
| 8,627,716 | B2 | 1/2014 | Son |
| 8,633,899 | B2 | 1/2014 | Um et al. |
| 8,633,916 | B2 | 1/2014 | Bernstein et al. |
| 8,635,919 | B2 | 1/2014 | Suzuki |
| 8,724,038 | B2 | 5/2014 | Ganapathi et al. |
| 8,749,501 | B2 | 6/2014 | Oda et al. |
| 8,780,060 | B2 | 7/2014 | Maschmeyer et al. |
| 8,890,853 | B2 | 11/2014 | Schuele et al. |
| 8,929,085 | B2 | 1/2015 | Franklin et al. |
| 9,001,081 | B2 | 4/2015 | Pope |
| 9,075,095 | B2 | 7/2015 | Kallassi |
| 9,116,569 | B2 | 8/2015 | Stacy et al. |
| 9,134,397 | B2 | 9/2015 | Solven et al. |
| 9,195,354 | B2 | 11/2015 | Bulea et al. |
| 9,201,105 | B2 | 12/2015 | Iida et al. |
| 9,274,654 | B2 | 3/2016 | Slobodin et al. |
| 9,349,552 | B2 | 5/2016 | Huska et al. |
| 9,395,583 | B2 | 7/2016 | Kim et al. |
| 9,454,255 | B2 | 9/2016 | Kallassi et al. |
| 9,454,268 | B2 | 9/2016 | Badaye et al. |
| 9,460,928 | B2 | 10/2016 | Shaw et al. |
| 9,489,100 | B2 | 11/2016 | Tsutsumi |
| 9,517,547 | B2 | 12/2016 | Kasashima et al. |
| 9,569,038 | B2 | 2/2017 | Doi et al. |
| 9,600,122 | B2 | 3/2017 | Lee |
| 9,696,223 | B2 | 7/2017 | Lisseman |
| 9,710,087 | B1 | 7/2017 | Jayaraj |
| 9,715,302 | B2 | 7/2017 | Kim et al. |
| 9,740,288 | B2 | 8/2017 | Hiraoka |
| 9,752,940 | B2 * | 9/2017 | Ogura .................... G01L 1/142 |
| 9,785,297 | B2 | 10/2017 | Kawaguchi et al. |
| 9,841,850 | B2 | 12/2017 | Schediwy et al. |
| 9,904,393 | B2 | 2/2018 | Frey et al. |
| 9,965,118 | B2 | 5/2018 | Shepelev |
| 10,019,085 | B2 | 7/2018 | Qiao et al. |
| 10,048,792 | B1 * | 8/2018 | Schediwy ............. G06F 3/0412 |
| 10,055,067 | B2 | 8/2018 | Shinkai et al. |
| 10,073,557 | B2 | 9/2018 | Chern et al. |
| 10,120,506 | B2 | 11/2018 | Chen et al. |
| 10,161,814 | B2 | 12/2018 | Martisauskas et al. |
| 10,168,814 | B2 | 1/2019 | Hotelling et al. |
| 10,175,804 | B2 | 1/2019 | Yoon et al. |
| 10,459,614 | B2 | 10/2019 | Kim et al. |
| 10,664,087 | B2 | 5/2020 | Kim et al. |
| 10,874,307 | B2 | 12/2020 | Narasimhan et al. |
| 11,237,436 | B2 * | 2/2022 | Zhao ................... G02F 1/13338 |
| 2005/0219222 | A1 | 10/2005 | Johnson et al. |
| 2007/0085837 | A1 | 4/2007 | Ricks et al. |
| 2008/0231605 | A1 | 9/2008 | Yang |
| 2010/0013785 | A1 | 1/2010 | Murai et al. |
| 2010/0097344 | A1 * | 4/2010 | Verweg ................ G06F 3/0446 345/174 |
| 2011/0096013 | A1 | 4/2011 | Krumpelman et al. |
| 2011/0193791 | A1 | 8/2011 | Tong et al. |
| 2012/0038577 | A1 | 2/2012 | Brown et al. |
| 2012/0086666 | A1 * | 4/2012 | Badaye ................ G06F 3/0446 345/174 |
| 2012/0098788 | A1 | 4/2012 | Sekiguchi |
| 2012/0120017 | A1 * | 5/2012 | Worfolk ................ G06F 3/0445 345/174 |
| 2012/0188202 | A1 * | 7/2012 | Tsujino .................. G06F 3/047 345/173 |
| 2013/0018489 | A1 | 1/2013 | Grunthaner et al. |
| 2013/0135250 | A1 | 5/2013 | Song |
| 2013/0135256 | A1 | 5/2013 | Hong et al. |

(56) References Cited

U.S. PATENT DOCUMENTS

| | | | |
|---|---|---|---|
| 2013/0155059 A1 | 6/2013 | Wang et al. | |
| 2013/0180841 A1 | 7/2013 | Yilmaz et al. | |
| 2013/0234734 A1* | 9/2013 | Iida | G01L 1/146 324/661 |
| 2013/0252521 A1 | 9/2013 | Kasashima et al. | |
| 2013/0314648 A1* | 11/2013 | Rappoport | G02B 1/11 349/96 |
| 2014/0043289 A1 | 2/2014 | Stern et al. | |
| 2014/0063365 A1* | 3/2014 | Li | G02F 1/13338 156/182 |
| 2014/0085213 A1 | 3/2014 | Huppi et al. | |
| 2014/0085247 A1 | 3/2014 | Leung et al. | |
| 2014/0085253 A1* | 3/2014 | Leung | G06F 3/0445 345/174 |
| 2014/0320762 A1 | 10/2014 | Jeong | |
| 2015/0059486 A1* | 3/2015 | Choong | G01L 9/0052 73/727 |
| 2015/0068897 A1 | 3/2015 | Neel et al. | |
| 2015/0153895 A1 | 6/2015 | Hotelling | |
| 2015/0261367 A1* | 9/2015 | Zhang | G02F 1/136286 438/587 |
| 2015/0277186 A1* | 10/2015 | Zou | G06F 3/0446 427/64 |
| 2015/0277629 A1 | 10/2015 | Kao et al. | |
| 2015/0363023 A1* | 12/2015 | Kawaguchi | G06F 3/0448 345/174 |
| 2016/0026298 A1* | 1/2016 | Hashida | G06F 3/0445 345/174 |
| 2016/0034088 A1* | 2/2016 | Richards | G01L 1/14 345/173 |
| 2016/0041648 A1 | 2/2016 | Richards | |
| 2016/0062500 A1 | 3/2016 | Kessler et al. | |
| 2016/0103530 A1 | 4/2016 | Leung et al. | |
| 2016/0103543 A1 | 4/2016 | Kessler et al. | |
| 2016/0154501 A1* | 6/2016 | Noguchi | G06F 3/0412 349/12 |
| 2016/0273987 A1* | 9/2016 | Masuda | G01L 9/0073 |
| 2016/0299598 A1 | 10/2016 | Yoon et al. | |
| 2016/0370908 A1* | 12/2016 | Kim | G06F 3/0412 |
| 2017/0031491 A1* | 2/2017 | Bao | G06F 3/04144 |
| 2017/0060340 A1* | 3/2017 | Chen | G06F 3/0447 |
| 2017/0068368 A1* | 3/2017 | Hsiao | G06F 3/0445 |
| 2017/0075493 A1 | 3/2017 | Lee et al. | |
| 2017/0090674 A1* | 3/2017 | Meng | G02F 1/1336 |
| 2017/0115768 A1* | 4/2017 | Shih | G06F 3/0412 |
| 2017/0168641 A1 | 6/2017 | Cheng et al. | |
| 2017/0205937 A1* | 7/2017 | Zhang | G06F 3/0488 |
| 2017/0242526 A1 | 8/2017 | Patel et al. | |
| 2018/0039353 A1* | 2/2018 | Taka | G06F 1/1671 |

FOREIGN PATENT DOCUMENTS

| | | |
|---|---|---|
| CN | 101436111 | 5/2009 |
| CN | 101458133 | 6/2009 |
| CN | 101739183 | 6/2010 |
| CN | 102112947 | 6/2011 |
| CN | 103207716 | 7/2013 |
| CN | 203606807 | 5/2014 |
| CN | 104919407 | 9/2015 |
| CN | 104969158 | 10/2015 |
| CN | 105190492 | 12/2015 |
| CN | 105278735 | 1/2016 |
| CN | 205015863 | 2/2016 |
| EP | 2071312 | 6/2009 |
| JP | 2010079791 | 4/2010 |
| JP | 2011153826 | 8/2011 |
| TW | 201443736 | 11/2014 |
| TW | 201528100 | 7/2015 |
| WO | WO 14/092758 | 6/2014 |
| WO | WO 14/124173 | 8/2014 |
| WO | WO 15/047374 | 4/2015 |
| WO | WO 15/106183 | 7/2015 |

OTHER PUBLICATIONS

Feist, "Samsung snags patent for new pressure sensitive touchscreens," posted on AndroidAuthority.com at URL: http://www.androidauthority.com/samsung-patent-pressure-sensitive-touchscreens-354860, Mar. 7, 2014, 1 page.

* cited by examiner

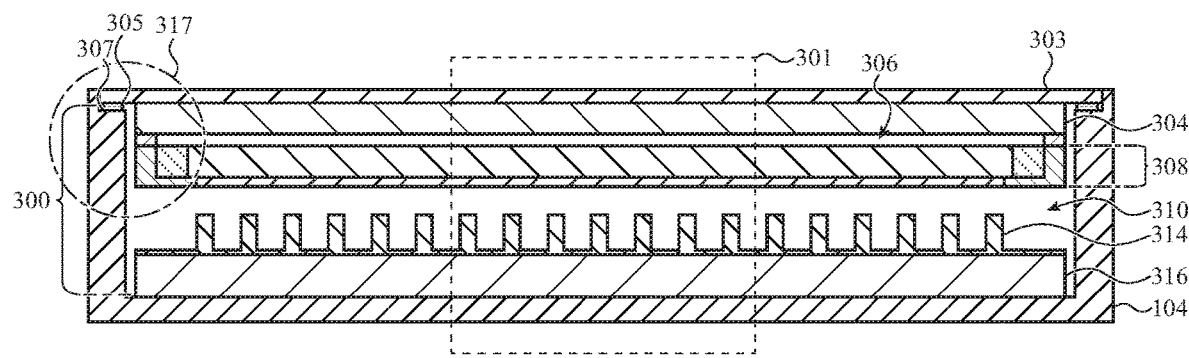
*FIG. 3A*
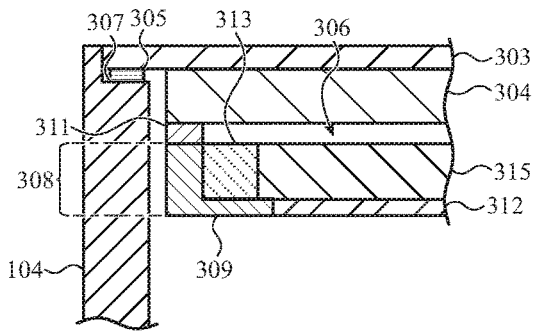
*FIG. 3B*
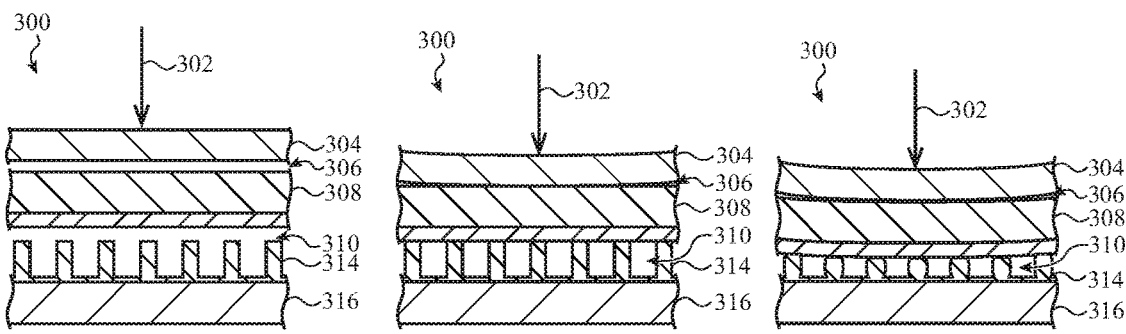
*FIG. 3C*  *FIG. 3D*  *FIG. 3E*

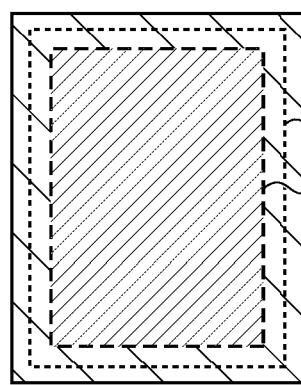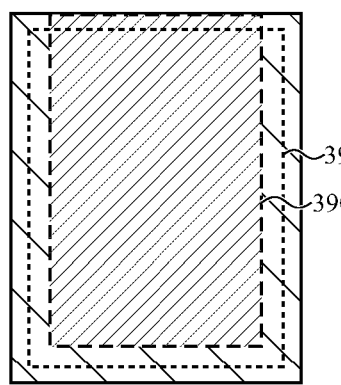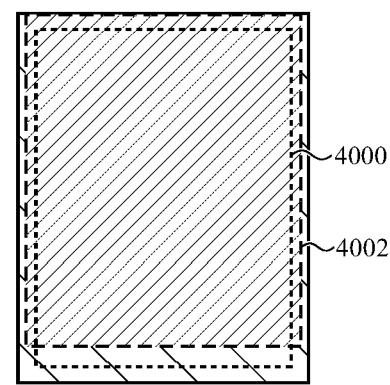
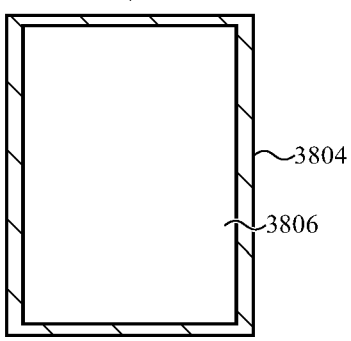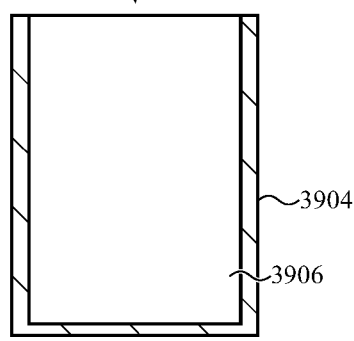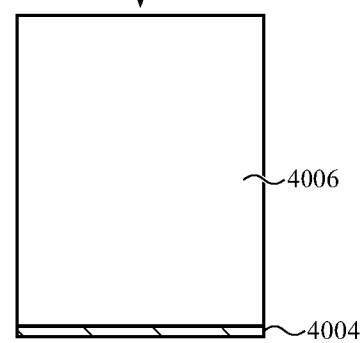
*FIG. 38*  *FIG. 39*  *FIG. 40*

FORCE SENSING ARCHITECTURES

CROSS-REFERENCE TO RELATED APPLICATIONS

This application is a continuation of U.S. patent application Ser. No. 15/435,649, filed Feb. 17, 2017, and entitled "Force Sensing Architectures," which claims the benefit under 35 U.S.C. § 119(e) of U.S. Provisional Patent Application No. 62/297,676, filed Feb. 19, 2016, and entitled "Force Sensing Architectures, U.S. Provisional Patent Application No. 62/395,888, filed Sep. 16, 2016, and entitled "Force-Sensitive Structure in an Electronic Device," and U.S. Provisional Patent Application No. 62/382,140, filed Aug. 31, 2016, and entitled "Force Sensing Architectures," the contents of all of which are incorporated by reference as if fully disclosed herein.

FIELD

The disclosure relates generally to sensing a force exerted against a surface, and more particularly to sensing a force through capacitive changes.

BACKGROUND

Touch devices generally provide for identification of positions where the user touches the device, including movement, gestures, and the like. As one example, touch devices can provide information to a computing system regarding user interaction with a graphical user interface (GUI), such as pointing to elements, reorienting or repositioning those elements, editing or typing, and other GUI features. As another example, touch devices can provide information to a computing system suitable for a user to interact with an application program, such as relating to input or manipulation of animation, photographs, pictures, slide presentations, sound, text, other audiovisual elements, and otherwise.

Generally, however, touch inputs are treated as binary inputs. A touch is either present and sensed, or it is not. A force of a touch input may provide another source of input information to a device. For example, a device may respond differently to a touch with a low application force than to a touch with a high application force. Force sensing devices may determine an amount or value of an applied force based on an amount of deformation of a component that is subjected to the force.

In devices where force inputs are applied to a touchscreen, such as a multi-touch touchscreen that the user touches to select or interact with an object or application displayed on the display, the noise produced by the display can interfere with the operation of the touchscreen. In some situations, the display noise can electrically couple to the touchscreen and interfere with the operation of the touchscreen. Such display noise can also electrically couple to a force sensing device. The magnitude of the display noise can be much greater than the magnitude of the force signals, making it difficult to discern the force signals from the display noise.

SUMMARY

An electronic device includes a user input surface defining an exterior surface of the electronic device, a first capacitive sensor comprising a first pair of sensing elements having an air gap therebetween and configured to determine a first amount of applied force on the user input surface that results in a collapse of the air gap, and a second capacitive sensor below the first capacitive sensor comprising a second pair of sensing elements having a deformable element therebetween and configured to determine a second amount of applied force on the user input surface that results in a deformation of the deformable element.

The first pair of sensing elements comprises a shared sense element and a first drive element set apart from and capacitively coupled to the shared sense element. The second pair of sensing elements comprises the shared sense element and a second drive element set apart from and capacitively coupled to the shared sense element. The shared sense element may be disposed between the first drive element and the second drive element. The shared sense element may include an array of sensing regions.

The electronic device may further include a display element coupled to the first drive element. The electronic device may further include a base structure, wherein the display element is configured to flex relative to the base structure, the deformable element is coupled to the base structure, and the air gap is positioned between the deformable element and the display element. The shared sense element may be coupled to the deformable element.

The electronic device may further include a display layer comprising a display element positioned below the user input surface and a back polarizer positioned below the display element. The electronic device may also include a sheet of conductive material formed over a back surface of the back polarizer to produce a conducting surface on the back surface of the back polarizer, and a conductive border formed along at least one edge of the sheet of conductive material. The conductive border may be positioned outside of a user-viewable region of the display layer. The sheet of conductive material may comprise silver nanowire.

A capacitive force sensor for an electronic device includes a first drive layer, a second drive layer positioned relative to the first drive layer, a shared sense layer between the first and second drive layers, a first spacing layer between the first drive layer and the shared sense layer, and a second spacing layer between the shared sense layer and the second drive layer.

The first spacing layer may comprise an air gap. The capacitive force sensor may further comprise a pair of opposed surfaces defining the air gap, and an anti-adhesion layer configured to prevent adhesion between the opposed surfaces. The air gap may have a thickness of about 1.0 mm or less. The second spacing layer may comprise a deformable material. The second spacing layer may comprise an array of deformable protrusions extending from a base layer.

The capacitive force sensor may further include sensing circuitry operatively coupled to the first drive layer, the second drive layer, and the shared sense layer, and configured to determine a first amount of applied force resulting in a change in thickness of the first spacing layer and a second amount of applied force resulting in a change in thickness of the second spacing layer.

The first drive layer may include an insulating substrate, a sheet of conductive material formed over a back surface of the insulating substrate to produce a conducting surface on the back surface of the insulating substrate, and a conductive border formed along at least one edge of the sheet of conductive material. The conductive border may include a continuous conductive border that extends along the edges of the sheet of conductive material. The conductive border may include one or more conductive strips formed along a respective edge of the sheet of conductive material An electronic device may include a cover defining a user input surface of the electronic device, a first sensing element coupled to the cover within an interior volume of the electronic device, a frame member coupled to the cover and extending into the interior volume of the electronic device, a second sensing element coupled to the frame member, and a third sensing element coupled to a base structure and set apart from the sense layer.

The frame member may define an opening, and the third sensing element may capacitively couple with the second sensing element through the opening.

The first sensing element may comprise a continuous layer of transparent conductive material covering substantially an entire surface of a substrate. The second sensing element may comprise a plurality of sensing regions, and the continuous layer of transparent conductive material may overlap multiple sensing regions of the plurality of sensing regions.

The third sensing element may comprise a plurality of drive regions, and each drive region may overlap multiple sensing regions of the plurality of sensing regions. The first sensing element may further comprise a connection element electrically coupled to the continuous layer of transparent conductive material, and the electronic device may further comprise sensing circuitry configured to provide an electrical signal to the first sensing element and a connector segment electrically coupling the sensing circuitry to the connection element.

An electronic device may include an insulating substrate positioned below a cover layer, a sheet of conductive material formed over a back surface of the insulating substrate to produce a conducting surface on the back surface of the insulating substrate, a conductive border formed along at least one edge of the sheet of conductive material, and an electrode layer positioned below the insulating substrate, wherein the sheet of conductive material and the electrode layer together form a force-sensitive structure that is configured to detect a force input on the cover layer.

The electronic device may further include drive circuitry coupled to the sheet of conductive material, and sense circuitry coupled to the electrode layer. The electrode layer may comprise an array of electrodes. The conductive border may comprise a continuous conductive border that extends along the edges of the sheet of conductive material. The conductive border may comprise one or more conductive strips formed along a respective edge of the sheet of conductive material.

An electronic device includes a display layer, comprising a display element positioned below a cover layer and a back polarizer positioned below the display element, a sheet of conductive material formed over a back surface of the back polarizer to produce a conducting surface on the back surface of the back polarizer, a conductive border formed along at least one edge of the sheet of conductive material, and a first electrode layer positioned below the display layer. The sheet of conductive material and the first electrode layer together may form a force-sensitive structure that is configured to detect a force input on the cover layer.

The electronic device may further comprise a touch-sensitive layer positioned between the cover layer and the front polarizer. The electronic device may further comprise a conductive layer positioned between the touch-sensitive layer and the front polarizer. The conductive border may comprise a continuous conductive border that extends along the edges of the sheet of conductive material. The conductive border may comprise one or more conductive strips formed along a respective edge of the sheet of conductive material.

The force-sensitive structure may comprise a first force-sensitive structure, the force input may comprise a first amount of force, and the electronic device may further comprise a second force-sensitive structure comprising a second electrode layer positioned below and spaced apart from the first electrode layer. The second force-sensitive structure may be configured to detect a second amount of force on the cover layer, wherein the second amount of force is greater than the first amount of force. The conductive border may be positioned outside of a user-viewable region of the display layer.

The electronic device may further comprise drive circuitry coupled to the sheet of conductive material and sense circuitry coupled to the first electrode layer. The first electrode layer may comprise an array of electrodes. The sheet of conductive material may comprise silver nanowire.

A method of forming conductive borders on a surface of a film substrate may include applying a plurality of masks to the surface of the film substrate, each mask defining an area of the surface of the film substrate that will be surrounded by a respective conductive border, forming a conductive material over the surface of the film substrate and the masks, removing each mask from the surface of the film substrate to produce the conductive borders, and singulating the conductive borders to produce individual sections of the film substrate that each includes a respective conductive border. The method may further include forming a protective layer over the surface of the film prior to singulating the conductive borders.

Forming the conductive material over the surface of the film substrate and the masks may comprise blanket depositing the conductive material over the surface of the film substrate and the masks. The film substrate may comprise a polarizer film with a sheet of conductive material formed on the surface of the polarizer film. The polarizer film may be attached to a display element in an electronic device.

An electronic device may comprise a user input surface defining an exterior surface of the electronic device, a first capacitive sensing element, a second capacitive sensing element capacitively coupled to the first capacitive sensing element, a first spacing layer between the first and second capacitive sensing elements, a second spacing layer between the first and second capacitive sensing elements and having a different composition than the first spacing layer, and sensing circuitry coupled to the first and second capacitive sensing elements configured to determine an amount of applied force on the user input surface. The first spacing layer may be configured to collapse if the applied force is below a force threshold, and the second spacing layer may be configured to collapse if the applied force is above the force threshold.

The exterior surface may deflect substantially linearly with respect to force when the applied force is below the force threshold, and the exterior surface may deflect substantially non-linearly with respect to force when the applied force is above the force threshold. The sensing circuitry may determine the amount of applied force using different force-deflection correlations based on whether the first spacing layer is fully collapsed.

The first spacing layer may be an air gap, and the second spacing layer may comprise a deformable element. The deformable element may comprise an array of deformable protrusions extending from a base layer. The electronic device may further include a sensor configured to detect whether the first spacing layer is fully collapsed.

A force sensing device for an electronic device includes a stack comprising a first capacitive sensing element, a structure below the stack and comprising a second capacitive sensing element capacitively coupled to the first capacitive sensing element, an air gap between the stack and the structure, and a contact sensor. The stack may be configured to move relative to the structure in response to a force applied to a user input surface of the electronic device, thereby causing a change in thickness of the air gap, the first and second capacitive sensing elements may be configured to provide a measure of capacitance corresponding to the change in thickness of the air gap, and the contact sensor may be configured to detect contact between the stack and the structure resulting from the air gap being fully collapsed. The force sensing device may further include a deformable element between the first and second capacitive sensing elements.

The contact sensor may comprise sensing regions and conductive elements configured to contact the sensing regions when the stack contacts the structure through the air gap. The force sensing device may further comprise a deformable element on a first side of the air gap, wherein the conductive elements are disposed on the deformable element, and the sensing regions are disposed on a second side of the air gap opposite the first side. The deformable element may comprise protrusions extending from a base layer, and the conductive elements may be coupled to the protrusions.

The contact sensor may comprise capacitive sensing regions on a first side of the air gap and dielectric elements on a second side of the air gap opposite the first side and capacitively coupled with the capacitive sensing regions. The capacitive sensing regions may be integrated with the first capacitive sensing element, and the dielectric elements are coupled to the deformable element.

A sensor component for an electronic device may include a base, a plurality of protrusions comprising deformable material extending from the base, and a plurality of sense elements disposed at free ends of the protrusions. The sense elements may be at least partially embedded in the protrusions. The sense elements may be coated on the protrusions. The sense elements may comprise a conductive material. The sense elements may comprise a dielectric material. The base and the plurality of protrusions may be a unitary component. The sensor component may further comprise at least one additional protrusion that does not include any sense elements.

BRIEF DESCRIPTION OF THE DRAWINGS

The disclosure will be readily understood by the following detailed description in conjunction with the accompanying drawings, wherein like reference numerals designate like structural elements, and in which:

FIGS. 3A-3E show partial cross-sectional views of the device of FIG. 1 viewed along line A-A in FIG. 1.

FIG. 38 shows a first example technique for determining the geometry of the conductive border.

FIG. 39 shows a first example technique for determining the geometry of the conductive border.

FIG. 40 shows a first example technique for determining the geometry of the conductive border.

Figure 1:
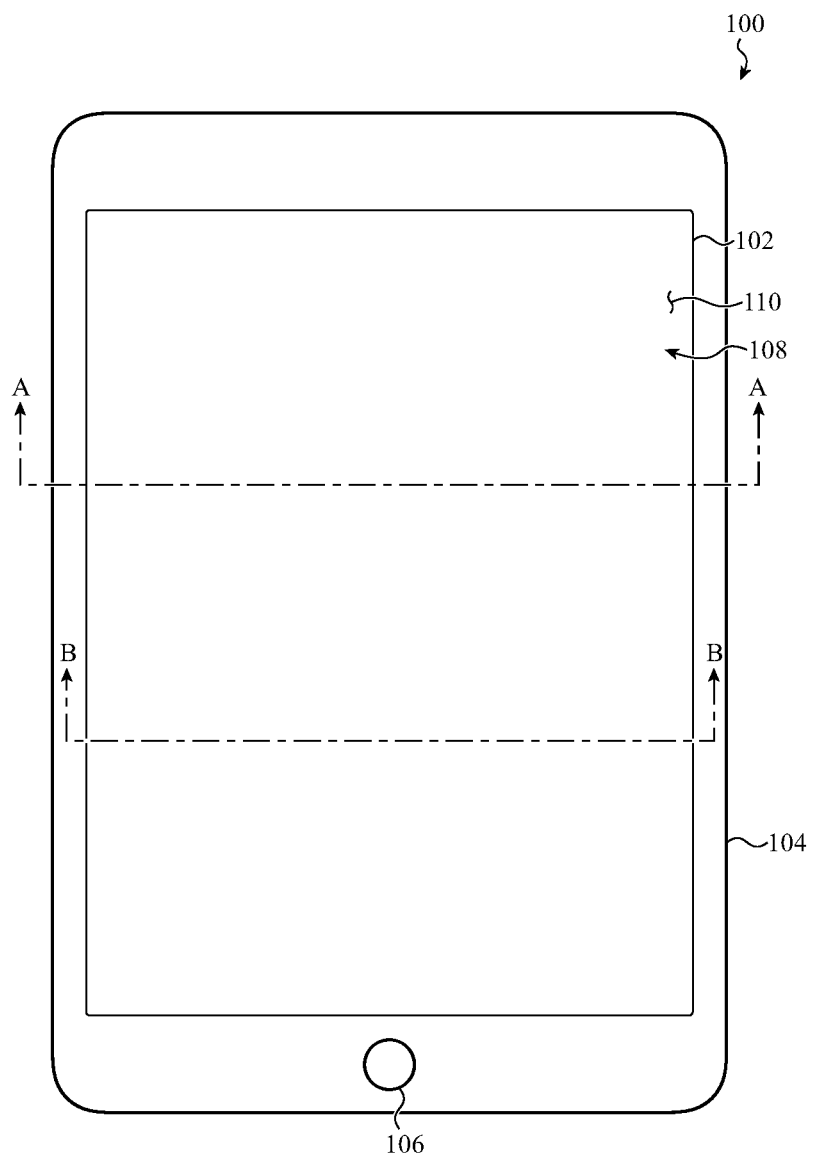
FIG. 1 shows an example computing device incorporating a force sensing device.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The present disclosure is related to force sensing devices that may be incorporated into a variety of electronic or computing devices, such as, but not limited to, computers, smart phones, tablet computers, track pads, wearable devices, small form factor devices, and so on. The force sensing devices may be used to detect one or more user force inputs on an input surface, and then a processor (or processing unit) may correlate the sensed inputs into a force measurement and provide those inputs to the computing device. In some embodiments, the force sensing devices may be used to determine force inputs to a track pad, a touchscreen display, or another input surface.

Devices may be configured to respond to or use force inputs in various ways. For example, a device may be configured to display affordances with which a user can interact by touching the surface of a touchscreen. Affordances may include application icons, virtual buttons, selectable regions, text input regions, virtual keys, or the like. The touchscreen may be able to detect the occurrence and the location of a touch event. By incorporating force sensors such as those disclosed herein, the device may be able to not only detect the occurrence and location of a touch, but also an amount of force with which the input is applied. The device can then take different actions based on the amount of applied force. For example, if a user touches an application icon with a force input below a threshold, the device may open the application. If the user touches the application icon with a force above the threshold, the device may open a pop-up menu containing additional affordances related to the application. As another example, force sensors may be used to determine a weight associated with an applied force, such that a device can act as a scale. Other applications for force inputs are also contemplated.

The force sensing device may include an input surface, one or more sensing layers (such as capacitive sensing elements, drive layers, sense layers, and the like), one or more spacing layers (e.g., air gaps, deformable elements), and a substrate or support layer. The input surface provides an engagement surface for a user, such as the external surface of a track pad or the cover glass of a display. The force sensing device may be incorporated with other components of an electronic device, such as a touchscreen, a display, or the like. In such cases, the components of the force sensing device, such as the one or more sensing layers, may be interspersed with other layers, such as a cover glass, filters, touch sensing layers, backlighting components, a display element (e.g., a liquid crystal display assembly), or the like.

A user input applied to an input surface of the force sensing device may cause one or more layers of the force sensing device to deflect in a direction of the applied force such that a spacing layer (e.g., an air gap) is collapsed. This deflection changes the distance between components of the force sensing device, such as between two complementary sensing layers, which can be detected by the force sensing device and correlated to a particular applied force. When the spacing layer has been fully collapsed (e.g., the components defining opposite sides of the gap have come into contact with each other), additional force applied to the input surface will not result in a significant additional change in distance between the layers of the force sensing device. That is, the force sensing device has reached the maximum value of force that it can detect.

Force sensing devices described herein include a first spacing layer, such as an air gap, and a second spacing layer, such as a deformable element, that produce a progressive deformation response to an applied force. For example, an air gap and a deformable element may be disposed between the first and second sensing layers such that an applied force first causes the air gap to collapse, and, once the air gap has fully collapsed, causes the deformable element to compress or otherwise deform. As the applied force increases and the deformable element becomes more compressed, the deformable element imparts a progressively higher reaction force against the applied force. Thus, a force sensing device with a deformable element and an air gap may be able to sense a larger force for a given deflection than would be possible in a similar force sensing device without the deformable element.

Force sensing devices described herein may also include contact sensors that indicate when adjacent layers defining an air gap come into contact with each other (e.g., when the air gap has been fully collapsed). Such contact sensors may be used to indicate to a processor or sensing circuitry whether the force sensing device is operating in an air-gap force regime or a deformable-element force regime, which may improve the quality and/or accuracy of the force sensing device.

Air gaps, deformable elements, and contact sensors may be used in various different force sensing architectures having various numbers and arrangements of spacing layers, sensing layers, contact sensors, and the like. Examples of such architectures are described herein.

Figure 2:
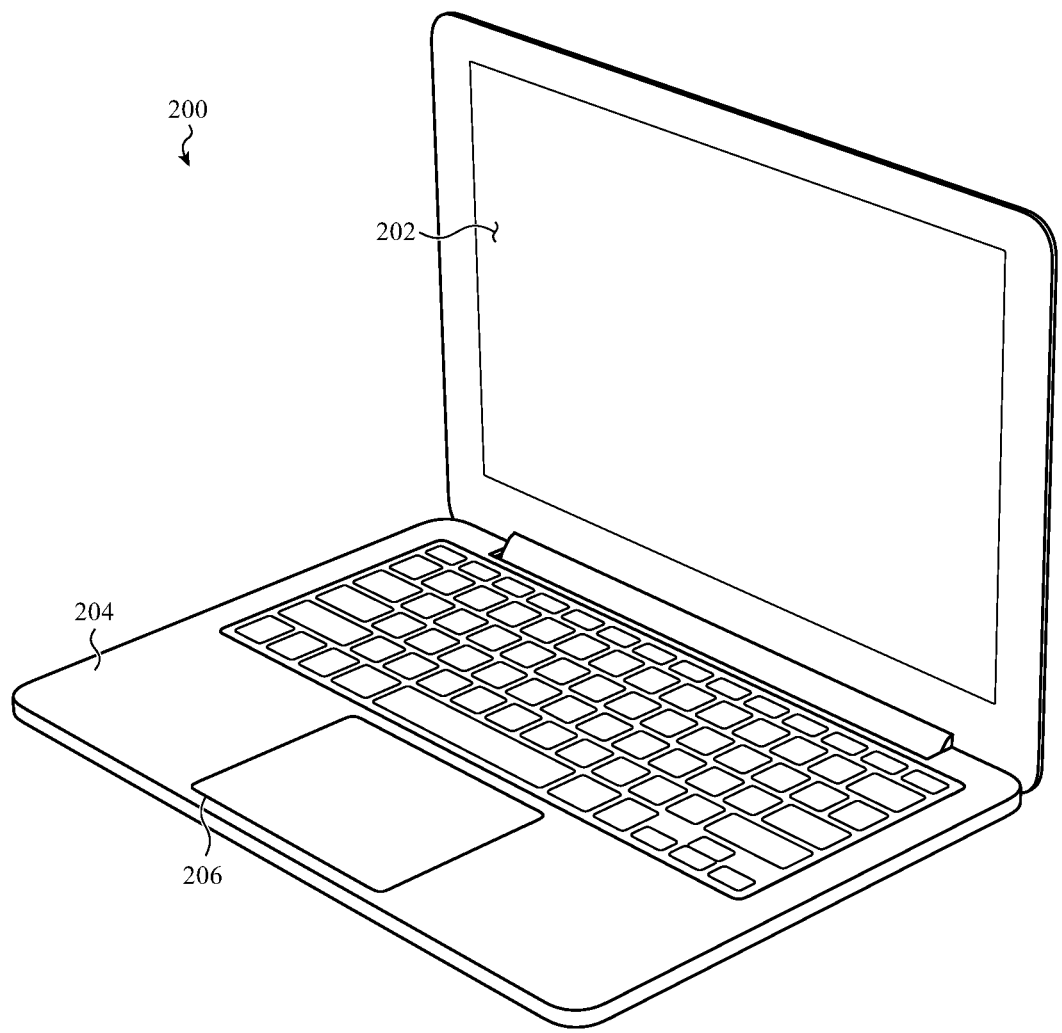
FIG. 2 shows another example computing device incorporating a force sensing device.

FIGS. 1-2 show example electronic devices that may incorporate the force sensing devices described herein. For example, FIG. 1 shows an electronic device 100 (e.g., a mobile computing device) that may incorporate the force sensing devices described herein. The electronic device 100 may include a housing 104 and a display 102. The display 102 can provide a visual output to a user in a user-viewable region 108. The display 102 can be implemented with any suitable technology, including, but not limited to, a multi-touch sensing touchscreen that uses a liquid crystal display (LCD) element, a light emitting diode (LED) element, an organic light-emitting display (OLED) element, an organic electroluminescence (OEL) element, and the like. In some embodiments, the display 102 can function as an input device that allows the user to interact with the mobile computing device 100. For example, the display can be a multi-touch touchscreen LED display.

The device 100 may also include an I/O device 106. The I/O device 106 can take the form of a home button, which may be a mechanical button, a soft button (e.g., a button that does not physically move but still accepts inputs), an icon or image on a display, and so on. Further, in some embodiments, the I/O device 106 can be integrated as part of a cover 110 and/or the housing 104 of the electronic device. The device 100 may also include other types of I/O devices, such as a microphone, a speaker, a camera, a biometric sensor, and one or more ports, such as a network communication port and/or a power cord port.

The cover 110 may be positioned over the front surface (or a portion of the front surface) of the device 100. At least a portion of the cover 110 can function as an input surface that receives touch and/or force inputs. The cover 110 can be formed with any suitable material, such as glass, plastic, sapphire, or combinations thereof. In one embodiment, the cover 110 covers the display 102 and the I/O device 106. Touch and force inputs can be received by the portion of the cover 110 that covers the display 102 and by the portion of the cover 110 that covers the I/O device 106.

In another embodiment, the cover 110 covers the display 102 but not the I/O device 106. Touch and force inputs can be received by the portion of the cover 110 that covers the display 102. In some embodiments, the I/O device 106 may be disposed in an opening or aperture formed in the cover 110. The aperture may extend through the housing 104 one or more components of the I/O device 106 can be positioned in the housing 104.

A force sensing device may be configured to detect force inputs on the display 102. A force sensing device may also be configured to detect force inputs on a portion of the housing 104, such as a back or side of the housing 104, or a bezel portion surrounding the display 102. In addition to the force sensing device, the display 102 may also include one or more touch sensors, such as a multi-touch capacitive grid, or the like. In these embodiments, the display 102 may detect both force inputs as well as position or touch inputs. The device 100 in FIG. 1 is embodied as a tablet computer (e.g., a mobile computing device), but this is merely one example device that may include the force sensing devices described herein. Examples of other devices that may include the force sensing devices described herein include other mobile computing devices, wearable electronic devices (e.g., watches), mobile phones, laptop or desktop computers, computer peripherals (e.g., trackpads that provide input to computers), or the like.

FIG. 2 shows a laptop computer 200 that includes a trackpad 206 (or other input surface), a display 202, and an enclosure 204. The enclosure 204 may extend around a portion of the trackpad 206 and/or the display 202. Force sensing devices may be configured to detect force inputs on the trackpad 206, the display 202, or both.

In another example (not shown), a force sensing device may be incorporated into a trackpad that is connectible to a computer, but housed in a separate enclosure or housing. For example, a standalone trackpad that includes a force sensing device may be configured to be connected to a computer as a peripheral input device, similar to a mouse or trackball.

FIG. 3A is a cross-sectional view of the device 100 viewed along line A-A in FIG. 1, showing an assembly 300 that may provide display, touch sensing, and force sensing functionality to the device 100, or may be integrated with other components to provide such functionality. For example, FIGS. 5, 12, 14, 16, 23A, and 26 illustrate examples of force sensing structures and/or devices that may be integrated with the assembly 300 or an assembly similar to the assembly 300.

The device 100 includes a cover 303 coupled to the housing 104 and defining an external surface of the device 100. The cover 303 may be a single layer or it may include multiple layers, and may be formed from or include any appropriate material(s), such as glass, treated glass, plastic, diamond, sapphire, ceramic, oleophobic coatings, hydrophobic coatings, or the like. The device 100 may also include other internal components, including circuit boards, cameras, sensors, antennas, processors, haptic elements, speakers, or the like, which are omitted from FIG. 3A for clarity.

The cover 303 may be coupled to the housing 104 via an interfacing member 305. FIG. 3B is an expanded view of the area 317 shown in FIG. 3A, showing the joint between the cover 303 and the housing 104 in greater detail.

The interfacing member 305 may be or may include an adhesive that fixes the cover 303 to a ledge 307 or other feature of the housing 104. For example, the interfacing member 305 may be a pressure sensitive adhesive (PSA), heat sensitive adhesive (HSA), epoxy, or other bonding agent. The interfacing member 305 may be compliant or rigid. Where the interfacing member 305 is compliant, it may help protect the cover 303 (which may include glass or other breakable materials) from damage due to shocks and impacts. Moreover, as discussed herein with reference to FIGS. 23A-25, the interfacing member 305 may include or cooperate with sensing elements that, along with appropriate processing circuitry, can detect a degree of deformation of the interfacing member 305. The detected degree of deformation of the interfacing member 305 can then be used to determine information such as an amount of force applied to the cover 303.

With reference to FIG. 3A, the assembly 300 includes an upper stack 304, which may include one or more layers or components of a display, including a liquid crystal matrix, light emitting diodes (LEDs), light guides, filters (e.g., polarizing filters), diffusers, electrodes, shielding layers (e.g., layers of indium tin oxide), or the like. The upper stack 304 may be coupled to the cover 303, such as with PSA, HSA, or the like. The upper stack 304 may also include sensing elements for detecting the presence and/or location of a touch input on the cover 303, including, for example, capacitive sensing elements, resistive sensing elements, and the like.

The assembly 300 also includes a lower stack 308, which may be separated from the upper stack 304 over at least a portion of the lower stack 308 by an air gap 306. The air gap 306 that separates the upper and lower stacks 304, 308 may be approximately 25 microns to approximately 100 microns thick, though other dimensions are also possible. The air gap 306 may help prevent deformation of components in the lower stack 308 in response to an applied force on the cover 303 which may cause undesirable optical artifacts on the display 102. For example, the lower stack 308 may include light sources, light guides, diffusers, or other optical components that, if rigidly coupled to the upper stack 304, may deflect when a force is applied to the cover 303. By separating these elements from the upper stack 304 by the air gap 306, undesirable deformations may be reduced.

The lower stack 308 may include a frame member 309 that supports other components of the lower stack 308 and couples the lower stack 308 to the upper stack 304. For example, the frame member 309 may support components of the lower stack 308 (including light sources, light guides, diffusers, sensing elements, or the like) in a spaced apart configuration relative to the upper stack 304 and/or the cover 303.

The frame member 309 may be coupled to the upper stack 304 and/or the cover 303 and may extend into an interior volume of an electronic device. The frame member 309 may be coupled to the upper stack 304 and/or the cover 303 by a joining member 311, which may be or include an adhesive or other bonding agent. The frame member 309 may be formed from or include any appropriate material, such as metal, plastic, or the like. As described herein, the assembly 300 may include sensing elements for sensing an applied force on the cover 303. Such sensing elements may rely on the ability to electromagnetically interact with other sensing elements in order to determine the applied force. For example, a capacitive sense layer may need to capacitively couple to a capacitive drive layer in order to detect a change in distance between the sense and drive layers. Accordingly, the frame member 309 may define an opening in a central portion of the frame member 309. The opening may reduce or eliminate interference, shielding, or other negative effects of a solid layer between the sensing elements. As shown, a stiffening member 312 formed from dielectric material (or any other material that does not shield or otherwise interfere with the sense and drive layers) is disposed in the opening. In some embodiments, the stiffening member 312 may be omitted from the frame member 309, and the opening may remain unfilled.

In cases where the frame member 309 defines an opening to facilitate or improve electrical, capacitive, and/or electromagnetic interaction between sensing elements, the opening may be substantially coincident with a display and/or touch-sensitive region of the display 102. Accordingly, sensing elements may be able to provide force (or other) sensing functionality to substantially the entire display and/or touch-sensitive region of the display 102.

The lower stack 308 may include one or more layers or components of a display. For example, the lower stack 308 may include a light source 313 comprising one or more LEDs, fluorescent lights, or the like. The light source 313 may emit light into an optical stack 315 that includes one or more optical components including but not limited to reflectors, diffusers, polarizers, light guides (e.g., light guide films), and lenses (e.g., Fresnel lenses). The lighting configuration shown in FIGS. 3A-3B is merely exemplary, and the lower stack 308 may include lighting configurations other than that shown in FIGS. 3A-3B.

The upper and lower stacks 304, 308 are described above as including display elements. In applications where the assembly 300 does not provide display functionality, such as where the assembly 300 is part of or coupled to the trackpad 206, the upper and lower stacks 304, 308 may include different components and/or layers as those described above, or may be omitted or replaced with other components.

Below the lower stack 308 are a first spacing layer, such as an air gap 310, and a second spacing layer, such as a deformable element 314. The air gap 310 may be approximately 0.5 to approximately 1.0 mm thick, though other dimensions are also possible.

The first and second spacing layers are configured to change thickness in response to an applied force. For example, a thickness of the air gap 310 (e.g., the distance between the opposed surfaces that define the air gap) may be decreased as a force is applied to the cover 303. Similarly, a thickness of the deformable element 314 may be decreased as a force is applied to the cover 303.

The deformable element 314 may include any appropriate material, such as silicone, polyurethane foam, rubber, gels, or the like. Moreover, the deformable element 314 may have any appropriate structure, such as multiple compliant or deformable protrusions (as shown), which may be formed as columns, beams, pyramids, channels with sidewalls, cones, wave-shaped protrusions, bumps, or the like. The deformable element 314 may also or instead comprise open or closed cells, such as a sponge or a foam. The deformable element 314 may also have a substantially homogenous, nonporous composition. As yet another example, the deformable element 314 may include multiple discrete pieces of deformable material, such as dots, pads, or the like.

The foregoing materials and configurations for the first and second spacing layers are merely examples, however, and the first and second spacing layers may be formed from any appropriate materials or combinations thereof. For example, the air gap 310 may be replaced with a first foam material, and the deformable element 314 may include a second foam material having a different density, thickness, composition, or spring constant, than the first. As another example, the first and second spacing layers may be substantially identical, and may include or be formed from the same materials.

The deformable element 314 may be coupled to or adjacent a base structure or layer 316. The base structure 316 may be a substrate or support layer dedicated to the assembly 300, or it may be another component of an electronic device, such as a battery, a portion of a housing or enclosure, a circuit board, or any other component.

FIGS. 3C-3E illustrate a progression of the physical response of the assembly 300 to an input force 302 on the upper stack 304. As noted above, the input force 302 may correspond to a user contacting a user input surface of an electronic device, such as the cover 303, with a finger, stylus, or other object. The input force 302 may be transferred through the cover 303 to the surface of the upper stack 304.

FIG. 3C illustrates the portion of the assembly 300 represented by area 301 in FIG. 3A prior to the input force 302 being applied to the upper stack 304. FIG. 3D illustrates the assembly 300 after the force input has caused the upper stack 304 to deflect or flex sufficiently to fully collapse the air gap 306. In particular, the upper stack 304 has been flexed towards the lower stack 308 such that the upper stack 304 is in contact with the lower stack 308 in at least one location. The stiffness of the upper stack 304 and the size of the air gap 306 may determine the amount of force that causes the upper stack 304 to come into contact with the lower stack 308. In some cases, even a slight touch from the user will be sufficient (e.g., a touch that a user would not consider to be "pressing" on the cover).

FIG. 3E illustrates the assembly 300 after the force input has caused the lower stack 308 to deflect sufficiently to fully collapse the air gap 310, thus bringing the lower stack 308 into contact with and at least partially deforming the deformable element 314.

As used herein, the term "collapse" may refer to a partial collapse of a layer (e.g., corresponding to any reduction in thickness of a material or an air gap at any location), or a full collapse of a layer (e.g., corresponding to opposing surfaces that define an air gap coming into contact with one another at any point, or reaching a maximum deformation of a deformable material).

Figure 4:
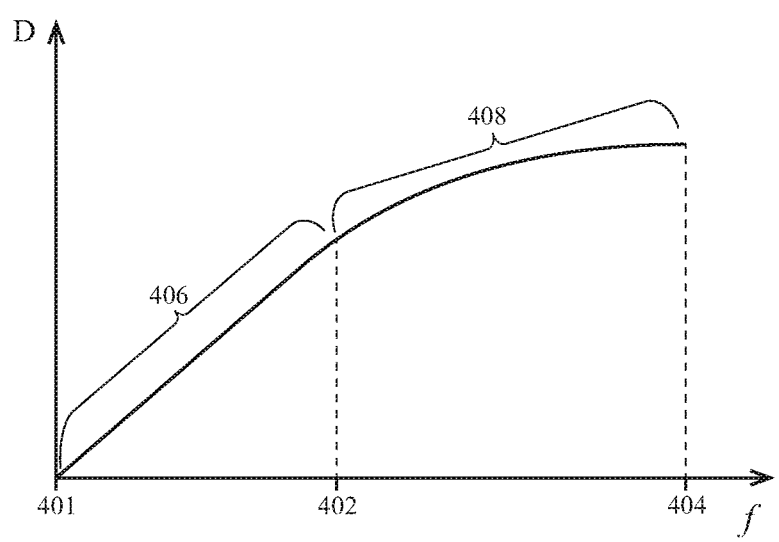
FIG. 4 shows a force versus deflection curve of the device of FIG. 1.

FIG. 4 is an example force versus deflection curve illustrating how a user input surface of the assembly 300 (e.g., the cover 303) deflects in response to the force input in FIGS. 3C-3E. In particular, as the force increases from zero to a force threshold (e.g., corresponding to point 402), the deflection increases along a first profile 406. In some cases, the first profile 406 corresponds to the deflection of the assembly 300 until all of the air gaps in the assembly 300 (e.g., the air gap 306 and the air gap 310) have been fully collapsed. As the force increases beyond the force threshold (e.g., point 402) and the deformable element 314 compresses, the deflection increases along a second profile 408 extending from point 402 to point 404. Accordingly, the force threshold corresponds to the amount of force at the transition from collapse of the air gaps only to deformation of the deformable element.

The first profile 406 may be substantially linear, such that an incremental increase in force produces substantially the same incremental increase in deformation of the cover 303 at any point in the first profile 406. In contrast, the second profile 408 may be non-linear, and may plateau as the force increases. For example, an incremental increase in force at the beginning of the second profile 408 may result in a greater amount of deformation of the cover 303 than the same incremental increase in force at the end of the second profile 408. However, these profiles are merely exemplary, and the force sensing devices described herein may exhibit any other force versus deflection curves or profiles.

The systems and methods described herein, including the force sensing devices 500, 700, 900, and 1100 described below, facilitate the detection of whether a force sensing device is operating according to the first profile 406, such that only air gaps are being collapsed, or the second profile 408, such that a deformable element is being deformed. By detecting the different profiles, accurate force measurements may be provided.

While FIGS. 3A-4 relate to the assembly 300 of the device 100, the components, structures, and principles of operation of the assembly 300 may apply to other devices as well, such as the display 202 or the trackpad 206 of the device 200 (or any other appropriate device). In cases where a display is not present, such as the trackpad 206, some components of the assembly 300 may be omitted, replaced, or rearranged. For example, the upper and lower stacks 304, 308 may include components other than display elements, or they may be omitted or replaced with spacers or other components.

Figure 5:
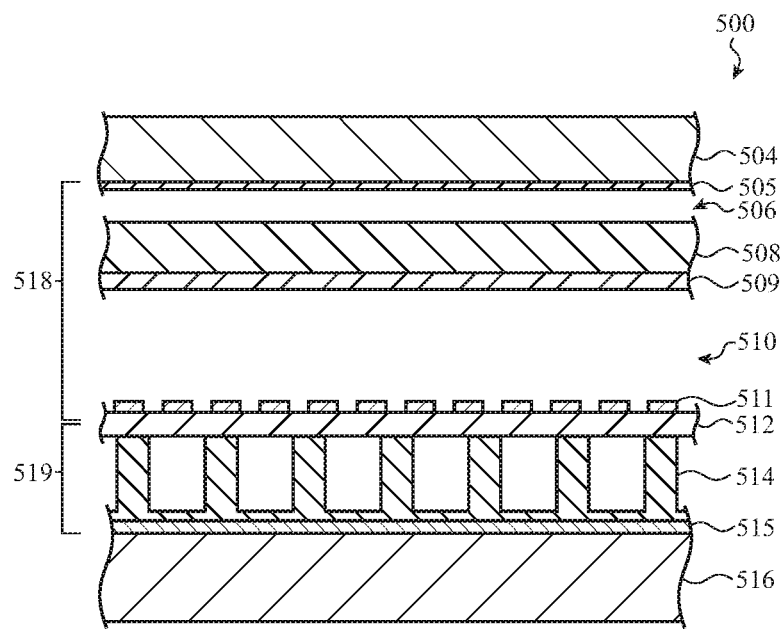
FIG. 5 shows a cross-sectional view of an example force sensing device viewed along line A-A in FIG. 1.

FIG. 5 is a partial cross-sectional view of an example force sensing device 500 that may be incorporated in an electronic device (e.g., the devices 100, 200), depicting an area similar to the area 301 in FIG. 3A. The cover 303 and the housing 104 are omitted for clarity.

The force sensing device 500 includes an upper stack 504, similar to the upper stack 304, which may include one or more layers or components of a display, including a liquid crystal matrix, light emitting diodes (LEDs), light guides, filters (e.g., polarizing filters), diffusers, electrodes, or the like. The upper stack 504 may be configured to flex or be capable of flexing in response to an applied force on the force sensing device 500.

A first sensing element 505 is coupled to the upper stack 504 (for example, to a cover 303 or to a component that is coupled to the cover 303, such as a filter) and is within an interior volume of an electronic device. The first sensing element 505 may be a capacitive sensing element that is configured to capacitively couple with another capacitive sensing element. For example, the first sensing element 505 may be a drive layer that is capacitively coupled to a sense layer (e.g., the second sensing element 512, below) that facilitates detection of a distance between the sense and drive layers using mutual capacitance. As another example, the first sensing element 505 may be a sense layer instead of a drive layer. As yet another example, the first sensing element 505 may be configured to capacitively couple to a ground layer to facilitate detection of a distance between itself and the ground layer using self-capacitance. As yet another example, the first sensing element 505 may be a ground layer that capacitively couples to a separate sense layer.

In the presently described examples, the sensing elements are described as elements for capacitive sensing. However, other types of sensors (and sensor components) may be used instead of or in addition to capacitive sensors. Indeed, other types of sensors or sensing technologies that can detect changes in distance, or absolute distance, between components or otherwise detect force may be used. For example, inductive sensors, optical sensors, sonic or ultrasonic sensors, or magnetic sensors may be used. Moreover, the components of the sensors may be integrated in the force sensors as shown herein (e.g., with sensing elements set apart from one another by one or more layers including air gaps, deformable layers, other components, or the like), or they may be integrated in any other manner suitable for that type of sensor (e.g., an optical sensor may include one or more light emitters in place of a sensing layer).

The first sensing element 505 may be coupled to the upper stack 504 in any appropriate way, such as with a pressure sensitive adhesive (PSA), heat sensitive adhesive (HSA), or the like. The first sensing element 505 may also be patterned on the upper stack 504, such as with physical vapor deposition, electron beam evaporation, sputter deposition, or any other appropriate technique. The first sensing element 505 may be formed from or include any appropriate material, such as indium tin oxide (ITO), disposed on a substrate.

A lower stack 508 may be disposed below the first sensing element 505 and separated from the first sensing element 505 by an air gap 506. Like the air gap 306, the air gap 506 may be any appropriate thickness, such as from about 25 microns to about 100 microns.

The lower stack 508 may include any appropriate components or layers, such as those described above with respect to the lower stack 308 (e.g., LEDs, an optical stack, backlights, reflectors, or light guides), and may be coupled to the upper stack 504 and/or the housing 104 as described with respect to the lower stack 308 of FIG. 3A (e.g., via the frame member 309). In embodiments where the force sensing device 500 does not include a display or does not provide display functionality, lower stack 508 (as well as the upper stack 504) may include different components or be omitted.

The lower stack 508 may be coupled to and/or supported by a frame member, which may be similar to the frame member 309 in FIG. 3A. The frame member may include a stiffening member 509, similar to the stiffening member 312 in FIG. 3A. The stiffening member 509 may be formed from or include a dielectric material to facilitate or improve electrical, capacitive, and/or electromagnetic interaction between sensing elements (e.g., between the first sensing element 505 and the second sensing element 512).

The frame member, and in particular the stiffening member 509, may support the lower stack 508 in a spaced apart configuration relative to the upper stack, a base structure 516, a deformable element 514, or other components of the electronic device. FIG. 5 shows the second sensing element 512 coupled to a deformable element 514. However, in some cases, the second sensing element 512 may be coupled to the lower stack 508. In such cases, the second sensing element 512 may be coupled to the frame member, such as to the stiffening member 509 or a component of the lower stack 508.

An air gap 510 separates the lower stack 508 from a second sensing element 512. The air gap 510 may be any appropriate thickness, such as from about 0.5 mm to 1.0 mm.

The second sensing element 512 may be a sense layer for a capacitive sensor, and may be capacitively coupled to the first sensing element 505. The second sensing element 512 may include an array of discrete capacitive sensing regions that facilitate detection of a location (and/or a magnitude) of a force input on the upper stack 504. The second sensing element 512 may be formed from or include any appropriate material, such as ITO traces disposed on a substrate. The second sensing element 512 may be coupled to the deformable element 514, the stiffening member 509 (or other component of the frame member or lower stack 508), or any other component or structure in the interior volume of the electronic device such that the second sensing element 512 is between the first sensing element 505 and a third sensing element 515 (discussed below).

An optional anti-adhesion layer 511 may be disposed on a surface defining a side of the air gap 510 in order to prevent the opposite sides of the air gap from sticking together, either temporarily or permanently, when they contact each other. Thus, when an applied force is removed from a user input surface, the components of the force sensing device 500 can return to or near their original orientations. The anti-adhesion layer 511 may be formed from or include any appropriate material, and may have any appropriate shape or structure. For example, the anti-adhesion layer 511 may comprise posts, protrusions, channels, or other structures that permit airflow therethrough to reduce or prevent the formation of sealed areas between the surfaces of the air gap 510 when the air gap 510 is fully collapsed. Without the anti-adhesion layer 511, such sealed areas may result in negative pressure zones that could act similar to "suction cups" that prevent the separation of the sides of the air gap 510. The anti-adhesion layer 511 may prevent adhesion caused by other mechanisms or forces as well, such as van der Waals forces, electrostatic forces, or the like.

The force sensing device 500 includes a deformable element 514 between the second sensing element 512 and a third sensing element 515. Similar to the deformable element 314, the deformable element 514 may include any appropriate material (such as silicone, polyurethane foam, rubber, gels, or the like) and may have any suitable structure, such as multiple compliant columns (as shown), beams, pyramids, cones, wave-shaped protrusions, open or closed cells, or the like. The deformable element 514 may deflect non-linearly with respect to an applied force, as described above.

The deformable element 514 is shown in FIG. 5 below the air gap 510 and between the second sensing element 512 and the third sensing element 515. However, the relative positions of the air gap 510 and the deformable element 514 may be swapped. For example, the deformable element 514 may be coupled to the lower stack 508.

The third sensing element 515, disposed between the deformable element 514 and a base structure 516, may be a drive layer for a capacitive sensor, and may be capacitively coupled to the second sensing element 512. For example, the second sensing element 512 may be a sense layer, and the third sensing element 515 may be a drive layer, thus forming a capacitive sensor spanning the deformable element 514.

The base structure 516 may be a frame, bracket, or support structure of the force sensing device. In some cases, the base structure 516 is a component of an electronic device that is beneath a user input surface, such as a circuit board, a battery, an interior wall of a housing or enclosure, or the like. The base structure 516 may be stiffer or otherwise more resistant to deflection in response to an applied force than the components above it. Thus, once the air gap 510 has been fully collapsed, additional force may primarily deform the deformable element 514 rather than deflecting the base structure 516.

The first, second, and third sensing elements 505, 512, and 515 may form two capacitive sensors. For example, as described above, the first and third sensing elements 505, 515 may each act as a distinct drive layer, and the second sensing element 512 may be a sense layer that capacitively couples to (and senses changes in distance to) both the first and third sensing elements 505, 515.

Where the second sensing element 512 is a shared sense layer, it may include a first set of sensors for detecting the distance to the first sensing element 505 and a second set of sensors for detecting the distance to the third sensing element 515. The second sensing element 512 may also or instead use the same sensors to detect the distance to both the first and third sensing elements 505, 515. In the latter cases, the first and third sensing elements 505, 515 may be driven with different electrical signals, thus allowing the second sensing element 512 (and/or sensing circuitry coupled to the second sensing element 512) to differentiate between capacitance changes that are caused by changes in a size of the air gap 510 and capacitance changes that are caused by changes in a size of the deformable element 514. In another embodiment (not shown), the second sensing element 512 may be replaced with two discrete sensing elements, each acting as a sense layer for a different one of the first and third sensing elements 505, 515.

Figure 6:
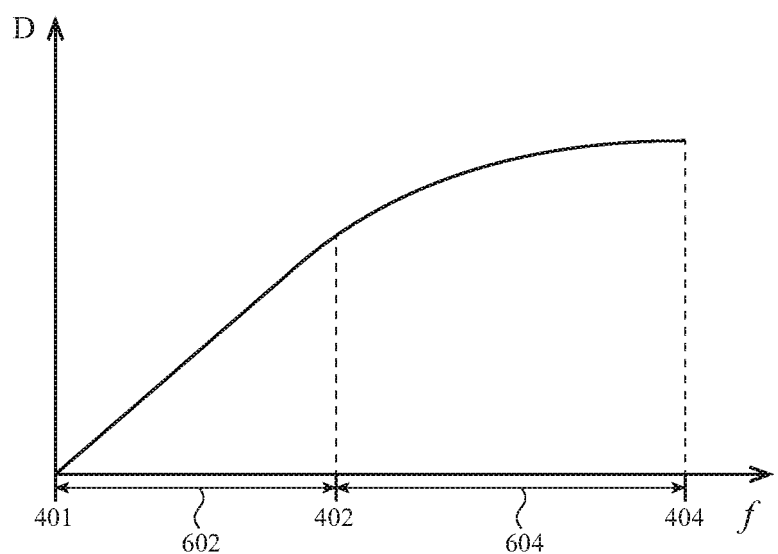
FIG. 6 shows a force versus deflection curve of the force sensing device of FIG. 5.

FIG. 6 is an example force versus deflection curve illustrating how the force sensing device 500 in FIG. 5 deflects in response to a force input applied (directly or indirectly) to the upper stack 504. The force response is similar to that shown in FIG. 4, with a first profile from point 401 to point 402 (corresponding to collapse of the air gaps 506 and 510) and a second profile from point 402 to point 404 (corresponding to deformation of the deformable element 514).

As noted above, the force sensing device 500 has two capacitive sensors—a first capacitive sensor 518 formed by the first and second sensing elements 505, 512, and a second capacitive sensor 519 formed by the second and third sensing elements 512, 515. The first capacitive sensor 518 spans the air gaps 506 and 510, and the second capacitive sensor 519 spans the deformable element 514. Thus, the first capacitive sensor 518 is positioned within the force sensing device 500 to detect deformation of the upper stack 504 along the line 602 in FIG. 6, and the second capacitive sensor 519 is positioned within the force sensing device 500 to detect deformation of the upper stack 504 along the line 604 in FIG. 6. By detecting the deformation of the air gaps with one sensor and the deformation of the deformable element with a different sensor, sensing circuitry can process the signals according to different force-deflection correlations. For example, deflections from the first capacitive sensor 518 may be correlated to an amount of applied force according to the substantially linear profile between point 401 and point 402, and the deflections from the second capacitive sensor 519 may be correlated to an amount of applied force according to the non-linear profile between point 402 and point 404. Of course, the linear and non-linear profiles shown in FIG. 6 are merely examples, and the deformation of a force sensing device may follow or exhibit different profiles.

Sensing circuitry may apply force-deflection correlations in any appropriate manner. For example, force-deflection correlations may be implemented in mathematical functions that output a particular force value for a particular determined amount of deflection (which may in turn have been determined based on a measured or detected capacitance value, or any other electrical measurement or value). As another example, force-deflection correlations may be implemented using lookup tables, where particular deflection values are correlated with particular force values. Other techniques are also possible, and these examples do not limit the mathematical or programmatic techniques that may be used to produce force values from measured or detected electrical properties (e.g., capacitance, resistance, current, signals, etc.).

Figure 7:
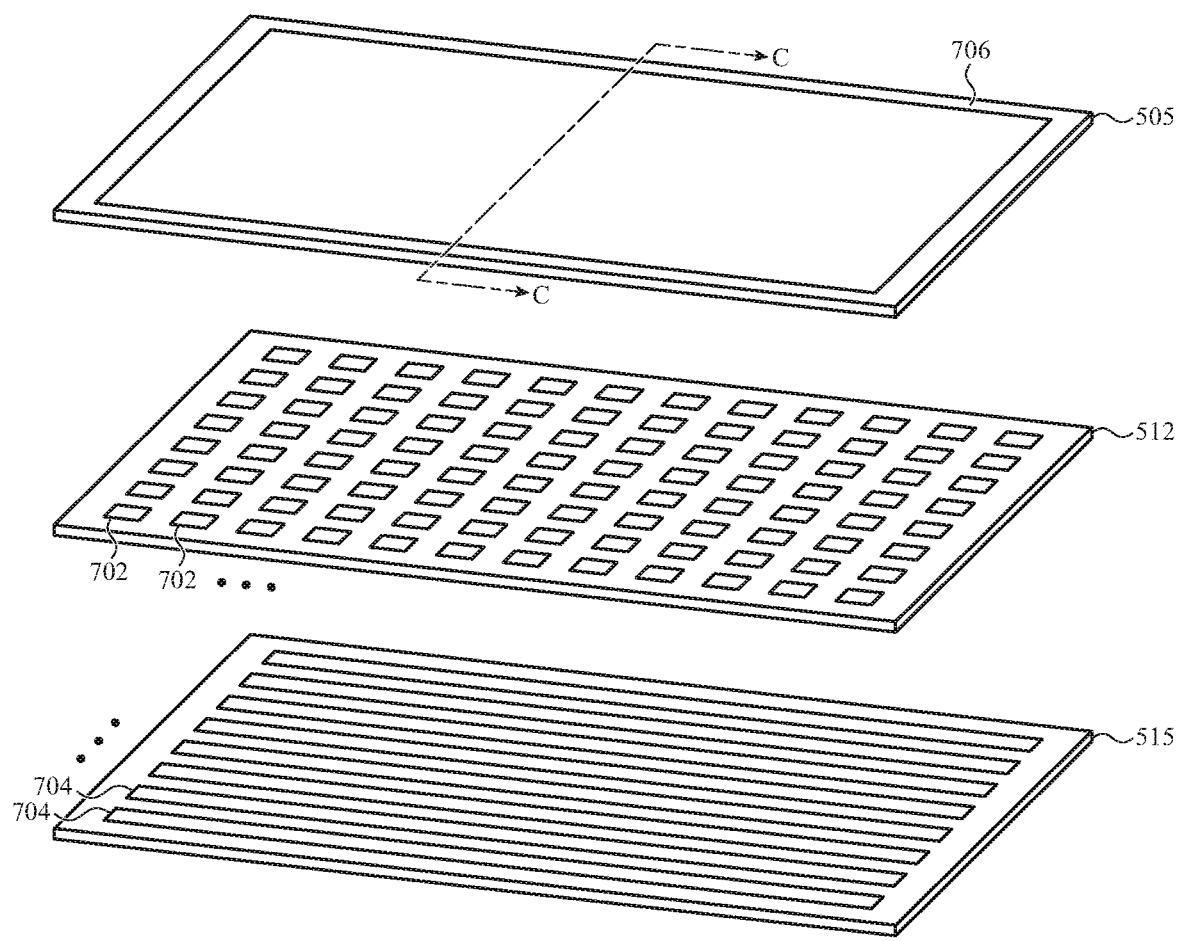
FIG. 7 shows an exploded view of the sensing elements of the force sensing device of FIG. 5.

FIG. 7 is an exploded view of the sensing elements 505, 512, and 515 of the force sensing device 500 of FIG. 5, illustrating example configurations of the sensing elements in an implementation of the force sensing device 500 that uses capacitive sensing to detect changes in distance between the sensing elements. FIG. 7 omits components of the force sensing device 500 and the electronic device in which it is configured. For example, FIG. 7 omits the deformable element 514 that is shown between the second sensing element 512 and the third sensing element 515. Moreover, FIG. 7 omits some details of the sensing elements 505, 512, 515 for clarity, such as conductive traces or leads used to couple the sensing elements (or portions thereof) to other electrical circuitry.

As noted above, in the force sensing device 500, the first and third sensing elements 505, 515 may be drive layers for a capacitive sensing scheme, and the second sensing element 512 may be a sense layer. In operation, the first and third sensing elements 505, 515 (also referred to as drive layers 505, 515) may be excited with an electrical signal, such as a substantially sinusoidal signal, a square or edge signal (e.g., a substantially instantaneous transition from a first voltage to a second voltage), or any other appropriate signal. Properties of the signal, such as frequency, voltage, or amplitude, may be selected to avoid or minimize interference with other electronic circuits of a device, such as display circuits, processors, antennas, and the like. Because the second sensing element 512 (also referred to as a sense layer) is capacitively coupled to a drive layer, a corresponding electrical signal may be induced in (or otherwise detected by) the sense layer. For a given electrical signal applied to the drive layers, the induced electrical signal in the sense layer may be different depending on the distance between the drive layer and the sense layer. Thus, the force sensing device 500 (or the associated sensing circuitry) may determine the distance between the sense layer and drive layer by analyzing the signal induced in the sense layer.

The first drive layer 505 may include a conductive material coupled or otherwise applied to a substrate. For example, the first drive layer 505 may include a layer of ITO, nanowire (e.g., metallic nanowire, including silver or gold nanowire), or any other appropriate material. As shown in FIG. 5, the drive layer 505 is disposed in the light path of the display 102 (e.g., it is above the lower stack 508, which produces the light used to illuminate the display 102). Thus, the conductive material may be substantially transparent. Even when a substantially transparent material is used, if the material is arranged in a regular pattern, such as in a grid or columns, it may be visible on the display 102. Accordingly, the conductive material of the first drive layer 505 may be substantially uniformly distributed (e.g., as a layer, sheet, coating, or other continuous element) on the first drive layer 505 instead of being arranged in a regular pattern. In some cases, the conductive material may be a continuous layer covering or extending over an entire surface of a substrate of the first drive layer 505 (or substantially an entire surface, such as about 80% or more of the surface area of the substrate). The layer of conductive material may be configured so that there are no borders or edges of the layer positioned within the boundaries of a display in which the force sensing device 500 is incorporated.

The first drive layer 505 may also include a connection element 706 that is electrically coupled to the conductive material and facilitates the coupling of the electrical material to other electronic components or circuitry. The connection element 706 may be formed from or include any material, such as silver, copper, nickel vanadium, or any other appropriate material. The connection element 706 may form a continuous frame along an outer portion of the first drive layer 505 (as shown), or it may be formed from discontinuous or distinct segments. In some cases, the connection element 706 does not form a frame, but instead may be a strip along one side of the first drive layer 505, for example. Other configurations are also possible. Connection elements 706, such as conductive strips formed on an edge of a drive layer 505 (or any other conductive substrate, layer, coating, etc.) are discussed herein with respect to FIGS. 26-29 and 32-40.

The sense layer 512 may include sensing regions 702 formed from (or including) a conductive material and arranged in a substantially regular pattern, such as a grid. The sensing regions 702 may be formed from or include any appropriate material, such as ITO, metallic nanowire, or the like.

Each of the sensing regions 702 may act as a discrete area or pixel-like region that may be used to determine a distance between the first drive layer 505 and that particular sensing region. By analyzing all of the sensing regions 702, the force sensing device 500 can detect an amount of an applied force on the cover 303. Moreover, pixelating the sense layer 512 as shown may allow the force sensing device 500 to detect force with greater accuracy than if a single, uniform sense layer were used. For example, if a single sense layer were used, it may be difficult or impossible to tell the difference between a large force applied near an edge of the cover 303 and a small force applied near a center of the cover 303. By using a pixelated sense layer 512, the force sensing device 500 can account for differences in stiffness among the different regions of the cover 303. Using a pixelated sense layer 512 may also allow the force sensing device 500 to determine the location of an applied force, detect multi-touch inputs (e.g., corresponding to multiple fingers or styli being applied to the cover 303), or the like.

The second drive layer 515 may include a plurality of drive regions 704. Like the first drive layer 505 and the sensing regions 702 of the sense layer 512, the drive regions 704 may be formed from or include any appropriate conductive material, such as ITO, metallic nanowire, or the like.

The drive regions 704 may be arranged in any appropriate pattern or orientation, and may have any appropriate size. For example, the drive regions 704 may be a plurality of substantially rectangular areas of conductive material, and may be substantially aligned with a column of sensing regions 702 in the sense layer 512, as shown and described with respect to FIG. 8. Thus, the drive regions 704 may each overlap multiple ones of the sensing regions 702 of the sense layer 512.

Like the first drive layer 505, the drive regions 704 may be excited with an electrical signal (e.g., a substantially sinusoidal or edge signal) that induces a corresponding signal in the sensing regions 702 of the sense layer 512 (or that can otherwise be detected by the sense layer 512). Because a single sense layer 512 is used to detect the distance between it and two different drive layers 505, 515, the force sensing device 500 needs to differentiate between signals from the first drive layer 505 and the second drive layer 515. Accordingly, the signals from the first and second drive layers 505, 515 may have different frequencies, amplitudes, phases, or other properties such that the signals they induce in the sense layer 512 are differentiable from one another. More particularly, the signal applied to the first drive layer 505 may have a first frequency, and the signal applied to the second drive layer 515 may have a second frequency different from the first frequency. Alternatively or additionally, the first and second drive layers 505, 515 may be excited (e.g., with an edge signal) at different times, such that the signal induced in the sense layer 512 can be attributed to one or the other drive layer. For example, sensing circuitry may alternate between exciting the first and second drive layers 505, 515. These (or other) techniques may be used so that the distance between the first drive layer 505 and the sense layer 512 can be detected independently of the distance between the second drive layer 515 and the sense layer 512.

The drive regions 704 may be electrically isolated from one another, or they may be electrically coupled to one another. In embodiments where the drive regions 704 are electrically coupled to one another, all of the drive regions 704 may be simultaneously excited by a single signal.

Alternatively, where the drive regions 704 are electrically isolated, they may be driven or excited independently of one another. This may be useful when not all of the sensing regions 702 are analyzed at a time. More particularly, circuitry associated with the force sensing device 500 may cyclically poll subsets of the sensing regions 702. The drive regions 704 may therefore correspond to the polled groups of sensing regions 702, and a signal may be provided to drive regions 704 while the corresponding group of sensing regions 702 is being polled. This may help to reduce power consumption by the force sensing device 500 when a cyclic polling technique is used, as not all of the drive regions 704 will be energized when the corresponding sensing regions 702 are not being polled.

The drive layers 505, 515 and the sense layer 512 may be distinct layers or components, as shown in FIG. 7, or they may be incorporated into other layers or components. For example, the first drive layer 505 may be a conductive material coated on, applied to, or otherwise incorporated with a polarizing filter that is part of the upper stack 304 (FIG. 3A). Indeed, the conductive material of any of the sense and drive layers may be incorporated on another component or layer of the electronic device in which it is incorporated. Alternatively, the sense and drive layers may be formed separately, such as by applying a conductive material on substrate such as a flexible circuit material (e.g., polyimide, polyethylene terephthalate, polyether ether ketone, or transparent conductive polyester), and then incorporating the substrate into the electronic device.

Figure 8:
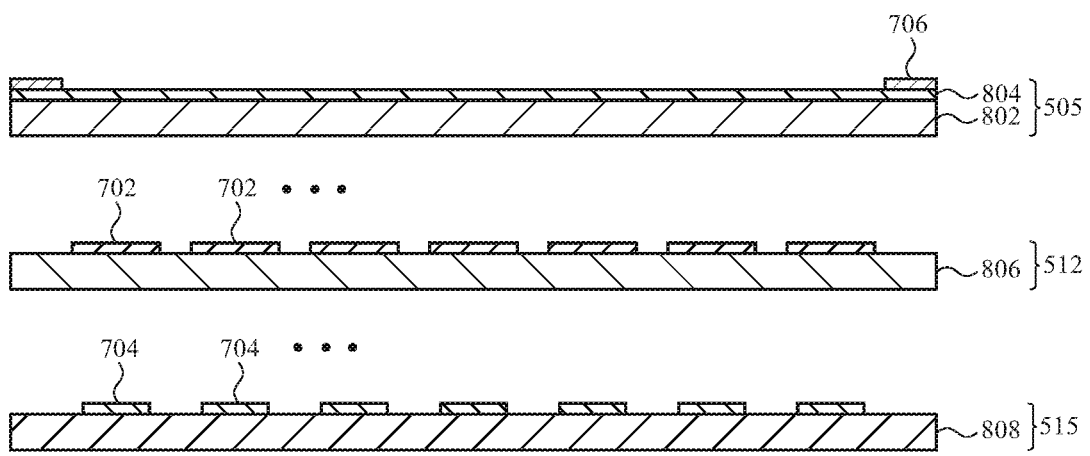
FIG. 8 shows a partial cross-sectional view of the sensing elements of FIG. 7 viewed along line C-C in FIG. 7.

FIG. 8 is a partial cross-sectional view of the first and second drive layers 505, 515 and the sense layer 512, viewed along line C-C in FIG. 7, illustrating relative sizes and positions of the sensing and drive regions 702, 704 of the force sensing device 500. The first drive layer 505 includes a substrate 802, a conductive layer 804, and the connection element 706. The substrate 802 may be any appropriate material or component, such as a flexible circuit material, a polarizing filter, or any other material or component of an electronic device or display stack. The conductive layer 804 may be ITO, a layer of metallic or conductive nanowire, or any other appropriate material, as described above. The conductive layer 804 may be a continuous sheet (e.g., having a single expanse of conductive material, rather than a segmented or pixelated configuration) that overlaps multiple sense regions 702. The connection element 706 may be a conductive material such as copper, silver, nickel vanadium, or the like.

The sense layer 512 may include a substrate 806, which may be any appropriate material or component, such as flexible circuit material, and the sensing regions 702. As described above, the sensing regions 702 may be formed from or include any appropriate material, including ITO, conductive nanowire, or the like.

The second drive layer 515 may include a substrate 808, which may be any appropriate material or component, such as flexible circuit material, and the drive regions 704. The drive regions 704 and the sensing regions 702 of the sense layer 512 may be sized and positioned relative to one another such that the sensing regions 702 shield the drive regions 704 from sources of interference such as the first drive layer 505. For example, the drive regions 704 may be substantially the same width as, or narrower than, the sensing regions 702, and may be vertically aligned with the sensing regions 702 (with the positional terms being relative to the orientation of the layers in FIG. 8). In this way, the conductive material of the sensing regions 702 may substantially shield the drive regions 704 from the first drive layer 505 or other potential sources of interference above the sense layer 512. Some portions of the drive regions 704 may not be directly covered by a sensing region 702. However, the unshielded area of the substantially rectangular drive regions 704 is significantly less than would be present if the second drive layer 515 were a single continuous sheet of conductive material, such as that on the first drive layer 505.

FIG. 8 shows the sensing regions 702 and the drive regions 704 extending above the surface of their respective substrates. This is merely one example configuration, however. Indeed, the sensing and drive regions 702, 704 may be substantially flush with or recessed in their respective substrates.

Figure 9:
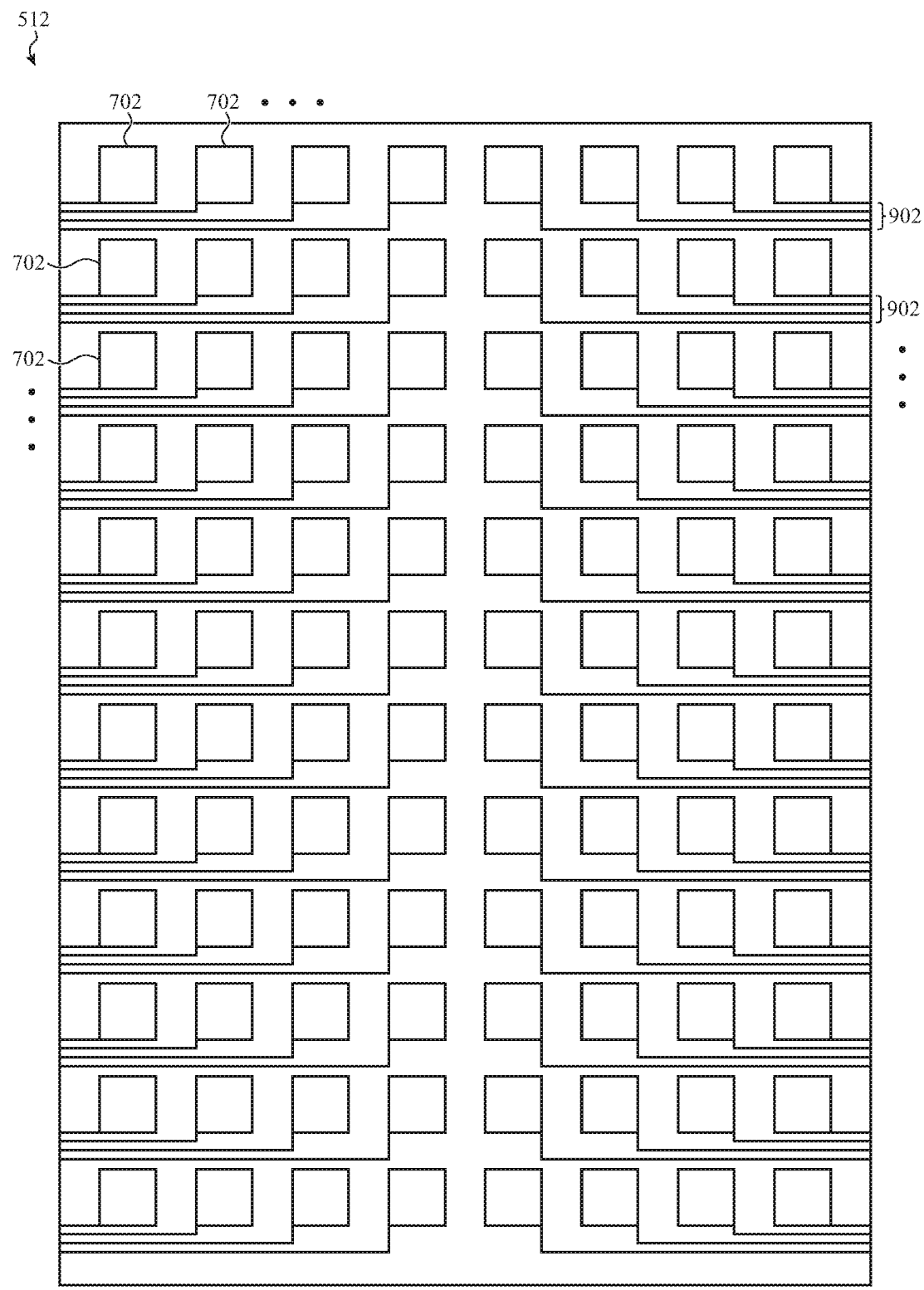
FIG. 9 shows a sensing element of the force sensing device of FIG. 5.

FIG. 9 shows the sense layer 512 with an example distribution of sensing regions 702. FIG. 9 also shows conductive paths 902 that may electrically couple the sensing regions 702 to other electronic components or circuits. The conductive paths 902 may be any appropriate material and may be formed in any appropriate way. For example, they may be formed from ITO applied using a photolithography technique. Other materials and techniques are also contemplated. In embodiments where the sensing regions 702 are independently polled to provide unique force values for a particular display location (as shown in FIG. 9), each sensing region 702 may be connected to a unique conductive path 902. In embodiments where multiple sensing regions 702 are polled or monitored as a single unit, those sensing regions 702 may share or be connected to a common conductive path 902 (not shown). The pattern of sensing regions 702 and conductive paths 902 shown in FIG. 9 is merely one example of a suitable configuration, and other configurations, including the number and arrangement of the sensing regions 702 and conductive paths 902, are also contemplated.

Figure 10A:
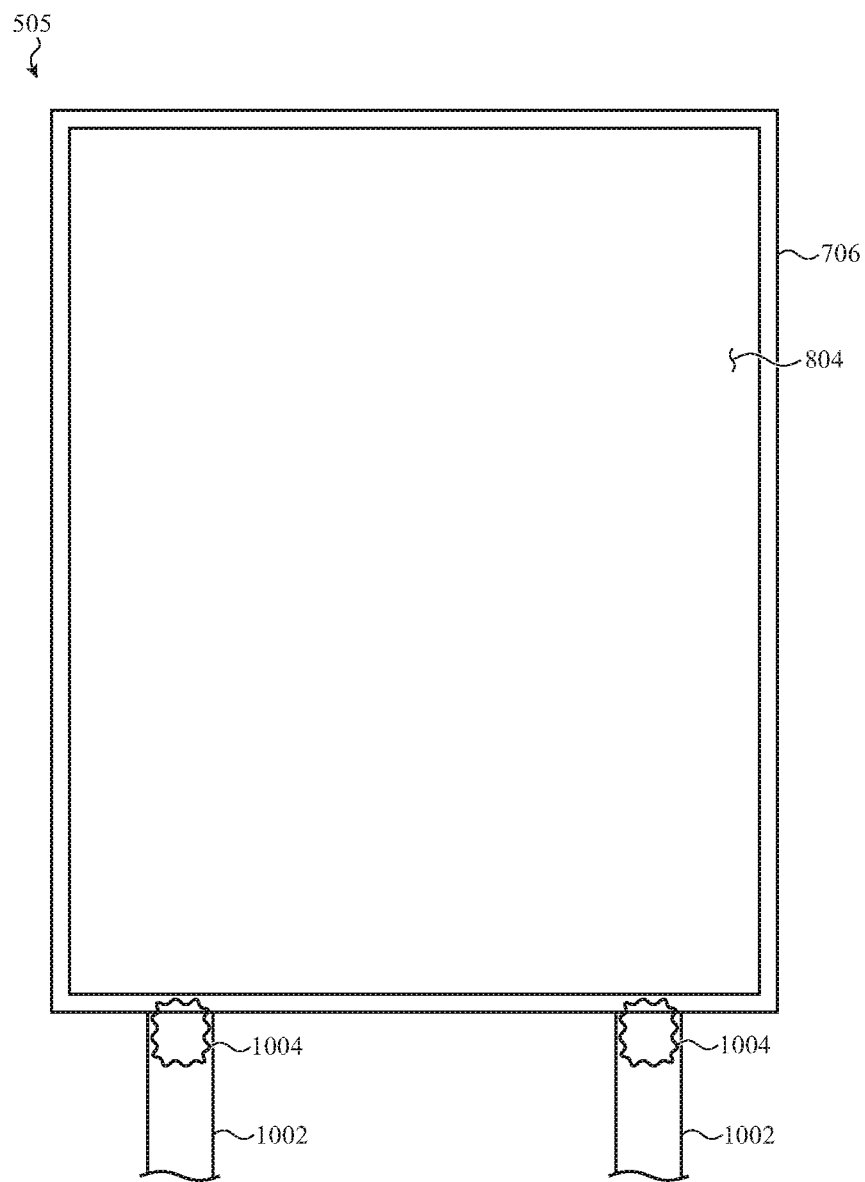
FIGS. 10A-10B show embodiments of another sensing element of the force sensing device of FIG. 5.

FIG. 10A shows the first drive layer 505, illustrating an example configuration of an electrical connection to the conductive layer 804 of the first drive layer 505 via the connection element 706 (e.g., a conductive strip or border around the first drive layer 505). In particular, FIG. 10A illustrates a pair of connector segments 1002 positioned proximate the connection element 706. Each connector segment 1002 may be formed from or include an electrical conductor that is electrically connected to a signal generator or other electronic circuitry. For example, the connector segment 1002 may be formed from a flexible circuit material with a metallic or conductive material (e.g., copper, gold, ITO) disposed thereon. In some cases, the connector segment 1002 may be formed substantially entirely of conductive material, such as when the connector segment 1002 is a strip of copper, silver, or any other metal or conductive material.

A conductive joining material 1004 may be deposited over connector segments 1002 and a portion of the connection element 706 such that an electrical connection is formed between the connector segments 1002 and the connection element 706. The conductive material may be any appropriate material, such as silver, gold, copper, conductive adhesives, or the like.

As noted above, the connection element 706 is electrically connected to the conductive layer 804. Accordingly, drive signals can be applied from the connector segments 1002 to the conductive layer 804. In some cases, more or fewer connector segments 1002 may be used to electrically couple circuitry to the conductive layer 804, or the connector segments 1002 may be positioned at different locations around the drive layer 505, such as along opposite edges of the drive layer 505.

Figure 10B:
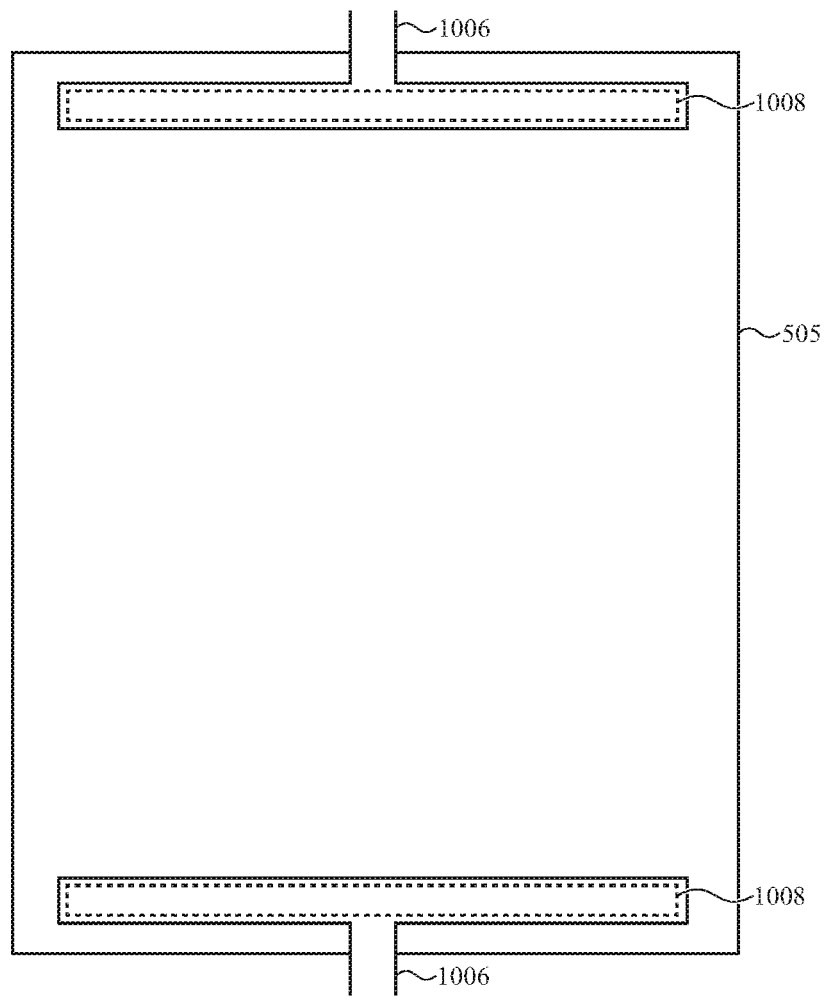

FIG. 10B shows the first drive layer 505, illustrating another example configuration of an electrical connection to the conductive layer 804 of the first drive layer 505. As shown, the first drive layer 505 does not include the connection element 706. In this example, instead of connecting to the conductive layer 804 via the connection element 706 (as shown in FIG. 10A), the connector segments 1006 connect to the conductive layer 804 via a conductive adhesive 1008. Like the connector segments 1002 (FIG. 10A), the connector segments 1006 may be formed from or include an electrical conductor that is electrically connected to a signal generator or other electronic circuitry. The connector segments 1006 may be electrically and physically coupled to the conductive layer 804 via the conductive adhesive 1008, which may be disposed between overlapping portions of the connector segments 1006 and the conductive layer 804. FIG. 10B illustrates an example embodiment where two connector segments 1006 couple to opposite sides of the first drive layer 505. Other configurations, including different numbers, sizes, shapes, and coupling locations of the connector segments 1006 are also contemplated. For example, in some cases, only one connector segment 1006 is used. In other cases, four connector segments 1006 are arranged around the first drive layer 505 (e.g., with one connector segment 1006 on each side of the first drive layer 505).

Figure 11:
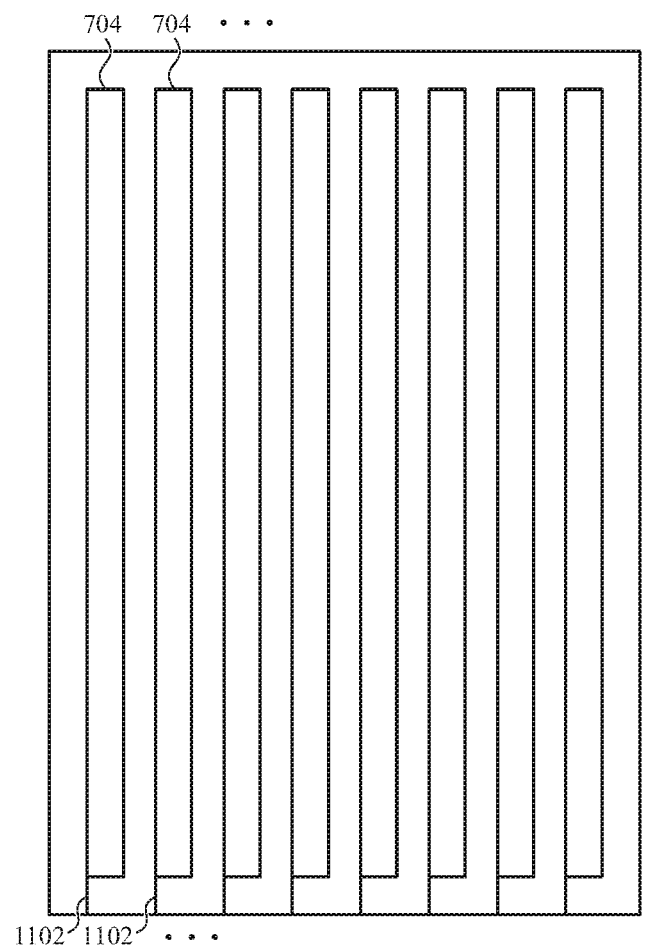
FIG. 11 shows yet another sensing element of the force sensing device of FIG. 5.

FIG. 11 shows the second drive layer 515, with an example distribution of drive regions 704. FIG. 11 also shows conductive paths 1102 that may electrically couple the drive regions 704 to other electronic components or circuits. The conductive paths 1102 may be any appropriate material and may be formed in any appropriate way. For example, they may be formed from ITO applied using a photolithography technique. Other materials and techniques are also contemplated. In embodiments where the drive regions 704 are independently driven or excited, as discussed above with respect to FIG. 8, each drive region 704 may be connected to a unique conductive path 1102. In embodiments where multiple drive regions 704 are driven or excited together (e.g., a signal is applied to multiple drive regions 704 simultaneously), those drive regions 704 may share or be connected to a common conductive path (not shown). The pattern of drive regions 704 and conductive paths 1102 shown in FIG. 11 is merely one example of a suitable configuration, and other configurations, including the number and arrangement of the drive regions 704 and conductive paths 1102, are also contemplated.

Figure 12:
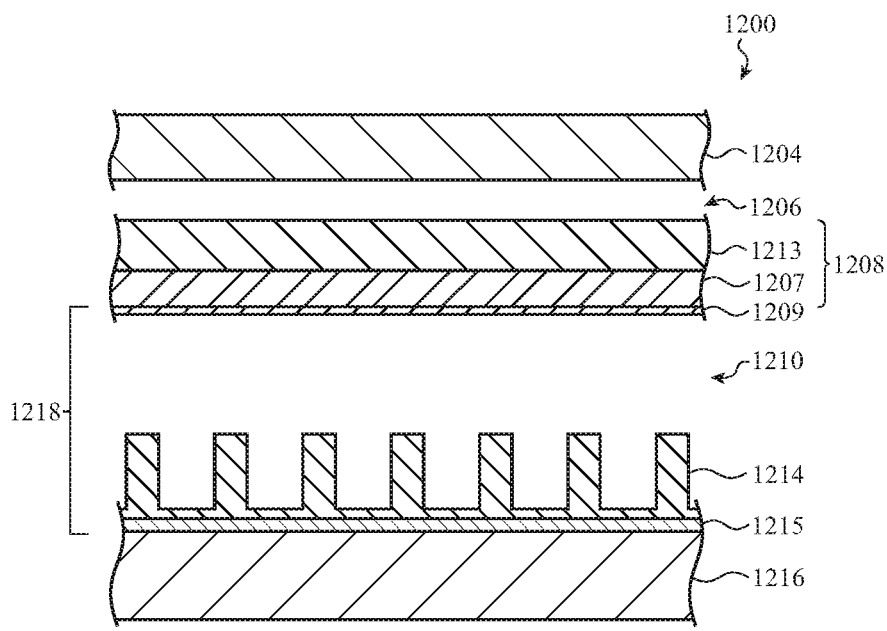
FIG. 12 shows a cross-sectional view of another example force sensing device viewed along line A-A in FIG. 1.

FIG. 12 is a partial cross-sectional view of an example force sensing device 1200 that may be incorporated in an electronic device (e.g., the devices 100, 200), depicting an area similar to the area 301 in FIG. 3A. The cover 303 and the housing 104 are omitted for clarity. While the force sensing device 1200 is similar to the force sensing device 500, the force sensing device 1200 has a different number and arrangement of sensing elements within the electronic device, as described herein.

The force sensing device 1200 includes an upper stack 1204, similar to the upper stack 304, which may include one or more layers or components of a display, including a liquid crystal matrix, light emitting diodes (LEDs), light guides, filters (e.g., polarizing filters), diffusers, electrodes, or the like. The upper stack 1204 may be configured to flex or be capable of flexing in response to an applied force on the force sensing device 1200.

A lower stack 1208 may be disposed below the upper stack 1204 and separated from the upper stack 1204 by an air gap 1206. The lower stack 1208 may include a frame member 1207 (similar to the frame member 309), an optical stack 1213 (similar to the optical stack 315 described above), and any other appropriate components, such as a light source. As described with respect to the assembly 300, the air gap 1206 may be any appropriate thickness, such as 25 to 100 microns. In embodiments where the force sensing device 1200 does not include a display or does not provide display functionality, the lower stack 1208 (as well as the upper stack 1204) may include different components or be omitted.

A first sensing element 1209 is coupled to the lower stack 1208. The first sensing element 1209 may be a capacitive sensing element that is configured to capacitively couple with another capacitive sensing element. For example, the first sensing element 1209 may be a drive layer that is capacitively coupled to a sense layer (e.g., the second sensing element 1215, described below) that facilitates detection of a distance between the sense and drive layers using mutual capacitance. As another example, the first sensing element 1209 may be a sense layer instead of a drive layer. As yet another example, the first sensing element 1209 may be configured to capacitively couple to a ground layer and facilitate detection of a distance between itself and the ground layer using self-capacitance. As yet another example, the first sensing element 1209 may be a ground layer that capacitively couples to a sense layer.

The first sensing element 1209 may be formed from or include any appropriate material, such as ITO traces disposed on a flexible substrate, and may be coupled to the lower stack 1208 in any appropriate way, such as with a PSA or HSA, or patterned directly onto the lower stack 1208. Because the first sensing element 1209 is below the lower stack 1208, the frame member 1207 of the lower stack 1208 may be formed from a conductive material, such as a metal. More particularly, because the frame member 1207 is not between the first sensing element 1209 and a second sensing element 1215 (discussed below), the frame member 1207 may not shield or otherwise negatively interfere with the capacitive coupling between the first and second sensing elements 1209, 1215. Accordingly, more materials may be suitable for use in the frame member 1207, and the frame member 1207 may define a continuous layer or panel, rather than having an opening therein to avoid undesirable shielding or interference.

An air gap 1210 and a deformable element 1214 may be disposed between the first sensing element 1209 and a second sensing element 1215. The air gap 1210 and the deformable element 1214 correspond to the air gap 510 and deformable element 514, and may have similar compositions, structures, dimensions, and functions.

The second sensing element 1215 may be capacitively coupled to the first sensing element 1209, and together these components may form a capacitive sensor 1218 that spans the air gap 1210 and the deformable element 1214 to detect deformation of these layers. The second sensing element 1215 may be a sense layer, a drive layer, or a ground layer, depending on the principle of operation of the capacitive sensor 1218 and/or the configuration of the first sensing element 1209.

The second sensing element 1215 may be coupled to a base structure 1216, which may be a frame, a bracket, a circuit board, a battery, an interior wall of a housing or enclosure, or the like, as described above with respect to the base structure 516 of FIG. 5.

Figure 13:
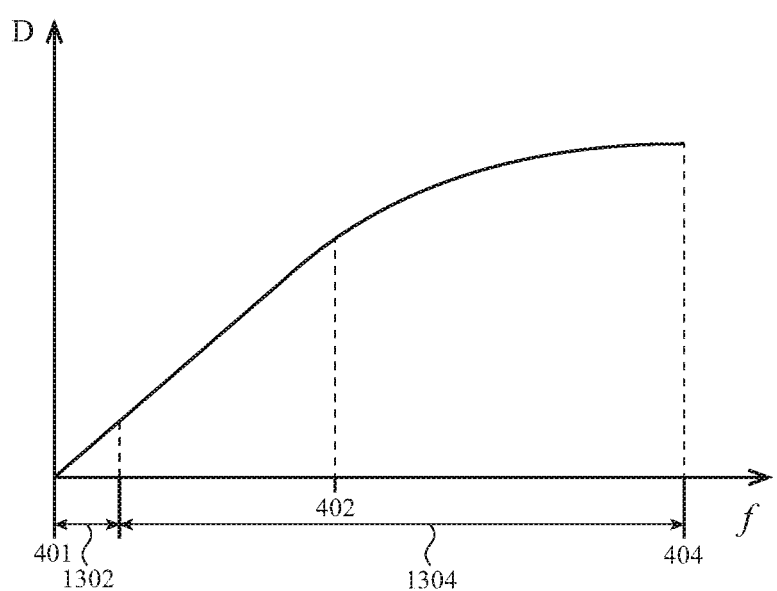
FIG. 13 shows a force versus deflection curve of the force sensing device of FIG. 12.

FIG. 13 is an example force versus deflection curve illustrating how the force sensing device 1200 in FIG. 12 deflects in response to a force input applied (directly or indirectly) to the upper stack 1204. The force response is similar to that shown in FIG. 4, with a first profile extending from point 401 to point 402 (corresponding to collapse of the air gaps 1206 and 1210) and a second profile extending from point 402 to point 404 (corresponding to deformation of the deformable element 1214).

As noted above, the force sensing device 1200 has one capacitive sensor 1218 formed by the first and second sensing elements 1209, 1215. The first and second sensing elements 1209, 1215 span the air gap 1210 and the deformable element 1214, but do not span the air gap 1206. Thus, the capacitive sensor 1218 does not detect deflection of the upper stack 1204 that causes the air gap 1206 to collapse (corresponding to line 1302 in FIG. 13), but does detect deflection that causes the air gap 1210 to collapse and the deformable element 1214 to be deformed (corresponding to line 1304 in FIG. 13). Accordingly, the collapse of the air gap 1206 is decoupled from the collapse of the air gap 1210, and a force detected using the capacitive sensor 1218 of the force sensing device 1200 corresponds to the force required to collapse the air gap 1210.

Because the capacitive sensor 1218 spans both the air gap 1210 and the deformable element 1214, sensing circuitry coupled to the first and second sensing elements 1209, 1215 may be configured to algorithmically determine when the air gap 1210 has fully collapsed. For example, the sensing circuitry may monitor a rate of change of deformation (e.g., a slope of the force versus deflection curve) as a force is applied. If the slope satisfies a first condition (e.g., it is constant or it is below a threshold value), the sensing circuitry may determine that only the air gap 1210 is being or has been collapsed, and may apply a first force-deflection correlation. If the slope satisfies a second condition (e.g., it is increasing or it is above the threshold value), the sensing circuitry may determine that the air gap 1210 has been fully collapsed and the deformable element 1214 is about to be deformed or has been at least partially deformed. In the latter case, the sensing circuitry may apply a second force-deflection correlation to determine a value of the applied force.

Figure 14:
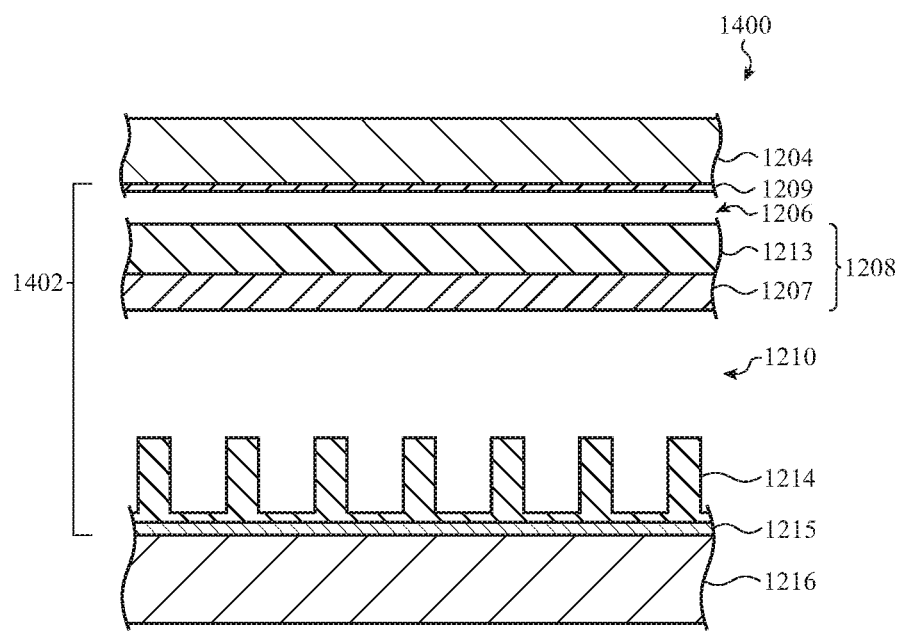
FIG. 14 shows a cross-sectional view of yet another example force sensing device viewed along line A-A in FIG. 1.
Figure 15:
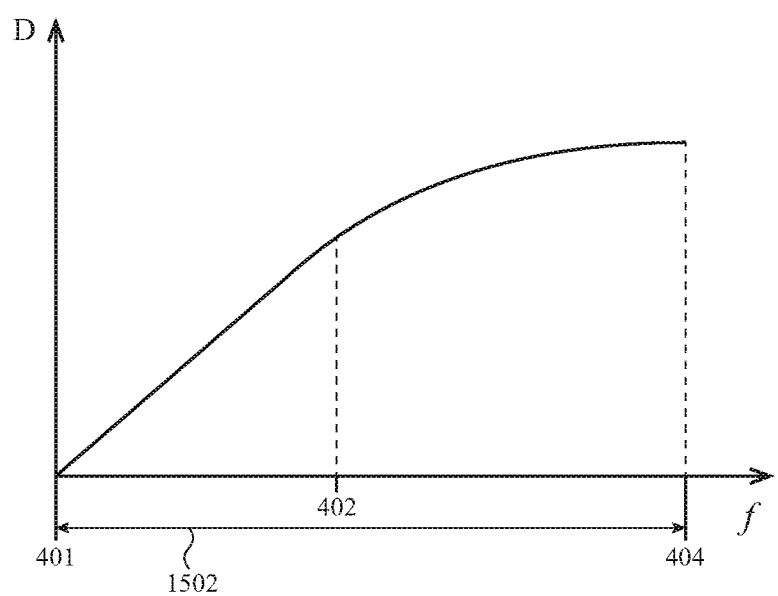
FIG. 15 shows a force versus deflection curve of the force sensing device of FIG. 14.

FIG. 14 is a partial cross-sectional view of an example force sensing device 1400 that may be incorporated in an electronic device (e.g., the devices 100, 200), depicting an area similar to the area 301 in FIG. 3A. In this example, the force sensing device 1400 is the same as the force sensing device 1200 except that the first sensing element 1209 is coupled to the upper stack 1204 such that the capacitive sensor 1402 formed by the first and second sensing elements 1209, 1215 spans both the air gap 1206 and the air gap 1210. Accordingly, as illustrated in the force versus deflection curve in FIG. 15, the capacitive sensor 1402 detects deflection of the upper stack 1204 from point 401 to point 404 (corresponding to line 1502). Moreover, as described herein, sensing circuitry may be configured to algorithmically determine when the air gap 1210 and optionally the air gap 1206 have fully collapsed in order to apply an appropriate force-deflection correlation.

Whereas in FIG. 12, the frame member 1207 was not between the first and second sensing elements 1209, 1215, in FIG. 14 the frame member 1207 is between the first and second sensing elements 1209, 1215. Accordingly, the frame member 1207 may be formed from a dielectric material or may have an opening in which a dielectric material is positioned such that the frame member 1207 does not shield or otherwise interfere with the sensing elements 1209, 1215.

Figure 16:
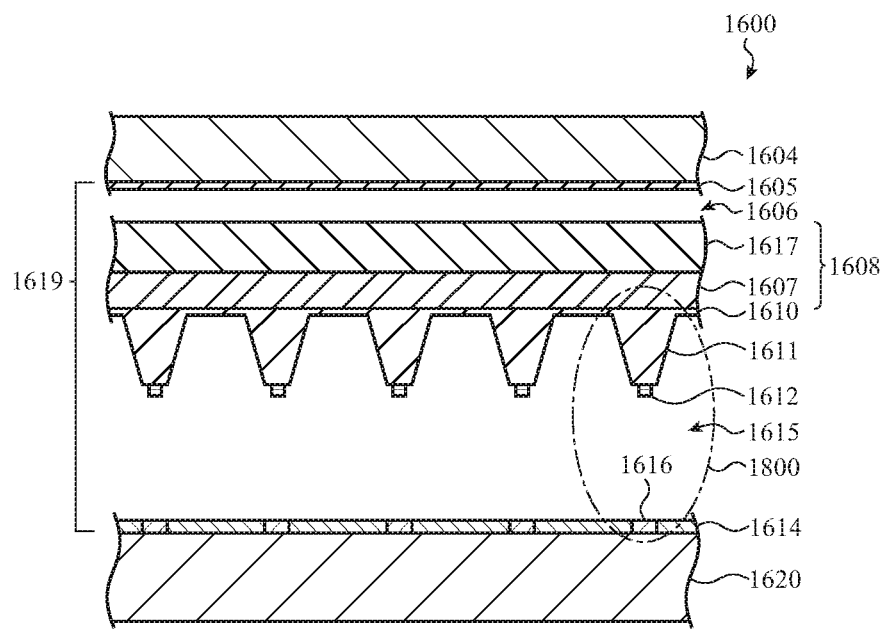
FIG. 16 shows a cross-sectional view of yet another example force sensing device viewed along line A-A in FIG. 1.

FIG. 16 is a partial cross-sectional view of an example force sensing device 1600 that may be incorporated in an electronic device (e.g., the devices 100, 200), depicting an area similar to the area 301 in FIG. 3A. In this example, the force sensing device 1600 includes an upper stack 1604 (corresponding to the upper stack 1204), a first sensing element 1605 (corresponding to the first sensing element 1209), an air gap 1606 (corresponding to the air gap 1206), a lower stack 1608 (corresponding to the lower stack 1208), a deformable element 1610, an air gap 1615, a second sensing element 1614, and a base structure 1620 (corresponding to the base structure 1216). The lower stack 1608 may include an optical stack 1617 and a frame member 1607 supporting the optical stack 1617 and coupling the lower stack 1608 to the upper stack 1604. Because the frame member 1607 is between the first and second sensing elements 1605, 1614 (similar to the configuration in the force sensing device 500, FIG. 5), the frame member 1607 may be formed from or include a dielectric material, such as a dielectric material disposed in an opening in the frame member 1607.

Figure 17:
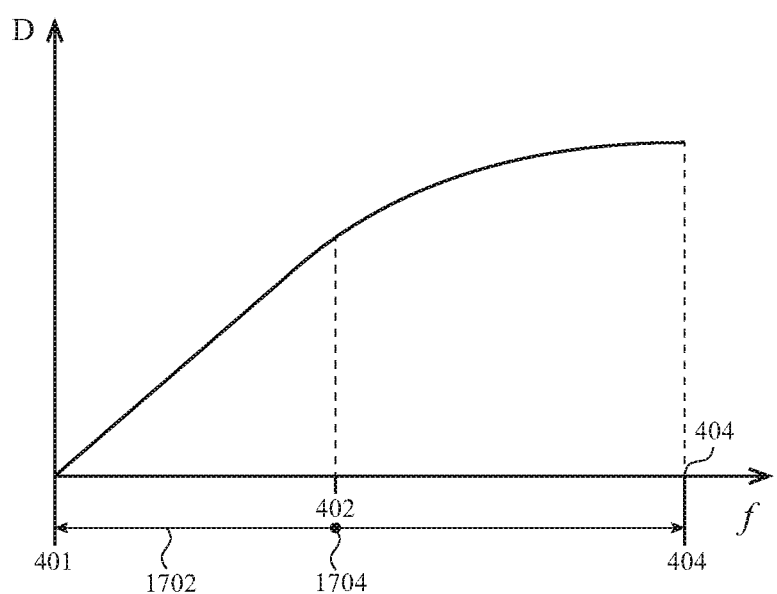
FIG. 17 shows a force versus deflection curve of the force sensing device of FIG. 16.

The first and second sensing elements 1605, 1614 form a capacitive sensor 1619 that spans both the air gap 1606 and the air gap 1615. Thus, like in the force sensing device 1400, the capacitive sensor 1619 detects deformation that corresponds to the collapse of both air gaps 1606, 1615, as well as the deformable element 1610. Accordingly, as illustrated in the force versus deflection curve in FIG. 17, the capacitive sensor 1619 detects deflection of the upper stack 1604 from point 401 to point 404, corresponding to line 1702.

The force sensing device 1600 also includes a contact sensor that is configured to detect contact between the upper and lower stacks. As shown in FIG. 16, the contact sensor is integrated with the deformable element 1610 and the second sensing element 1614. For example, the deformable element 1610 may include protrusions 1611 extending from a base portion of the deformable element 1610. The protrusions 1611 may include a sense element 1612 that is configured to be sensed or otherwise detected by a contact sensing region (e.g., a contact sensing region 1616, discussed herein) when the air gap 1615 has been fully collapsed and the deformable element 1610 contacts the second sensing element 1614. As shown in FIG. 16, the sense elements 1612 are disposed at free ends of the protrusions 1611.

The sense elements 1612 may be formed from any appropriate material and may have any appropriate size and shape. These properties, as well as any other property of the sense elements 1612, may be selected based on the principle of operation of the contact sensor. For example, if a contact sensing region 1616 is a capacitive sensor, the sense elements 1612 may be a conductive material, and/or a dielectric material. A suitable dielectric material may have a dielectric constant (or relative permittivity) greater than about 3.9 (e.g., a high-k dielectric material). Where the contact sensing region 1616 is a continuity sensor, the sense elements 1612 may be a conductive material such as carbon, metal, or the like.

The sense elements 1612 may be incorporated in the deformable element 1610 in any appropriate way. For example, the sense elements 1612 may be co-molded with the deformable element 1610. In another example, the sense elements 1612 may be deposited on the deformable element 1610. For example, a layer or layers of metal (or any other appropriate material) may be deposited on free ends of the protrusions 1611. In yet another example, the deformable element 1610 may be formed of a material that is itself configured to be sensed by a corresponding contact sensing region 1616, and thus discrete sense elements 1612 may not be used. For example, the material may be a silicone or other elastomer with conductive particles, such as carbon, embedded therein. Other materials and techniques for integrating the materials with the deformable element 1610 are also contemplated.

The contact sensor of the force sensing device 1600 also includes contact sensing regions 1616 that are configured to detect the sense elements 1612 to determine when the air gap 1615 has been fully collapsed and the deformable element 1610 has begun to be compressed. The contact sensing regions 1616 may be configured to detect the sense elements 1612 in any appropriate way. For example, the contact sensing regions 1616 may include capacitive sensing components that are configured to detect a change in capacitance caused by the proximity of the sense elements 1612 to the contact sensing regions 1616. As another example, the contact sensing regions 1616 may include electrical switches that are configured to detect a closed circuit when a conductive sense element 1612 contacts the electrical switches.

The contact sensing regions 1616 may be integrated with the second sensing element 1614. For example, the contact sensing regions 1616 for the contact sensor and sensing regions for the capacitive sensor 1619 (e.g., a capacitive force sensor) may be patterned on or otherwise incorporated in the same substrate. As another example, the contact sensing regions 1616 may be disposed on top of the second sensing element 1614. For example, contact sensing regions 1616 comprising electrical contacts, capacitive sensing components, or the like may be placed on top of and optionally adhered to the second sensing element 1614.

Similar to the force sensing device 1400 in FIG. 14, the force sensing device 1600 forms a capacitive sensor 1619 that spans both the air gap 1615 and the deformable element 1610, and thus the capacitive sensor 1619 exhibits a force response curve (shown in FIG. 17) that extends from point 401 to point 404 (corresponding to line 1702). However, the capacitive sensor 1619 may not provide a discrete indication when the force sensing device 1600 is operating in the first force profile (e.g., from point 401 to point 402) or the second force profile (e.g., from point 402 to point 404). The contact sensor of the force sensing device 1600 provides this indication, allowing sensing circuitry to apply an appropriate force-deflection correlation. For example, before the air gap 1615 is fully collapsed and before the contact sensor indicates a contact event (corresponding to point 1704 in FIG. 17), the sensing circuitry may apply a first force-deflection correlation corresponding to the collapse of the air gap 1615 (from point 401 to point 402). After the air gap 1615 has fully collapsed, as detected and indicated by a signal from the contact sensor (at point 1704), the sensing circuitry may apply a second force-deflection correlation corresponding to compression of the deformable element 1610 (e.g., from point 402 to point 404).

While FIG. 16 illustrates an embodiment where the first sensing element 1605 is disposed on the upper stack 1604, and thus includes the air gap 1606 in the space between the first and second sensing elements 1605, 1614, other configurations are possible. For example, the first sensing element 1605 may be disposed on the lower stack 1608 on the opposite side of the air gap 1606, or it may be disposed between the lower stack 1608 and the deformable element 1610. Regardless of where the first and second sensing elements 1605, 1614 are located in the force sensing device 1600, an air gap, a deformable element, and a contact sensor may be disposed between them. Moreover, FIG. 16 illustrates the deformable element 1610 positioned on the lower stack 1608, with the protrusions 1611 extending towards the base structure 1620, and illustrates the contact sensing regions 1616 positioned on the base structure 1620. In other embodiments, the relative positioning of these components may be exchanged, such that the deformable element 1610 is positioned on the base structure 1620 with the protrusions 1611 extending towards the lower stack 1608, and the sensing regions 1616 are positioned on the lower stack 1608. It will be understood that this modification may produce an equivalent result at least with respect to the operation of the deformable element 1610 and the contact sensing regions 1616.

Figure 18A:
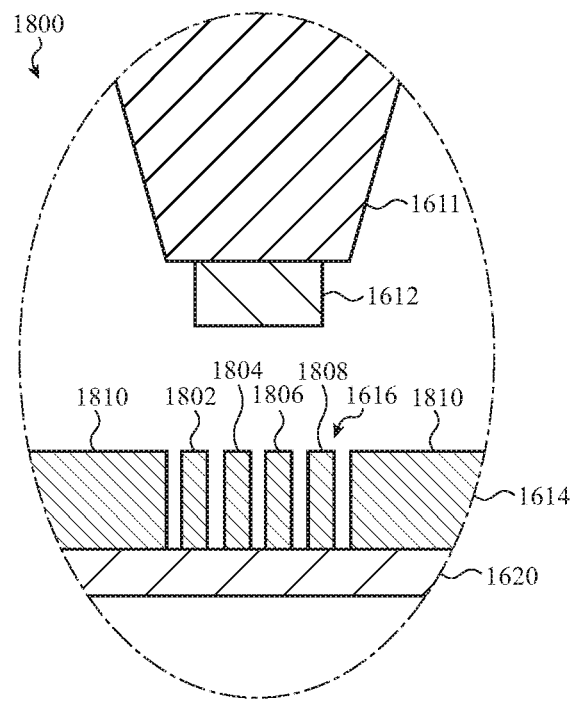
FIGS. 18A-18B show expanded cross-sectional views of the force sensing device of FIG. 17.

FIG. 18A is an expanded view of the area 1800 in FIG. 16, showing an example configuration of the protrusions 1611, sense elements 1612, and contact sensing regions 1616 that may form the contact sensor in FIG. 16. The second sensing element 1614 may include sensing regions 1810, such as capacitive plates or leads that capacitively couple to a ground or drive layer, as well as the contact sensing regions 1616. The contact sensing region 1616 in FIG. 18A includes leads 1802, 1804, 1806, and 1808. The leads may be any appropriate material (such as traces of conductive material (e.g., metal, carbon, ITO), wires, plates, pads, or the like), and may be coupled to appropriate circuitry for detecting contact with or proximity to the sense element 1612. For example, the leads may be capacitive elements that facilitate detection of a change in capacitance resulting from the sense element 1612 being brought into contact with or proximity to the leads. As another example, the leads may be electrical contacts that facilitate detection of a closed circuit between two or more contacts.

Figure 18B:
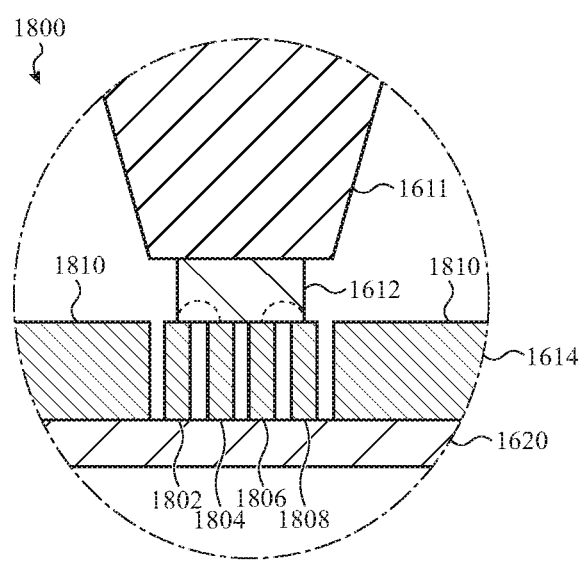

FIG. 18B illustrates the area 1800 in FIG. 16 when the air gap 1615 has been fully collapsed and the deformable element 1610 is in contact with the second sensing element 1614. As shown, the proximity or contact between the sense element 1612 and the leads 1802, 1804, 1806, and 1808 results in detection by corresponding pairs of the leads 1802, 1804, 1806, and 1808. While FIGS. 18A-18B illustrate four leads, this is merely an example, and more or fewer leads may be used. Moreover, the relative sizes of the contact sensing region 1616, the sense element 1612, and the leads 1802, 1804, 1806, and 1808 are merely exemplary, and may be selected based on various factors and considerations. For example, the contact sensing regions 1616 may be large enough to accommodate misalignments between the deformable elements 1610 and the contact sensing regions 1616. Thus, even if the centers of the protrusions 1611 and the contact sensing regions 1616 do not line up exactly, the contact sensor will still effectively detect when the air gap 1615 has fully collapsed.

Figure 19:
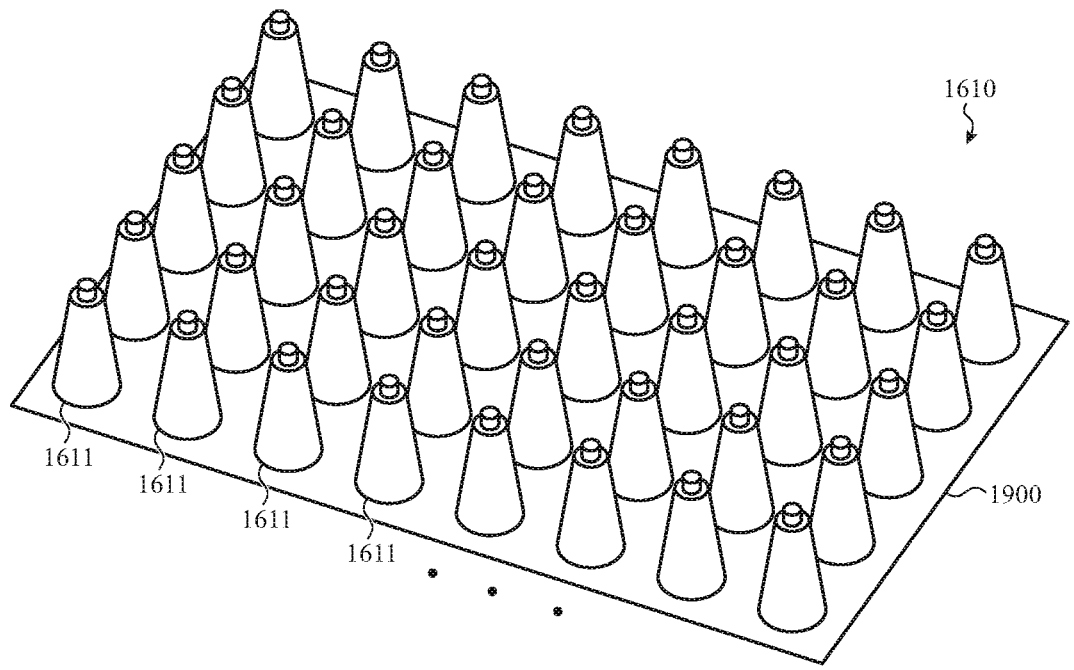
FIG. 19 shows a perspective view of a deformable element.

FIG. 19 shows an example of the deformable element 1610, or a portion thereof. The deformable element 1610 comprises an array of protrusions 1611 extending from a base surface 1900. The protrusions 1611 may be integrally formed with the base surface 1900. For example, the deformable element 1610 may be molded (e.g., injection molded) as a unitary, monolithic component of a substantially uniform composition. As noted above, the sense elements 1612 may be co-molded with the deformable element 1610 or they may be applied (e.g., adhered, coated, or deposited) to or on the protrusions 1611 after the deformable element 1610 is formed. In either case, the sense elements 1612 may be at least partially embedded in the protrusions 1611. Other techniques for securing the sense elements 1612 to the protrusions 1611 are also contemplated. It will be understood that the protrusions 1611 are for illustrative purposes, and are not necessarily to scale relative to the size of the base surface 1900 or any other components depicted in the figures.

Figure 20:
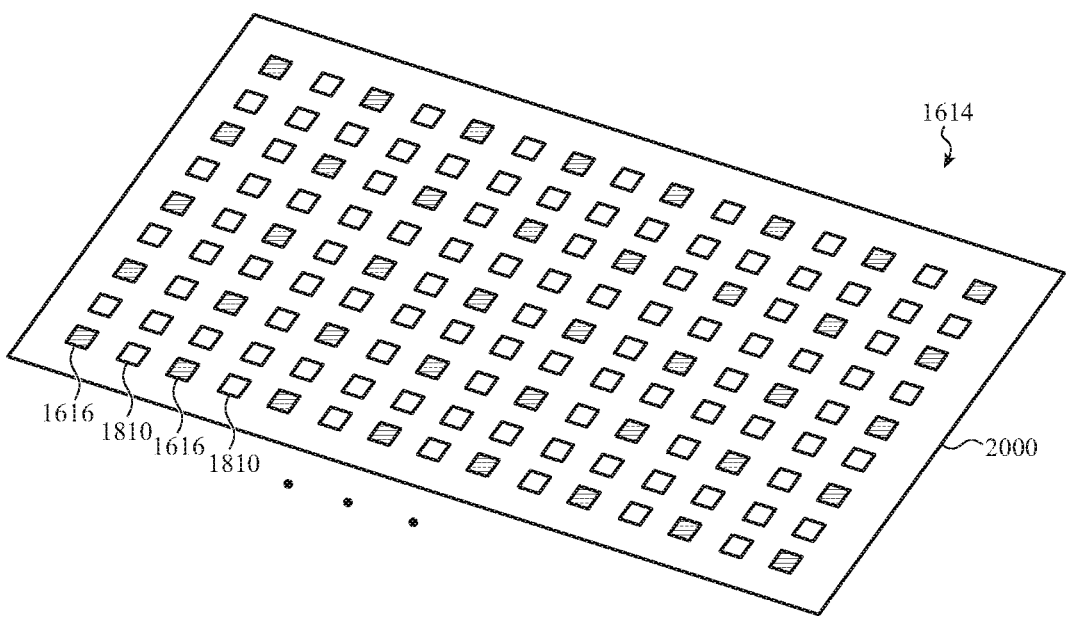
FIG. 20 shows a perspective view of a sensing element.

FIG. 20 shows an example of the second sensing element 1614, or a portion thereof, that includes both sensing regions 1810 (indicated by plain squares) and contact sensing regions 1616 (indicated by cross-hatched squares), and which may be used in conjunction with the deformable element 1610 shown in FIG. 19. Both the sensing regions 1810 and the contact sensing regions 1616 may be formed on the same substrate 2000 (e.g., a flexible circuit material), and may include conductive traces, such as metals, carbon, ITO, or the like.

In the examples shown in FIGS. 19 and 20, each protrusion 1611 includes a sense element 1612 and corresponds to a contact sensing region 1616 on the second sensing element 1614. This need not be the case, however, as the considerations that determine the amount, arrangement, and distribution of the protrusions 1611 that provide a suitable resistance to compression may be different than the considerations driving the amount, arrangement, and distribution of contact sensing regions. For example, in some implementations, some of the protrusions 1611 do not correspond to contact sensing regions 1616. In such cases, the protrusions 1611 that do not correspond to contact sensing regions 1616 may omit the sense element 1612, but may be formed or shaped to ensure that all of the protrusions 1611 have substantially the same height. Alternatively, all of the protrusions 1611 may include a sense element 1612 regardless of whether they all correspond to a contact sensing region 1616. This may ensure that all of the protrusions have the same height and contact an opposing surface at substantially the same time.

Figure 21A:
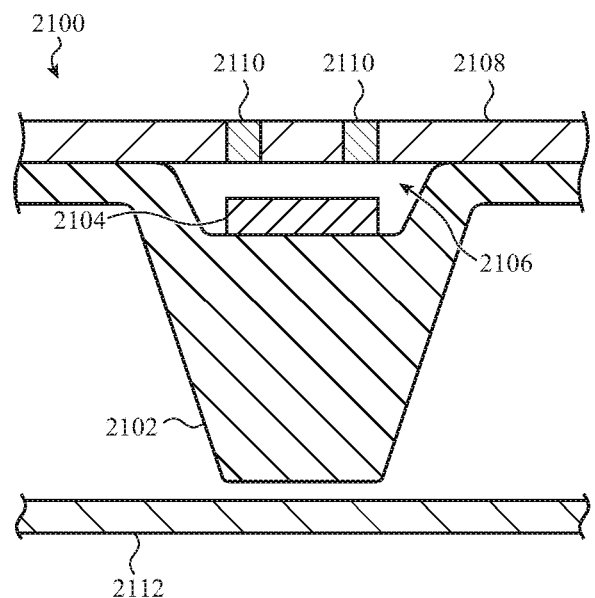
FIGS. 21A-21B show cross-sectional views of an example contact sensor.

FIG. 21A is a cross-sectional view of an example contact sensor 2100, showing a section similar to those shown in FIGS. 18A-18B. Whereas the contact sensor formed by the protrusions 1611 and the contact sensing regions 1616 shown in FIGS. 18A-18B places the sensing component and the sensed component on opposite sides of the air gap 1615, the contact sensor 2100 is configured such that both the sensed and sensing components can be disposed on one side of an air gap.

The contact sensor 2100 includes a deformable protrusion 2102, which may be formed of any appropriate deformable material, such as silicone, polyurethane foam, rubber, gel, or the like. A sense element 2104 may be incorporated with the protrusion 2102. For example, the sense element 2104 may be placed within a cavity 2106 or other internal region of the protrusion 2102. The sense element 2104 may also be embedded in the material of the protrusion 2102 (e.g., via co-molding or insert molding). Like the sense element 1612, the sense element 2104 may be formed from or include any appropriate material, such as a dielectric material and/or a conductive material.

The contact sensor 2100 also includes leads 2110 in an adjacent layer 2108. The adjacent layer 2108 may be a sensing element, such as the sensing element 1614, in or on which the leads 2110 are incorporated. Alternatively, the adjacent layer 2108 may be dedicated to containing the leads 2110. Like the leads 1802, 1804, 1806, and 1808 in FIGS. 18A-18B, the leads 2110 may be configured to act as capacitive elements (e.g., capacitive plates to capacitively couple to and detect the proximity of the sense element 2104), contacts for a continuity sensor, or the like. Moreover, the leads 2110 may be formed from or include any appropriate material, such as traces of conductive material (e.g., metal, carbon, ITO), wires, plates, pads, or the like. The leads 2110 may be coupled to appropriate circuitry for detecting contact with or proximity to the sense element 2104.

Where the contact sensor 2100 is a capacitive sensor, physical contact between the leads 2110 and the sense element 2104 may not be necessary to detect contact between the protrusion 2102 and another component. Rather, when the protrusion 2102 contacts another component (e.g., because an adjacent air gap has been fully collapsed), the leads 2110, along with associated circuitry, may detect the change in distance between the sense element 2104 and the leads 2110, thereby triggering the contact sensor 2100. In such cases, the cavity 2106 may be filled with a deformable material, such as silicone, thereby encapsulating the sense element 2104.

Figure 21B:
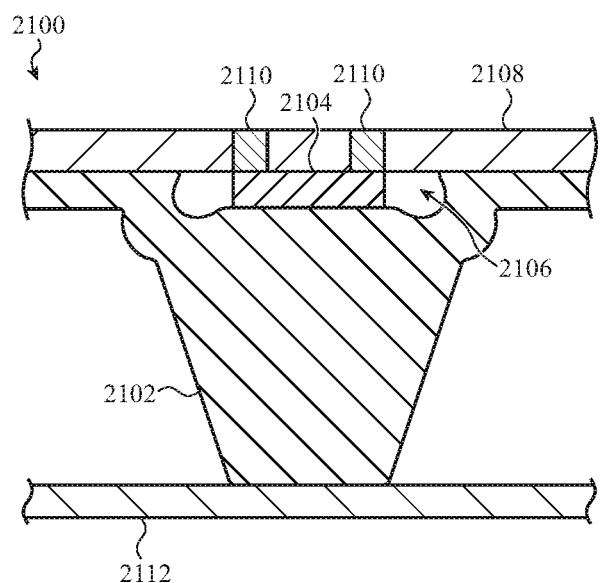

FIG. 21B illustrates the contact sensor 2100 after the protrusion 2102 has been deformed by a layer 2112 forming an opposite side of an air gap in which the protrusion 2102 has been disposed. As shown, the sense element 2104 has been brought into contact with the leads 2110, thus triggering the contact sensor 2100. It may not be necessary for the sense element 2104 to actually contact the leads 2110, however, in order for the contact sensor 2100 to be triggered. For example, where the leads 2110 are configured as capacitive sensors (or any other type of sensor capable of detecting a change in distance between it and another object), the contact sensor 2100 may be triggered by any detectable change in distance between the sense element 2104 and the leads 2110 caused by the layer 2112 deforming or otherwise contacting the protrusion 2102.

Figure 22A:
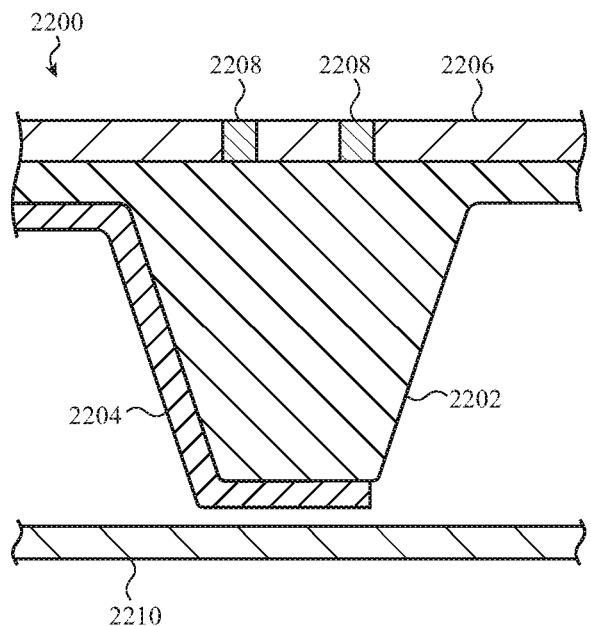
FIGS. 22A-22B show cross-sectional views of another example contact sensor.

FIG. 22A is a cross-sectional view of an example contact sensor 2200, showing a section similar to those shown in FIGS. 18A-18B. Whereas the contact sensor formed by the protrusions 1611 and the contact sensing regions 1616 shown in FIGS. 18A-18B places the sensing component and the sensed component on opposite sides of the air gap 1615, the contact sensor 2200 is configured such that both the sensed and sensing components can be disposed on one side of an air gap.

The contact sensor 2200 includes a deformable protrusion 2202, which may be formed of any appropriate deformable material, such as silicone, polyurethane foam, rubber, gel, or the like. A sense element 2204 may be disposed over the protrusion 2202. For example, a material may be disposed over at least a portion of the protrusion 2202, such as by coating, deposition (e.g., physical vapor deposition or chemical vapor deposition), or any other appropriate mechanism. The contact sensor 2200 also includes leads 2208 in a layer 2206 that is proximate the protrusion 2202.

The leads 2208 may be configured to act as capacitive elements that capacitively couple to the sense element 2204, thereby sensing changes in distance from the leads 2208 to the sense element 2204. Accordingly, the sense element 2204 may be formed from or include a conductive material, a dielectric material (e.g., a high-k dielectric material), or any other appropriate material that may be capacitively coupled to and sensed by the leads 2208.

Figure 22B:
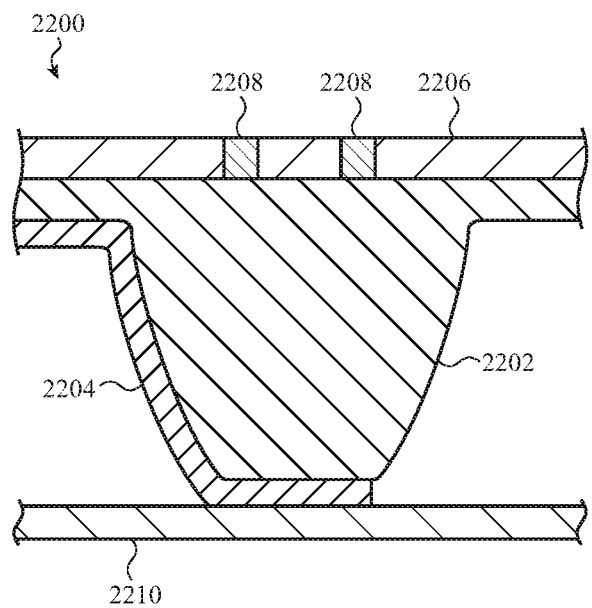

FIG. 22B illustrates the contact sensor 2200 after the protrusion 2202 has been deformed by a layer 2210 forming an opposite side of an air gap in which the protrusion 2202 is disposed. As shown, the sense element 2204 has been brought into closer proximity to the leads 2208, thus triggering the contact sensor 2200.

The contact sensors 2100, 2200 may be used instead of or in conjunction with the contact sensors described with respect to FIGS. 18A-20. For example, instead of the protrusions 1611 and the sensing regions 1616, which together form a contact sensor to detect contact with the deformable element 1610, the deformable element 1610 may include a plurality of contact sensors 2100 or 2200 that serve the same or a similar function.

The contact sensing systems described herein may be applied between any of the layers or components of a force sensing device. For example, while FIG. 16 depicts a contact sensor to detect when the air gap 1615 has collapsed, a contact sensor may also or instead be configured to detect contact when the air gap 1606 has collapsed. In some cases, multiple air gaps in a stack of a force sensing device may include a contact sensor. By providing additional contact sensors in this manner, an electronic device may determine which layers have been or are being deflected, and may therefore apply force-deflection correlations that are tailored for the particular layer or layers that are being deflected. By providing a distinct force-deflection correlation for each of multiple layers, an amount of force applied to a surface may be determined with a high degree of accuracy.

The deformable elements described in each of the foregoing examples above may have different thicknesses and/or different protrusion heights in different areas when the deformable element is in an undeformed state. For example, the base structures and/or the upper or lower stacks of the force sensing devices (or any other layer of a force sensing device) may not have uniformly planar surfaces. Accordingly, in order to provide a relatively constant air gap size across the air gap, the deformable elements may have different thicknesses in different areas. For example, protrusions may be larger in some areas to account for a greater distance between a layer or stack (e.g., the lower stack 308) and a base structure (e.g., the base structure or layer 316).

In some cases, input surfaces may not deflect uniformly across the entire input surface area. For example, a force applied near an edge of the cover 303 (e.g., close to the joint between the housing 104 and the cover 303) may cause less deflection of the cover 303 (and hence the upper and lower stacks 304, 308) than a force of the same magnitude that is applied in the center of the cover 303. Accordingly, the deformable elements may be thicker in areas where less deformation is expected (e.g., around the edges or perimeter of the cover 303) so that the deformable element begins to be compressed at substantially the same magnitude of force regardless of where on the input surface the force is applied.

Figure 23A:
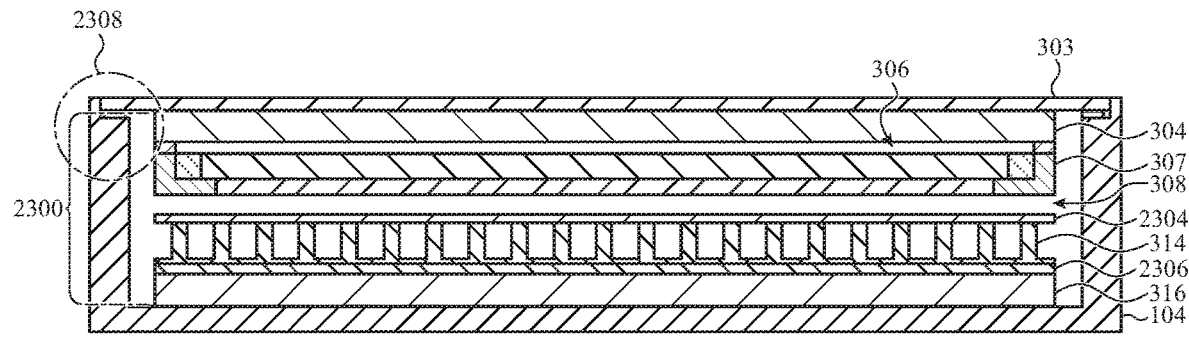
FIGS. 23A-23B show partial cross-sectional views of the device of FIG. 1 viewed along line A-A in FIG. 1, showing an embodiment with a force sensing system integrated therein.

FIG. 23A is a cross-sectional view of an embodiment of the device 100, viewed along line A-A in FIG. 1, showing an assembly 2300 that may provide display, touch sensing, and/or force sensing functionality to the device 100, or may be integrated with other components to provide such functionality. As shown in FIG. 23A, the device 100 includes force sensing system in the assembly 2300, similar to the sensors described above with respect to FIGS. 5-22, as well as a sensor 2302 (FIG. 23B) positioned between the housing 104 and the cover 303. The sensor 2302 works in conjunction with the sensing elements in the assembly 2300 to determine an amount of deflection of, and thus an amount of force applied to, the cover 303.

The assembly 2300 includes the upper and lower stacks 304, 308, the air gaps 306, 310, and the deformable element 314, all of which are described above with respect to FIGS. 3A-3E. The assembly 2300 also includes a first sensing element 2304 positioned on a first side of (e.g., above) the deformable element 314 and a second sensing element 2306 positioned on a second side of (e.g., below) the deformable element 314. Together, the first and second sensing elements 2304, 2306 may be referred to as a force sensor.

The first and second sensing elements 2304, 2306 may be similar to any of the sensing elements described herein. For example, the first sensing element 2304 may be a capacitive drive layer, and the second sensing element 2306 may be a capacitive sense layer that is capacitively coupled to the drive layer. The first and second sensing elements 2304, 2306 and associated circuitry may detect an amount of deformation or deflection of the deformable element 314, and thus determine an amount of force applied to the cover 303. While the assembly 2300 shows the first and second sensing elements 2304, 2306 positioned on opposite sides of the deformable element 314, other configurations are also possible. For example, the first sensing element 2304 may be disposed on the bottom of the frame member 309, on (or in) the upper stack, or the like. In some cases, any of the force sensing devices described herein, such those shown and described with respect to FIG. 5, 12, 14, or 16, may be used in the assembly 2300.

In addition to the force sensor in the assembly 2300, the device 100 may include a sensor 2302 disposed between the housing 104 and the cover 303. The sensor 2302 may include a compliant material that can deflect or deform in response to an applied force on the cover 303. The sensor 2302, along with associated sensing circuitry, may be able to detect an amount of deflection of the cover 303 in response to an applied force, and, in conjunction with the sensing elements 2304, 2306 in the assembly 2300, determine an amount of force applied to the cover 303.

Figure 23B:
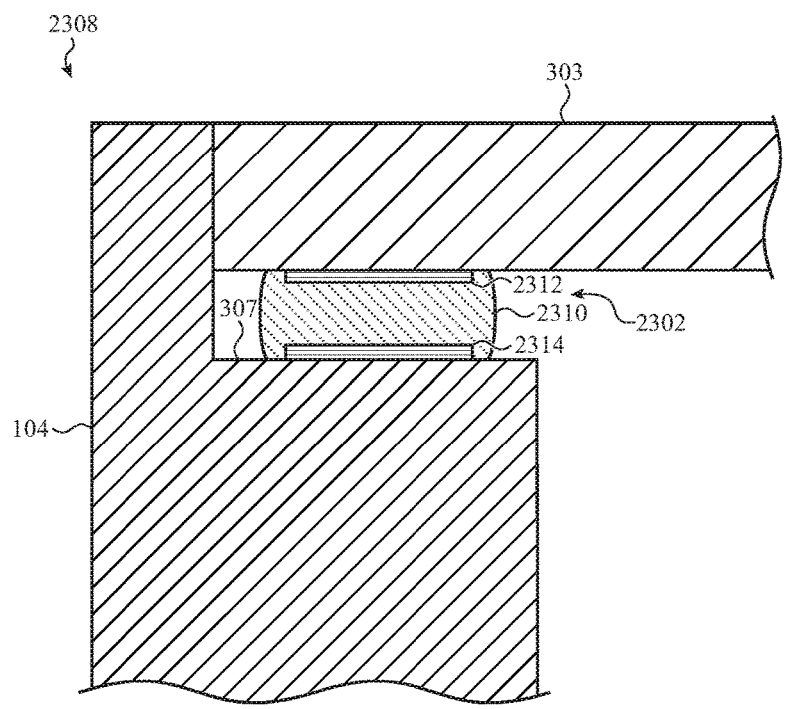

FIG. 23B shows an exploded view of the area 2308 in FIG. 23A, showing details of the sensor 2302. The sensor 2302 may be positioned between the ledge 307 of the housing 104 and a portion of the cover 303 such that when a force is applied to the cover 303, the sensor 2302 is pressed between the ledge 307 and the portion of the cover 303, thus deforming the sensor 2302. The geometry of the ledge 307 and the cover 303 in FIG. 23B are merely exemplary, and different embodiments of the housing 104 and the cover 303 may have shapes, geometries, and/or features that are different from those shown in FIG. 23B.

The sensor 2302 includes a deformable portion 2310. The deformable portion 2310 may be formed from or include any appropriate material, such as silicone, polyurethane foam, rubber, gels, elastomers, or the like. In some cases, the deformable portion 2310 may have adhesive properties, such that the sensor 2302 retains the cover 303 to the housing 104.

The sensor 2302 also includes a first sensing element 2312 and a second sensing element 2314. The first and second sensing elements 2312, 2314 may be positioned on opposite sides of the deformable portion 2310 (e.g., a top and bottom, as shown in FIG. 23B). The first and second sensing elements 2312, 2314 may form a capacitive sensor, in which case one of the first or second sensing element 2312, 2314 may be a capacitive drive layer, and the other may be a capacitive sense layer. The capacitive sensor may detect an amount of deformation of the deformable portion 2310, and thus facilitate detection of an amount of applied force, as discussed herein. In some cases, the sensor 2302 may be a resistive sensor (or any other appropriate sensor), in which case the first and second sensing elements 2312, 2314 may be omitted or substituted with other components.

When a force is applied to the cover 303, the deformable portion 2310 of the sensor 2302 may deflect or deform such that the first and second sensing elements 2312, 2314 are brought closer together. The first and second sensing elements 2312, 2314 and associated circuitry may determine the amount of deformation and correlate it with an amount of force applied to the cover 303. As a certain amount of applied force is reached, however, the deformable portion 2310 may reach a maximum deformation, where greater applied forces may not result in further deformation of the deformable portion 2310. In some cases, it may be desirable to detect applied forces greater than this amount, however. Accordingly, the sensor 2302 and the sensing elements in the assembly 2300 may sense different ranges of applied forces.

For example, the sensor 2302 may be configured to determine forces spanning from no applied force to an amount of force that results in the collapse of the air gaps 306 and 310 in FIG. 23A. Up until that point, the sensor in the assembly 2300 (formed by the first and second sensing elements 2304, 2306) may not detect any force, as the lower stack 308 had not yet been brought into contact with the deformable element 314. Once the lower stack 308 contacts the deformable element 314, increasing amounts of force may be determined by the sensing elements 2304, 2306 in the assembly 2300.

The first and second sensing elements 2312, 2314 may be formed from or include any appropriate material, such as metals, ITO, or the like. Moreover, the first and second sensing elements 2312, 2314 may be applied to or otherwise incorporated with the deformable portion 2310 in any appropriate manner. For example, the first and second sensing elements 2312, 2314 may be or may include conductive sheets (e.g., copper, silver, or gold) embedded in, positioned on, or otherwise integrated with the deformable portion 2310. As another example, the first and second sensing elements 2312, 2314 may be ITO that is deposited on the deformable portion 2310.

In some cases, either or both of the first and second sensing elements 2312, 2314 may not be integrated with the deformable material 2310, but rather may be separate components. For example, the first and/or second sensing elements 2312, 2314 may be layers of material (e.g., flexible circuit material) with conductive materials disposed thereon. The layers may be positioned between the deformable portion 2310 and the cover 303, and/or between the deformable portion 2310 and the housing 104, and may be bonded or otherwise adhered to those components. As another example, the first and/or second sensing elements 2312, 2314 may be patterned directly on the cover 303 and/or the housing 104. For example, ITO, conductive nanowires, or any other appropriate material, may be formed directly on the portions of the cover 303 and the housing 104 that are opposite each other when the device 100 is in its assembled configuration. Any combinations of the foregoing examples may be used to integrate the first and/or second sensing elements 2312, 2314 with the device 100.

Figure 24:
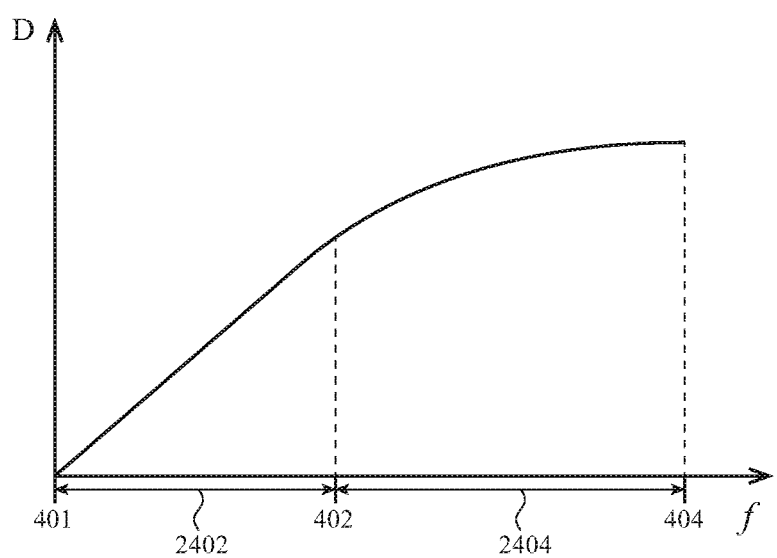
FIG. 24 shows a force versus deflection curve of the force sensing system of FIGS. 23A-23B.

FIG. 24 is an example force versus deflection curve illustrating how the cover 303 of the device illustrated in FIG. 23A deflects in response to a force input applied thereto. The force response is similar to that shown in FIG. 4, with a first profile from point 401 to point 402 (corresponding to collapse of the air gaps 306 and 310) and a second profile from point 402 to point 404 (corresponding to deformation of the deformable element 314). The sensor 2302 may detect deformation of the air gaps 306, 310, as indicated by the line 2402 in FIG. 24, while the force sensor in the assembly 2300 detects deformation of the deformable element 314, as indicated by line 2404. While the lines 2402, 2404 are shown as non-overlapping, this may not be the case. For example, the sensor 2302 may continue to deflect and thus provide meaningful force information even after the air gaps 306, 310 have collapsed. In such cases, sensing circuitry associated with the sensors may process the information from both sensors to determine an amount of applied force.

Figure 25:
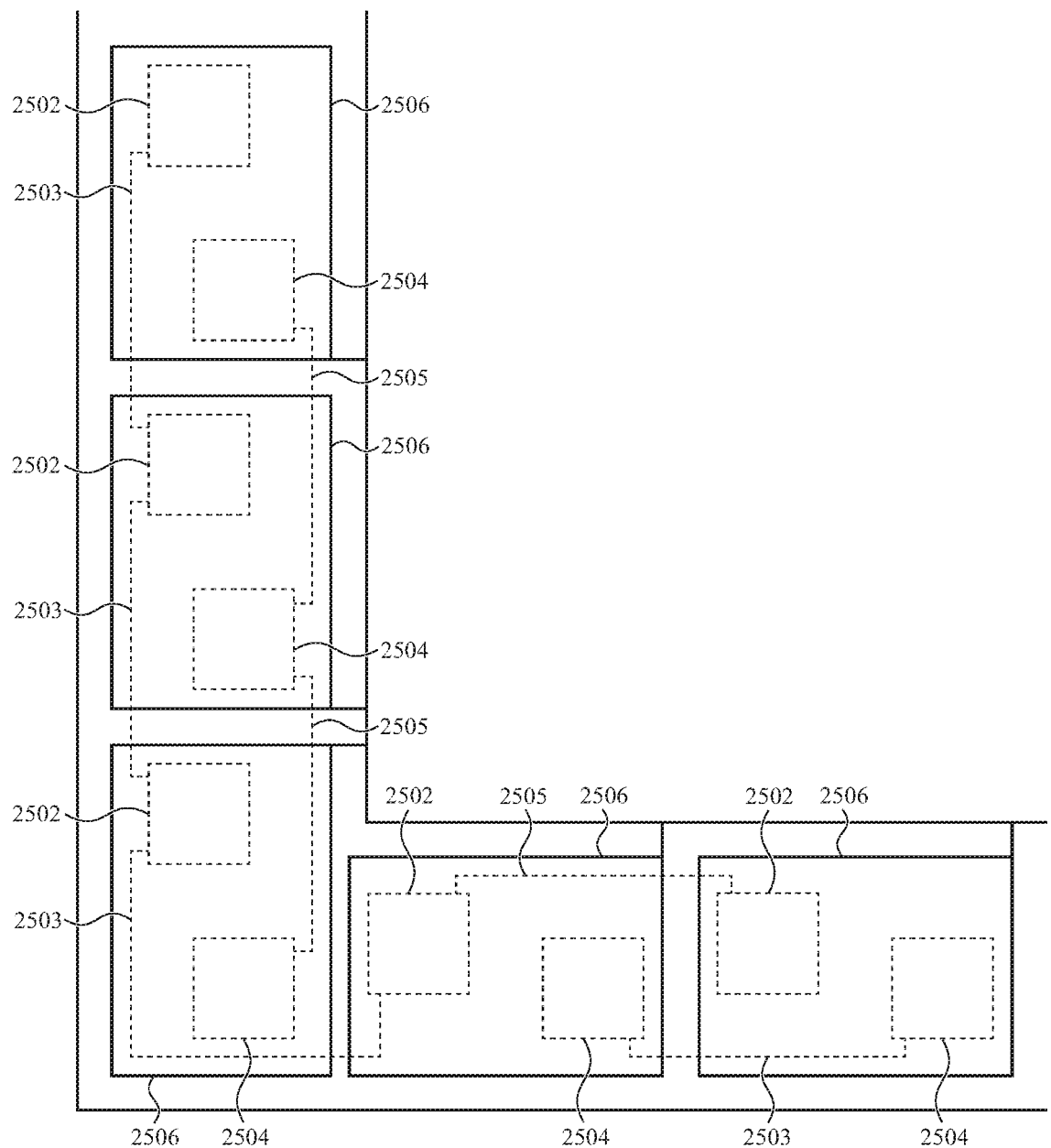
FIG. 25 shows a sensor of the force sensing system of FIGS. 23A-23B.

FIG. 25 shows a portion of the sensor 2302 as viewed through the cover 303 of the device. The illustrated portion of the sensor 2302 corresponds to a corner portion of the sensor 2302. The sensor 2302 includes first drive regions 2502 each electrically coupled together (e.g., via conductors 2503) and second drive regions 2504 each electrically coupled together (e.g., via conductors 2505). The first and second drive regions 2502, 2504 may together form the second sensing element 2314 shown in FIG. 23B, and may be driven or excited with a signal. As shown, the first and second drive regions 2502, 2504 are shown in an alternating, interdigitated pattern, though this is merely one example configuration for the first and second drive regions 2502, 2504.

The sensor 2302 also includes sensing regions 2506. The sensing regions 2506 capacitively couple to the drive regions 2502, 2504 and may be connected to circuitry that detects and analyzes signals induced in the sensing regions 2506 by the drive regions 2502, 2504. Each sensing region 2506 may overlap one first drive region 2502 and one second drive region 2504. As the drive regions may be driven at different times and/or with different signals (e.g., signals having different frequencies), a single sensing region can provide two distinct capacitive measurements, each corresponding to a different location along the sensor 2302. In this way, the sensor 2302 is pixelated, allowing for more precise force measurements and for detection of a location of an applied force on the cover 303.

Figure 26:
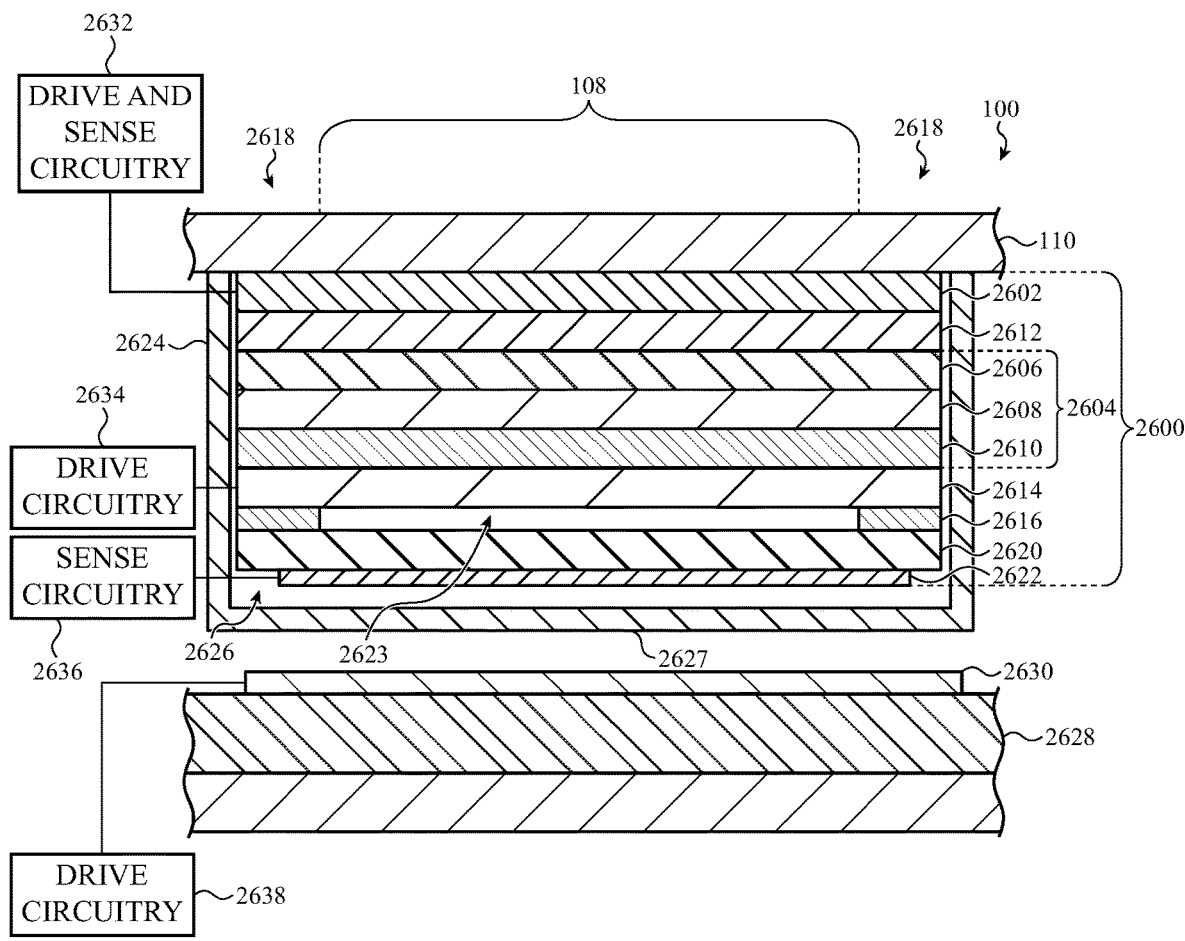
FIG. 26 shows a cross-sectional view of an example embodiment of the electronic device of FIG. 1 viewed along line B-B in FIG. 1.

FIG. 26 is a cross-sectional view of an embodiment of the device 100, viewed along line A-A in FIG. 1, showing a display stack 2600 positioned below the cover 110. Force and/or touch sensing systems, or components thereof, may be incorporated with the display stack 2600 to facilitate touch and force input detection on the device 100. As described herein, device 100 may include conductive sheets (such as the first drive layer 505, FIG. 5) that may facilitate sensing force and/or touch inputs on the device 100.

The display stack 2600 may include a touch sensor 2602 positioned between the cover 110 and a display layer 2604. The touch sensor 2602 can include sensors that are each configured to detect user inputs (e.g., touch and/or force inputs), and the locations of the user inputs, on the cover 110. Any suitable touch sensor 2602 can be used. For example, in one embodiment, the touch sensor 2602 is formed with a dielectric substrate positioned between two electrode layers. The electrode layers may be made of any suitable optically transparent material. For example, in one embodiment the electrode layers are made of indium tin oxide (ITO). Other suitable materials include, but are not limited to, nanowires or nanowire meshes, a transparent conducting film (e.g., a polymer film), carbon nanotubes, and ultra-thin metal films.

Each electrode layer in the touch sensor 2602 can include one or more electrodes. The electrode(s) in one layer are aligned in at least one direction (e.g., vertically) with respective electrodes in the other electrode layer to form one or more capacitive sensors. User inputs, and the locations of the user inputs, are detected through changes in the capacitance of one or more capacitive sensors. As will be described in more detail later, touch and sense circuitry 2632 is coupled to the electrode layers and configured to receive an output signal from each capacitive sensor that represents the capacitance of each capacitive sensor.

One or both of the electrode layers in the touch sensor 2602 may be patterned. For example, in one embodiment one electrode layer is patterned into strips positioned along a first axis (e.g., rows) and the other electrode layer is patterned into strips positioned along a second axis that is transverse to the first axis (e.g., columns). Capacitive sensors are formed at the intersections of the strips in the two electrode layers. User inputs, and the locations of the user inputs, can be determined based on the capacitance (or changes in capacitance) of one or more capacitive sensors.

The display layer 2604 can include a front polarizer 2606, a display element 2608 attached to a back surface of the front polarizer 2606, and a back polarizer 2610 attached to a back surface of the display element 2608. Any suitable display element 2608 can be used. Example display elements 2608 include, but are not limited to, a LCD element, a LED element, an OLED element, or an OEL element. In the illustrated embodiment, the display element 2608 is a LCD element.

In some situations, noise signals that are produced by the display element 2608 can electrically couple with the touch sensor 2602. This coupling can adversely impact the detection of user inputs by the touch sensor 2602. To reduce or eliminate the display noise from coupling with the touch sensor 2602, a conductive layer 2612 can be positioned between the touch sensor 2602 and the front polarizer 2606. The conductive layer 2612 may be made of any suitable optically transparent material. For example, in one embodiment the conductive layer 2612 is made of ITO.

A sheet of conductive material 2614 is formed or coated over the back surface of the back polarizer 2610. The sheet of conductive material 2614 can be made of any suitable conductive material. For example, in one embodiment, the sheet of conductive material 2614 is made of a silver nanowire film.

The back polarizer 2610 may be made of an electrically insulating material. The sheet of conductive material 2614 enables the back surface of the back polarizer 2610 to function as a conducting surface. As will be described in more detail below, the conducting surface of the back polarizer 2610 is used to transmit drive signals for a force sensor that includes the conducting surface.

Attached to the back surface of the back polarizer 2610 is a conductive border 2616 (which may be the same or similar in structure, materials, function, etc., to the connection element 706, FIGS. 7, 10A). The conductive border 2616 is positioned along at least a portion of a perimeter or edge of the back polarizer 2610. As will be described in more detail in conjunction with FIGS. 27-29, the conductive border 2616 can be a continuous border that extends around the entire perimeter, or the conductive border 2616 can include one or more discrete conductive strips with each conductive strip positioned along a respective portion of the perimeter of the back polarizer 2610.

In the illustrated embodiment, the display stack 2600 extends across the user-viewable region 108 (FIG. 1) of the display 102 and into non-viewable regions 2618 that do not correspond to a viewable output from the display 102. Alternatively, in some embodiments, only a subset of the layers in the display stack 2600 extend into the non-viewable regions 2618. For example, portions of the display layer 2604 can extend into the non-viewable regions 2618 while other layers in the display stack 2600 do not extend into the non-viewable regions 2618.

In some embodiments, the conductive border 2616 can be positioned on the portions of the back polarizer 2610 that reside in the non-viewable regions 2618, which allows the conductive border 2616 to be formed with any suitable material or materials (e.g., opaque or transparent material(s)). For example, the conductive border 2616 may be formed with a metal or metal alloy, such as copper, aluminum, molybdenum, and nickel vanadium. Other embodiments can form at least a portion of the conductive border 2616 within the user-viewable region 108. In such embodiments, at least the portion of the conductive border 2616 that is in the user-viewable region 108 may be formed with an optically transparent material, such as ITO.

In the illustrated embodiment, a backlight unit 2620 is positioned below the back polarizer 2610 and the conductive border 2616. The display layer 2604, along with the backlight unit 2620, is used to output images on the display 102. In some implementations, the backlight unit 2620 may be omitted.

A first electrode layer 2622 is positioned below and attached to the backlight unit 2620. In some implementations, the first electrode layer 2622 represents an array of electrodes (e.g., two or more electrodes). In other implementations, the first electrode layer 2622 is a single electrode. The first electrode layer 2622 can be formed with any suitable conductive material (opaque or transparent), such as a metal or metal alloy. Example metals and metal alloys include, but are not limited to, copper, aluminum, titanium, tantalum, nickel, chromium, zirconium, molybdenum niobium, and nickel vanadium.

Together, the sheet of conductive material 2614 on the back surface of the back polarizer 2610 and the first electrode layer 2622 form a force sensor. The force sensor can be used to detect a magnitude or an amount of force that is applied to the cover 110. When the first electrode layer 2622 is implemented as an array of electrodes, the sheet of conductive material 2614 and the first electrode layer 2622 form an array of capacitive sensors. Each capacitive sensor includes an electrode formed by the sheet of conductive material 2614 and a respective electrode in the first electrode layer 2622. When a user input is applied to the cover 110, the cover 110 deflects and a distance between the electrodes in at least one capacitive sensor changes, which varies the capacitance of that capacitive sensor. For example, in the illustrated embodiment, the gap 2623 varies based on a user input applied to the cover 110, which in turn varies the capacitance of at least one capacitive sensor.

In some embodiments, the first electrode layer 2622 can be used to detect one or more touches on the cover 110. In such embodiments, the touch-sensor 2602 (e.g., a touch-sensing layer) may be omitted since the first electrode layer 2622 has a dual function in that it is used to detect both touch and force inputs.

The device 100 can also include a support structure 2624 (which may be the same or similar in structure, materials, function, etc., to the frame members 309, 1207, discussed above). In the illustrated embodiment, the support structure 2624 is made from a conductive material (e.g., a metal), although other embodiments can form the support structure 2624 with a different material, such as a plastic, ceramic, or a composite. In the illustrated embodiment, the support structure 2624 extends along a length and a width of the display stack 2600, although this is not required. The support structure 2624 can have any shape and/or dimensions in other embodiments. For example, the support structure 2624 may have an opening in which a stiffening member may be positioned (as described with respect to the frame member 309 and the stiffening member 312, FIG. 3A).

In the illustrated embodiment, the support structure 2624 has a U-shaped cross-section and is attached to the cover 110 such that the support structure 2624 is suspended from the cover 110. In other embodiments, the support structure 2624 may be connected to a component other than the cover 110. For example, the support structure 2624 can be attached to a housing of the device 100 (e.g., the housing 104 in FIG. 1) or to a frame or other support component in the housing.

In some embodiments, the support structure 2624 may be constructed and attached to the cover 110 to define a gap 2626 between the support structure 2624 and the first electrode layer 2622. The gap 2626 allows the display stack 2600 to flex or move in response to an applied force on the cover 110. In some embodiments, the first electrode layer 2622 may be attached to the support structure 2624 instead of the backlight unit 2620.

The device 100 may also include a battery 2628. The battery 2628 provides power to the various components of the device 100. As shown in FIG. 26, a second electrode layer 2630 can be disposed on a top surface of the battery 2628. In some embodiments, the amount of force applied to the cover 110 may be sufficient to cause the display stack 2600 to deflect such that the back polarizer 2610 contacts the first electrode layer 2622. When the display stack 2600 is deflected to a point where the back polarizer 2610 contacts the backlight unit 2620 (or first electrode layer 2622 if no backlight unit 2620 is present), the amount of force detected by the force sensor reaches a maximum level (e.g., a first amount of force). The force sensor cannot detect force amounts that exceed the maximum level. The deflection of the display stack 2600 to a point where the back polarizer 2610 contacts the backlight unit 2620 or the first electrode layer 2622 may correspond with the first profile 406 of the force versus deflection curve in FIG. 4. For example, the maximum level of force detected by the force sensor that includes the first electrode layer 2622 and the conductive material 2614 may correspond to the point 402 in FIG. 4.

In such embodiments, the second electrode layer 2630 (in conjunction with the first electrode layer 2622 or other components) can form a second force sensor that detects the force that exceeds the first amount of force by associating an amount of deflection between the first electrode layer 2622 and the second electrode layer 2630 (e.g., a second amount of force). For example, in some embodiments, the second electrode layer 2630 can be used to measure a change in capacitance between the first and the second electrode layers 2622, 2630. Alternatively, the second electrode layer 2630 may be used to detect a change in capacitance between the back surface 2627 of the support structure 2624 and the second electrode layer 2630. The deflection between the first electrode layer 2622 and the second electrode layer 2630 (or between the back surface 2627 of the support structure and the second electron layer 2630) may correspond to the second profile 408 in FIG. 4.

As described earlier, drive and sense circuitry 2632 is coupled to the touch sensor 2602. The drive and sense circuitry 2632 may be positioned at any suitable location in the device 100. The drive and sense circuitry 2632 is configured to provide drive signals to the touch sensor 2602 and to receive output signals from the touch sensor 2602. For example, when the touch sensor 2602 includes an array of capacitive sensors, the drive and sense circuitry 2632 is coupled to each capacitive sensor and configured to sense or measure the capacitance of each capacitive sensor. A processing device may be coupled to the drive and sense circuitry 2632 and configured to receive signals representing the measured capacitance of each capacitive sensor. The processing device can be configured to correlate the measured capacitances into an amount of force.

Similarly, drive circuitry 2634 is coupled to the sheet of conductive material 2614 and is configured to provide drive signals to the back surface of the back polarizer 2610 (e.g., to the sheet of conductive material 2614). In some embodiments, the drive circuitry 2634 is coupled to the conductive border 2616.

Sense circuitry 2636 is coupled to the first electrode layer 2622 and is configured to receive one or more output signals from the first electrode layer 2622. For example, when the first force sensor includes an array of capacitive sensors, the drive circuitry 2634 and the sense circuitry 2636 are coupled to each capacitive sensor and configured to sense or measure the capacitance of each capacitive sensor. A processing device may be coupled to the drive circuitry 2634 and the sense the circuitry 2636 and configured to receive the output signals representing the measured capacitance of each capacitive sensor. The processing device can be configured to correlate the measured capacitances into an amount of force. Like the drive and sense circuitry 2632, the drive circuitry 2634 and the sense circuitry 2636 may be situated at any suitable location in the device 100.

The drive signals transmitted on the back surface of the back polarizer 2610 (e.g., on the sheet of conductive material 2614) can be decoupled from the noise produced by the display element 2608 (e.g., a TFT layer) because the insulating back polarizer 2610 physically separates the sheet of conductive material 2614 from the display element 2608. Additionally, the conductive border 2616 may reduce the contact resistance between the back polarizer 2610 and the sheet of conductive material 2614, as well as reduce the sheet resistance of the sheet of conductive material 2614. Reducing the contact resistance and/or the sheet resistance can increase the suppression of the display noise produced by the display element 2608.

With respect to the second electrode layer 2630, drive circuitry 2638 is coupled to the second electrode layer 2630 and is configured to provide drive signals to the second electrode layer 2630. The drive circuitry 2638 can be located at any suitable location in the electronic device 100. In some embodiments, the sense circuitry 2636 may be configured to receive one or more output signals from the first electrode layer 2622. A processing device coupled to the sense circuitry 2636 can be configured to receive the output signals and correlate the measured capacitances into an amount of force.

Figure 27:
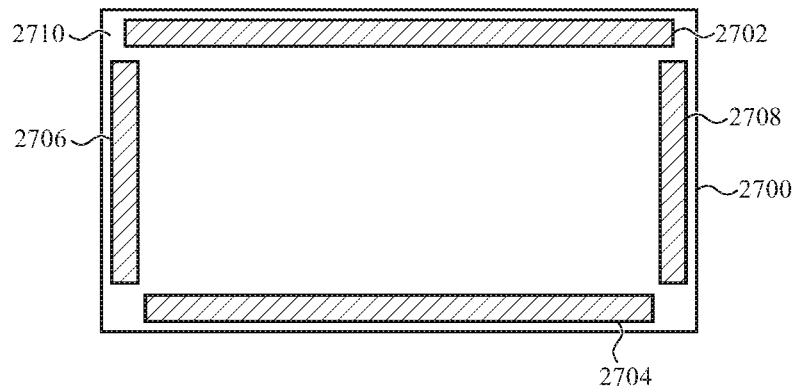
FIG. 27 depicts a first example arrangement of the conductive border on the polarizer shown in FIG. 26.
Figure 28:
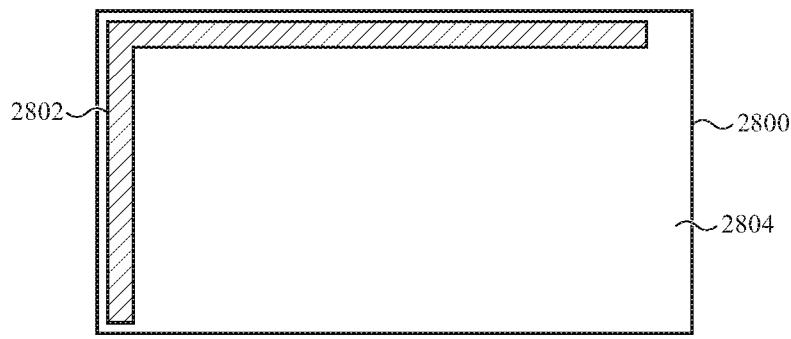
FIG. 28 depicts a second example arrangement of the conductive border on the polarizer shown in FIG. 26.
Figure 29:
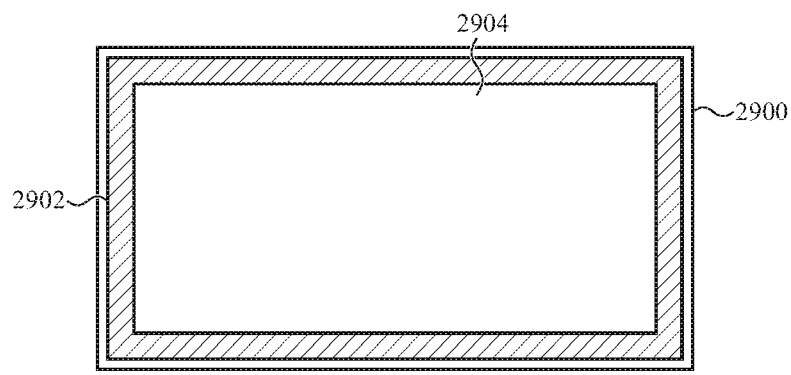
FIG. 29 depicts a third example arrangement of the conductive border on the polarizer shown in FIG. 26.

FIGS. 27-29 depict example arrangements of the conductive border on the polarizer 2610 shown in FIG. 26. As shown in FIG. 27, the conductive border can include four discrete conductive strips 2702, 2704, 2706, 2708 that are formed on a sheet of conductive material 2710 coated over a polarizer 2700. Each conductive strip 2702, 2704, 2706, 2708 is formed along a respective edge of the polarizer 2700. Although FIG. 27 depicts four conductive strips, other embodiments are not limited to this arrangement. Other embodiments can include one or more conductive strips. The embodiments shown in FIGS. 27-29 may represent embodiments of the conductive material 2614 and the conductive border 2616 on the polarizer 2610 in FIG. 26.

In some embodiments, the sheet of conductive material 2710 may be formed with an anisotropic material that is more conductive in one direction compared to another direction. In such embodiments, the discrete conductive strip or strips 2702, 2704, 2706, 2708 can be more effective at reducing the sheet and/or contact resistance of the sheet of conductive material 2710.

FIG. 28 depicts a discrete L-shaped conductive strip 2802 that is positioned on a sheet of conductive material 2804 on a polarizer 2800. In the illustrated embodiment, the conductive strip 2802 is formed along two edges of the polarizer 2800. Other embodiments can include two "L" shaped conductive strips that are arranged to position a conductive strip along each edge of the polarizer 2800.

FIG. 29 illustrates a continuous conductive border 2902 that is positioned along the entire edge of the polarizer 2900. In some situations, the continuous conductive border 2902 may reduce the sheet conductivity and/or the contact resistivity of the sheet of conductive material 2904 more effectively than a conductive strip or strips. The conductive strips 2702, 2704, 2706, 2708 and/or the conductive strip 2802 and the continuous conductive border 2902 may form the connection element 706 described above with respect to FIGS. 7 and 10A.

Although the embodiments shown in FIGS. 26-29 are described in conjunction with a display stack in an electronic device, other embodiments are not limited to displays. A force sensor can be formed below any suitable cover, such as the housing of an electronic device (e.g., the housing 104 in FIG. 1, the trackpad 206 in FIG. 2). An insulating substrate may be positioned below the cover. A sheet of conductive material is formed over a back surface of the insulating substrate to produce a conducting surface on the back surface of the insulating substrate. In other words, the sheet of conductive material transforms the back surface of the insulating substrate into a conducting surface. A conductive border is formed along at least one edge of the sheet of conductive material and an electrode layer is positioned below the insulating substrate. The conducting surface of the insulating substrate and the electrode layer together form a force sensor that is configured to detect a force input on the cover.

Throughout the foregoing discussion, force sensing devices and contact sensors are described with respect to various examples. However, these examples are not meant to be limiting of the particular elements, layers, or components described. For example, components (e.g., layers of the force sensing devices) that are described herein as being separate and/or distinct may be combined, and components described herein as being combined or integrated may be separated. Moreover, some components may be substituted, added, or removed without departing from the spirit of the disclosure. For example, as noted above, a display structure may be omitted from a force sensing device if the force sensing device is not integrated with or part of a display device. Furthermore, any individual layer or structure described herein may include one or more sub-layers. For example, a cover may include multiple sub-layers, including glasses, coatings, adhesives, filters, and the like. As another example, any of the layers or components of the force sensing devices and contact sensors described herein may be secured to adjacent layers or structures with adhesives, bonding layers, or the like, though such adhesives and bonding layers are not necessarily described herein.

Figure 30:
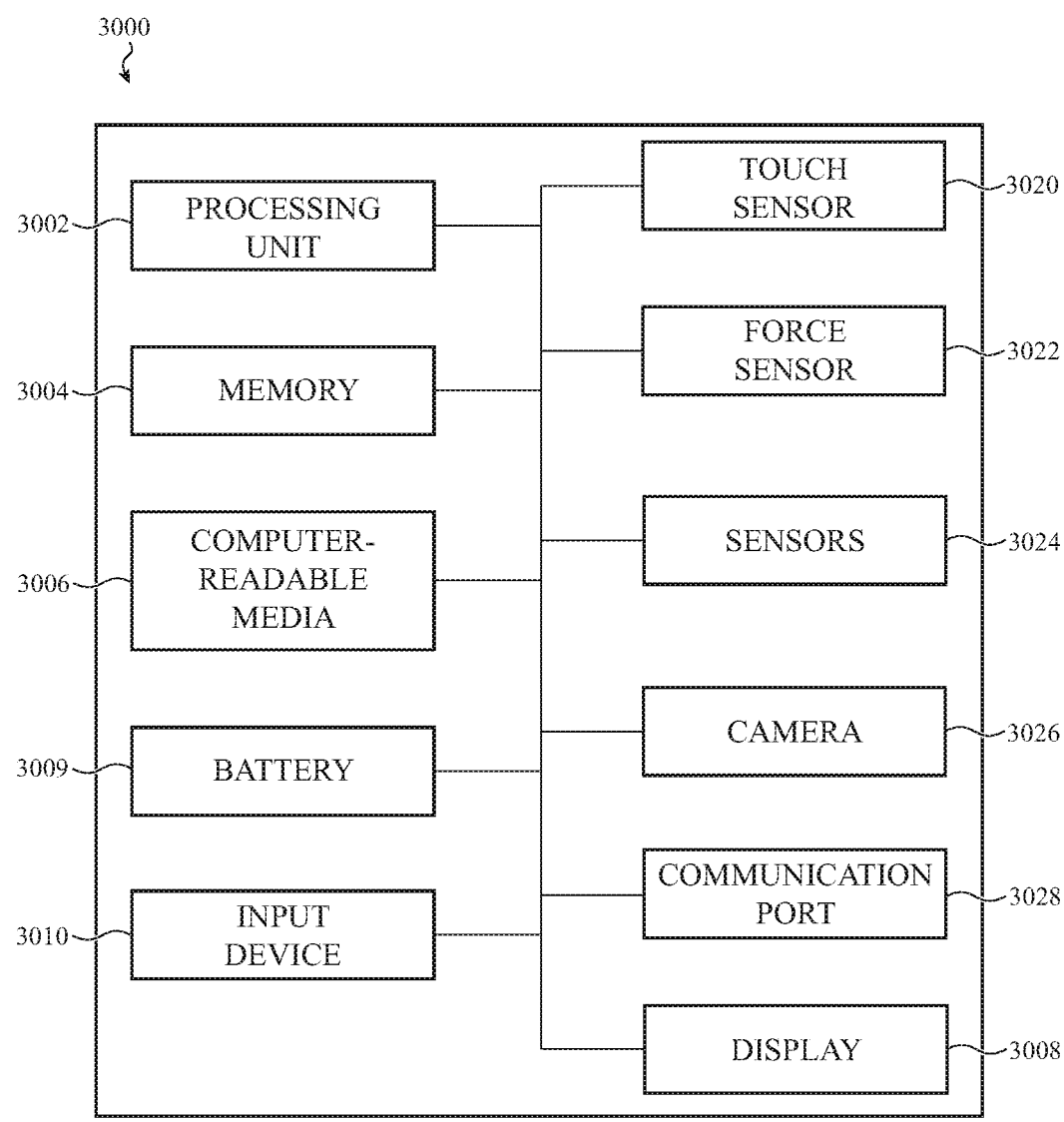
FIG. 30 shows example components of an electronic device.

FIG. 30 depicts example components of an electronic device in accordance with the embodiments described herein. The schematic representation depicted in FIG. 30 may correspond to components of the devices depicted in FIGS. 1-2, and indeed any device in which the force sensing described herein may be incorporated.

As shown in FIG. 30, a device 3000 includes a processing unit 3002 operatively connected to computer memory 3004 and/or computer-readable media 3006. The processing unit 3002 may be operatively connected to the memory 3004 and computer-readable media 3006 components via an electronic bus or bridge. The processing unit 3002 may include one or more computer processors or microcontrollers that are configured to perform operations in response to computer-readable instructions. The processing unit 3002 may include the central processing unit (CPU) of the device. Additionally or alternatively, the processing unit 3002 may include other processors within the device including application specific integrated chips (ASIC) and other microcontroller devices.

The memory 3004 may include a variety of types of non-transitory computer-readable storage media, including, for example, read access memory (RAM), read-only memory (ROM), erasable programmable memory (e.g., EPROM and EEPROM), or flash memory. The memory 3004 is configured to store computer-readable instructions, sensor values, and other persistent software elements. Computer-readable media 3006 also includes a variety of types of non-transitory computer-readable storage media including, for example, a hard-drive storage device, a solid state storage device, a portable magnetic storage device, or other similar device. The computer-readable media 3006 may also be configured to store computer-readable instructions, sensor values, force-deflection correlations, and other persistent software elements.

In this example, the processing unit 3002 is operable to read computer-readable instructions stored on the memory 3004 and/or computer-readable media 3006. The computer-readable instructions may adapt the processing unit 3002 to perform the operations or functions described above with respect to FIGS. 1-25 or below with respect to the example process FIG. 31. In particular, the processing unit 3002, the memory 3004, and/or the computer-readable media 3006 may be configured to cooperate with the force sensor 3022, described below, to determine an amount of force applied to a user input surface by applying different force-deflection correlations based on whether a deflection of the user input surface is collapsing an air gap in a force sensor or compressing a deformable element. The computer-readable instructions may be provided as a computer-program product, software application, or the like.

As shown in FIG. 30, the device 3000 also includes a display 3008. The display 3008 may include a liquid-crystal display (LCD), organic light emitting diode (OLED) display, LED display, or the like. If the display 3008 is an LCD, the display 3008 may also include a backlight component that can be controlled to provide variable levels of display brightness. If the display 3008 is an OLED or LED type display, the brightness of the display 3008 may be controlled by modifying the electrical signals that are provided to display elements. The display 3008 may correspond to the upper and/or lower stacks described above.

The device 3000 may also include a battery 3009 that is configured to provide electrical power to the components of the device 3000. The battery 3009 may include one or more power storage cells that are linked together to provide an internal supply of electrical power. The battery 3009 may be operatively coupled to power management circuitry that is configured to provide appropriate voltage and power levels for individual components or groups of components within the device 3000. The battery 3009, via power management circuitry, may be configured to receive power from an external source, such as an AC power outlet. The battery 3009 may store received power so that the device 3000 may operate without connection to an external power source for an extended period of time, which may range from several hours to several days.

In some embodiments, the device 3000 includes one or more input devices 3010. The input device 3010 is a device that is configured to receive user input. The input device 3010 may include, for example, a push button, a touch-activated button, a keyboard, a key pad, or the like. In some embodiments, the input device 3010 may provide a dedicated or primary function, including, for example, a power button, volume buttons, home buttons, scroll wheels, and camera buttons. Generally, a touch sensor (e.g., a touchscreen) or a force sensor may also be classified as an input device. However, for purposes of this illustrative example, the touch sensor 3020 and the force sensor 3022 are depicted as distinct components within the device 3000.

The device 3000 may also include a touch sensor 3020 (e.g., the touch sensor 2602, FIG. 26) that is configured to determine a location of a touch over a touch-sensitive surface of the device 3000. The touch sensor 3020 may include a capacitive array of electrodes or nodes that operate in accordance with a mutual-capacitance or self-capacitance scheme. As described herein, the touch sensor 3020 may be integrated with one or more layers of a display stack or a force sensing device to provide the touch-sensing functionality of a touchscreen. The capacitive arrays of the touch sensor 3020 may be integrated with the force sensing devices described above, and may be in addition to the capacitive sensing elements that provide force sensing functionality.

The device 3000 may also include a force sensor 3022 that is configured to receive and/or detect force inputs applied to a user input surface of the device 3000. The force sensor 3022 may correspond to any of the force sensing devices or force sensors described herein, and may include or be coupled to capacitive sensing elements that facilitate the detection of changes in relative positions of the components of the force sensor (e.g., deflections caused by a force input).

As described herein, the force sensor 3022 may include contact sensors that are configured to signal when an air gap has been fully collapsed by a force input. The force sensor 3022, including the contact sensors, may be operatively coupled to the processing unit 3002, which can process signals from the force sensor 3022 to determine an amount of applied force on the user input surface, as described above.

The device 3000 may also include one or more sensors 3024 that may be used to detect an environmental condition, orientation, position, or some other aspect of the device 3000. Example sensors 3024 that may be included in the device 3000 include, without limitation, one or more accelerometers, gyrometers, inclinometers, goniometers, or magnetometers. The sensors 3024 may also include one or more proximity sensors, such as a magnetic hall-effect sensor, inductive sensor, capacitive sensor, continuity sensor, and the like.

The sensors 3024 may also be broadly defined to include wireless positioning devices including, without limitation, global positioning system (GPS) circuitry, Wi-Fi circuitry, cellular communication circuitry, and the like. The device 3000 may also include one or more optical sensors including, without limitation, photodetectors, photosensors, image sensors, infrared sensors, and the like. While the camera 3026 is depicted as a separate element in FIG. 30, a broad definition of sensors 3024 may also include the camera 3026 with or without an accompanying light source or flash. The sensors 3024 may also include one or more acoustic elements, such as a microphone used alone or in combination with a speaker element. The sensors may also include a temperature sensor, barometer, pressure sensor, altimeter, moisture sensor, or other similar environmental sensor.

The device 3000 may also include a camera 3026 that is configured to capture a digital image or other optical data. The camera 3026 may include a charge-coupled device, complementary metal oxide semiconductor (CMOS) device, or other device configured to convert light into electrical signals. The camera 3026 may also include one or more light sources, such as a strobe, flash, or other light-emitting device. As discussed above, the camera 3026 may be generally categorized as a sensor for detecting optical conditions and/or objects in the proximity of the device 3000. However, the camera 3026 may also be used to create photorealistic images that may be stored in an electronic format, such as JPG, GIF, TIFF, PNG, raw image file, or other similar file types.

The device 3000 may also include a communication port 3028 that is configured to transmit and/or receive signals or electrical communication from an external or separate device. The communication port 3028 may be configured to couple to an external device via a cable, adaptor, or other type of electrical connector. In some embodiments, the communication port 3028 may be used to couple the device 3000 to an accessory, such as a smart case, smart cover, smart stand, keyboard, or other device configured to send and/or receive electrical signals.

The device 3000 may determine an amount of force applied to a user input surface using any appropriate techniques or algorithms. For example, the device 3000 may use data, readings, or other information from force sensing devices, and then apply mathematical formulas or consult models or lookup tables to determine an amount of applied force based on the information from the force sensing devices. More particularly, one example technique for determining an amount of force applied to a structure that includes a force sensing device includes consulting a lookup table or other data structure that correlates a sensor value (e.g., a detected capacitance value) to a particular known force. The lookup table may be populated by a calibration process whereby a known force is applied to various locations on the user input surface. For each location, the resulting sensor values, which may be referred to as calibration values, for each pixel or sensing region of the sensor are stored in the lookup table (or other data structure). Accordingly, for each user input location there exists in the lookup table a set of calibration values representing the sensor values of all pixels or sensing regions of the sensor when the sensor is subjected to a known force. In some cases, multiple sets of calibration values exist for each location, such as values associated with forces of different known magnitudes.

In order to determine an amount of force applied to the user input surface during normal operation, a location of a touch event on the input surface is determined (e.g., with the touch sensor 3020), and calibration values for that location are used in conjunction with the detected sensor values to determine the actual applied force. As one example, if the detected sensor values corresponding to a touch event at a given location are approximately three times the calibration values associated with a touch event at that location, the device 3000 may determine that the applied force is approximately three times larger than the calibration force.

Another technique for determining an amount of applied force includes determining an amount of force applied to each pixel or sensing region of a sensor, and then adding the force from each pixel or sensing region to determine the total amount of force applied to that sensor. Where this technique is used, the change in distance between two sensing elements may be used in conjunction with a known stiffness of a material between the two sensing elements to determine the force applied to that pixel or region. As one specific example, a deformable element (e.g., the deformable element 514, FIG. 5) may be positioned between capacitive sensing elements. The capacitive sensing elements may correspond to the second and third sensing elements 512, 515 in FIG. 5, which may be capacitive sense and drive layers, respectively. The capacitive sensing elements may also correspond to the first electrode layer 2622 and the conductive material 2614 in FIG. 26. By measuring a capacitance value between the capacitive sensing elements, the device 3000 can determine a distance (or a change in distance) between the sensing elements resulting from a force applied to the deformable element. The change in distance can be multiplied by a stiffness of the deformable element (e.g., a constant correlating an expected deflection or deformation of the material to a given force) to determine the amount of force corresponding to the detected change in distance. As noted above, the second and third sensing elements 512, 515 may define a number of different pixels or sensing regions (e.g., regions 702, FIG. 7). Accordingly, the foregoing technique can be used to determine the force applied to each individual pixel or sensing region, and those forces can be combined (e.g., added) to determine the total amount of force applied to the user input surface and/or to the sensor.

In some cases, the stiffness (e.g., a stiffness constant) of the deformable element may be determined for each sensing region. Thus, the distance measurement for each region may be multiplied by a stiffness constant specific to that region, which may improve the accuracy of the force measurements for each pixel or region, and thus may improve the overall accuracy of the force sensor. The stiffness constant for each pixel or sensing region may be determined manually, for example, by applying a known force to each area of the deformable element corresponding to a pixel or sensing region, and measuring the amount or distance that the deformable element has deflected. In some cases, multiple measurements can be taken at different forces to determine an average stiffness constant or a stiffness profile for the deformable material. This may increase the accuracy of a sensor as compared to using the same stiffness constant for each sensing region, as the stiffness may vary from region to region.

Either of the foregoing techniques (e.g., consulting a lookup table or calculating the force based on a stiffness constant) may be used to determine the force applied to a given sensor or sensing device described herein. In embodiments where a device includes multiple sensors, a different technique may be used for each sensor. For example, for the force sensing device 500, which includes first and second capacitive sensors 518, 519 (FIG. 5), a lookup table may be used to determine the force applied to the first capacitive sensor 518, and a stiffness-based force calculation may be used to determine the force applied to the second capacitive sensor 519. As another example, the device of FIGS. 23A-23B includes a sensor 2302 positioned between a housing and a cover, as well as a sensor within the housing (e.g., including the first and second sensing elements 2304, 2306 with a deformable element 314 therebetween). In this case, a lookup table may be used to determine the force applied to the sensor 2303, and a stiffness-based calculation may be used to determine the force applied to the sensor within the housing (e.g., the first and second sensing elements 2304, 2306). Alternatively, a lookup table technique may be used for both sensors.

Where two or more sensors are used, the force values that are determined for each sensor may be combined to produce a single value that represents the force applied to the user input surface. For example, with reference to the force sensing device 500 (FIG. 5), the first and second capacitive sensors 518, 519 may deflect in response to different applied forces. More particularly, the air gaps 506 and 510 (between the first and second sensing elements 505, 512) may collapse in response to an applied force having a particular value. Because the air gaps 506, 510 are between the first and second sensing elements 505, 512, the first capacitive sensor 518 defined by these sensing elements can be used to determine the force up to the particular value. Because the distance between the first and second sensing elements 505, 512 cannot be further reduced, however, the first capacitive sensor 518 will not detect values of applied forces in excess of the particular value. The second capacitive sensor 519, however, may detect force after the collapse of the air gaps 506, 510. Accordingly, where both the first and second capacitive sensors 518, 519 produce force values, the values may be added together to determine the overall force applied to the force sensing device 500. The same or a similar process may be used in conjunction with the force sensors described with respect to FIG. 26, in which the conductive material 2614 and the first electrode layer 2622 form a first force sensor, and the first electrode layer 2622 and the second electrode layer 2630 form a second force sensor.

Figure 31:
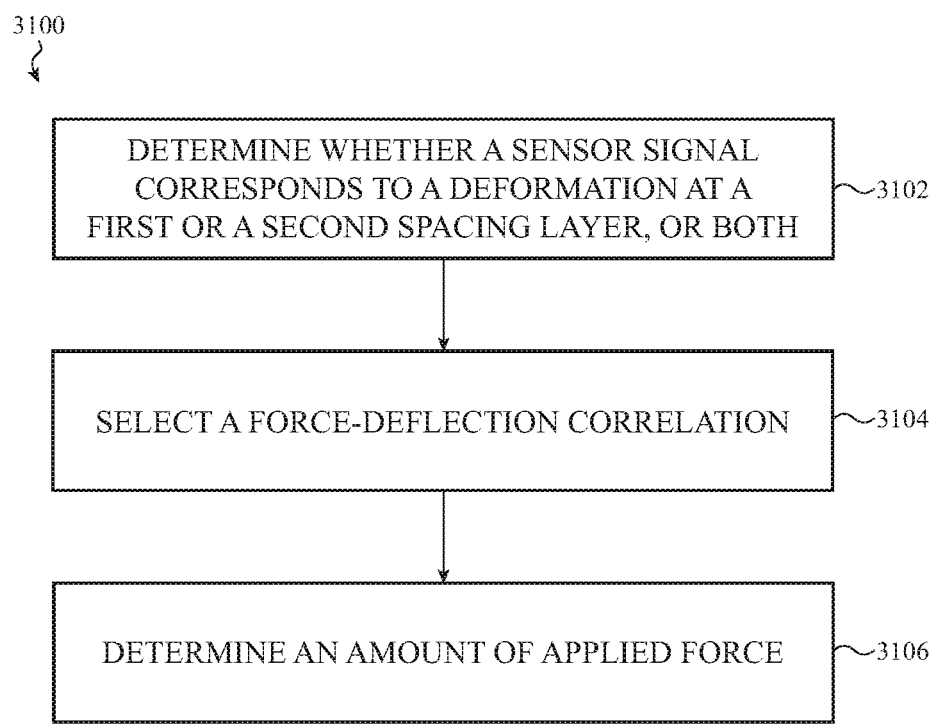
FIG. 31 shows an example process for determining an amount of force applied to a user input surface.

FIG. 31 depicts an example process 3100 for determining an amount of force applied on a user input surface of an electronic device. The process 3100 may be implemented on any of the example devices discussed herein. The process 3100 may be used, for example, to determine what actions (if any) the electronic device should perform in response to the force input, and may be implemented using, for example, the processing unit and other hardware elements described with respect to FIG. 30. The process 3100 may be implemented as processor-executable instructions that are stored within the memory of the electronic device.

In operation 3102, it is determined whether a sensor signal corresponds to a deformation of a first spacing layer (e.g., an air gap, as described above) or of a second spacing layer (e.g., a deformable element, as described above), or a combination of both. For example, the device may monitor a rate of change of a sensor signal. If the rate of change of the sensor signal satisfies a first condition (e.g., it is constant over a particular deformation range or it is below a threshold value), the device may determine that an air gap is being or has been collapsed. If the rate of change of the sensor signal satisfies a second condition (e.g., it is increasing over a particular deformation range or it is above the threshold value), the device may determine that an air gap has been fully collapsed and a deformable element has been or is about to be at least partially compressed. As another example, the device may determine whether a sensor signal corresponds to a collapse of a first spacing layer or a second spacing layer based on whether or not a contact sensor (e.g., the contact sensors described with respect to FIGS. 16 and 18A-22B) indicates that the first spacing layer has fully collapsed.

In operation 3104, a force-deflection correlation is selected. As described herein, a different force-deflection correlation may be used to determine an amount of applied force, depending on whether the deflection of the force sensor corresponds to a collapse of a first spacing layer (e.g., an air gap) or deformation of a second spacing layer (e.g., a deformable element). Thus, if the device determines at operation 3102 that the sensor signal corresponds to a deformation of the first spacing layer, such as the collapse of an air gap, the device may at operation 3104 select a first force-deflection correlation. If the device determines at operation 3102 that the sensor signal corresponds to a deformation of the second spacing layer, such as compression of a deformable element, the device may at operation 3104 select a second force-deflection correlation that is different than the first.

In embodiments where the device includes multiple sensors spanning different spacing layers (such as the first and second capacitive sensors 518, 519, FIG. 5), the device may select and use multiple force-deflection correlations. For example, if the device determines at operation 3102 that the deflection corresponds to an at least partial collapse of both a first and a second spacing layer, the device may select an appropriate force-deflection correlation for each sensor.

In operation 3106, an amount of applied force is determined based on the selected force-deflection correlation(s). For example, the device correlates the amount of deflection indicated by the sensor signal to a particular applied force by using a lookup table, a stiffness-based force calculation, or another technique that implements the selected force-deflection correlation. In embodiments where the device includes multiple sensors, the device may correlate the amount of deflection indicated by each sensor with a force value, and then add the force values from each sensor to determine the total amount of applied force.

Based on the determined amount of applied force, the device may perform (or not perform) certain actions. For example, if the applied force is lower than a threshold value, the device may perform one action, and if the applied force is higher than the threshold value, the device may perform another action. As one example, if the force is lower than the threshold value, the device may move a cursor to a position corresponding to the location of the touch event, whereas if the force is higher than the threshold value, the device may register a selection (e.g., a mouse click) at the location of the cursor. This is merely one example, however, and the range of possible actions that the device can perform based on the determined amount of applied force are limited only by the capabilities of the device.

Figure 32:
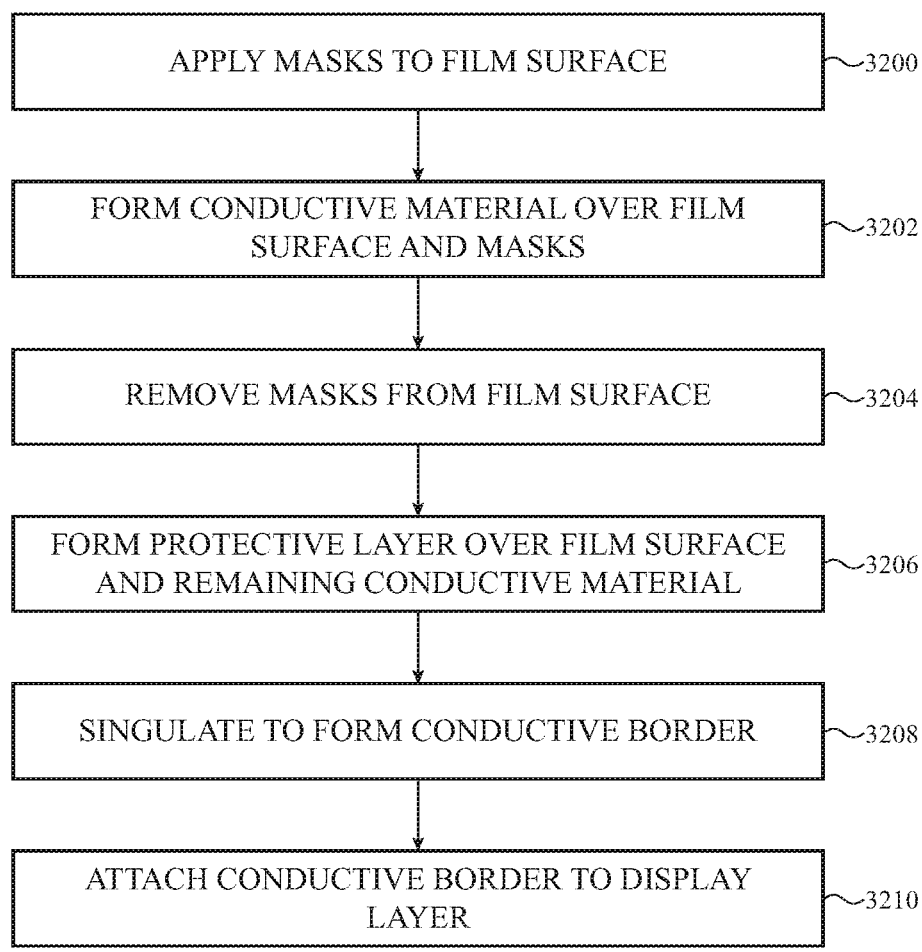
FIG. 32 shows an example process for manufacturing the conductive border on a surface of a polarizer.

As noted above, force sensors may use sheets or layers with conductive borders. For example, as described with respect to FIGS. 7, 10A, and 26-29, conductive sheets may be used as drive layers for capacitive force sensing systems. Conductive borders may be applied to or otherwise included in the conductive sheets. FIG. 32 shows a flowchart of a method of manufacturing the conductive borders on a surface of a sheet, such as a polarizer as described with respect to FIGS. 26-29 or a force sensing element 505 described with respect to FIGS. 5, 7, and 10A. FIG. 32 will be described in conjunction with FIGS. 33-37. The method is described in conjunction with a roll-to-roll production process. Although described in conjunction with a polarizer, the process can be used to produce a conductive border on any suitable film or substrate. Additionally, the method is described in conjunction with forming continuous conductive borders (e.g., see FIGS. 7, 29), although embodiments are not limited to this type of conductive border.

In other embodiments, a conductive border can be fabricated on a polarizer or substrate using other manufacturing processes. Example manufacturing processes include, but are not limited to, physical or chemical vapor deposition, screen printing or inkjet coating technology using a shadow mask, and film mask and photolithography.

Initially, as shown in block 3200, masks are applied to a surface of a film. In one embodiment, the film is a polarizer film that includes a sheet of conductive material formed or coated over a surface of the polarizer film. As describe earlier, the polarizer film will be attached (e.g., laminated) to the back surface of a display element and function as a polarizer for the display (e.g., display element 2608 and back polarizer 2610 in FIG. 26).

Each mask defines the area that will be surrounded by, or inside of, the conductive border. For example, the masks can define the user-viewable region (e.g., the user-viewable region 108) of a display. Although depicted as having a rectangular shape, a mask can have any given shape and/or dimensions.

In some embodiments, each mask can be one of multiple masks. For example, when forming multiple conductive strips (e.g., see FIG. 27) on a film substrate, a mask defines the area that will not include the conductive strips.

Figure 33A:
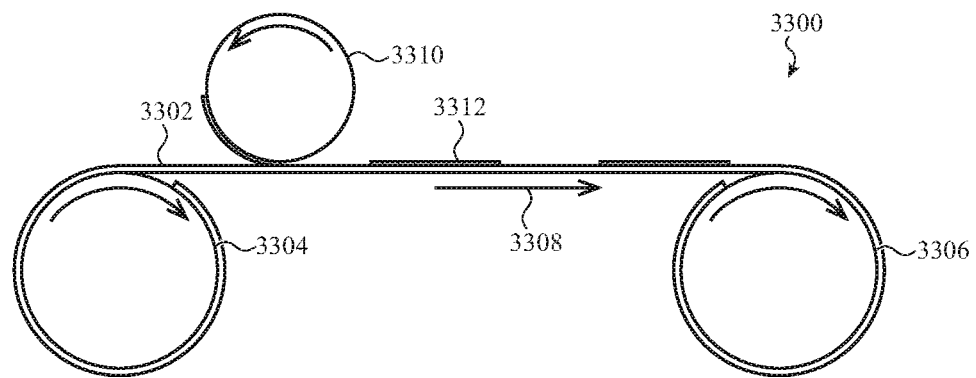
FIGS. 33A-33B depict the application of masks to a surface of a film.
Figure 33B:
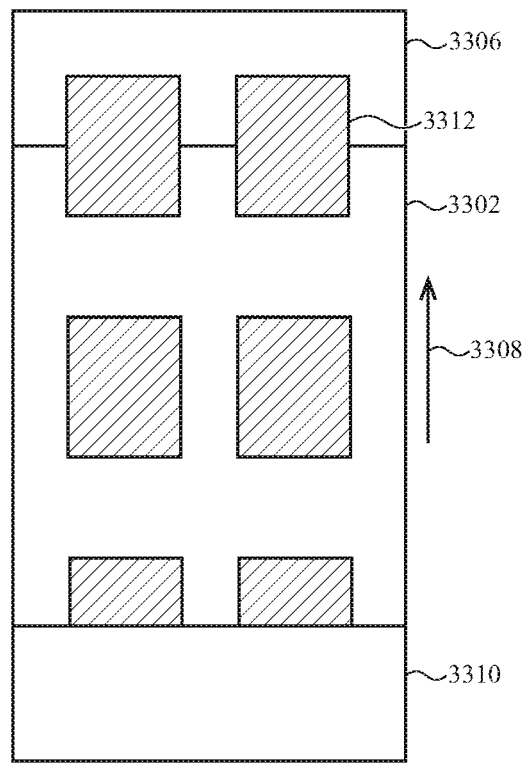

FIGS. 33A-33B depict the application of masks to a surface of a film. As shown in FIG. 33A, the application process 3300 includes moving the film 3302 from a first roller 3304 towards a second roller 3306 in a roll-to-roll production system. This movement is represented in FIGS. 33A and 33B by arrow 3308. In one embodiment, the second roller 3306 includes the finished product of the method shown in FIG. 32 (e.g., a collection of conductive borders formed on the surface of the polarizer film). In another embodiment, the second roller 3306 includes a collection of masks formed on the surface of the film (e.g., the finished product of block 3200).

A third roller 3310 is positioned between the first and the second rollers 3304, 3306. The third roller 3310 includes a collection of masks 3312 that are applied to the film 3302 as the film 3302 moves below the third roller 3310. FIG. 33B illustrates a top view of the film 3302 after the masks 3312 have been applied to the film 3302 by the third roller 3310.

Figure 34A:
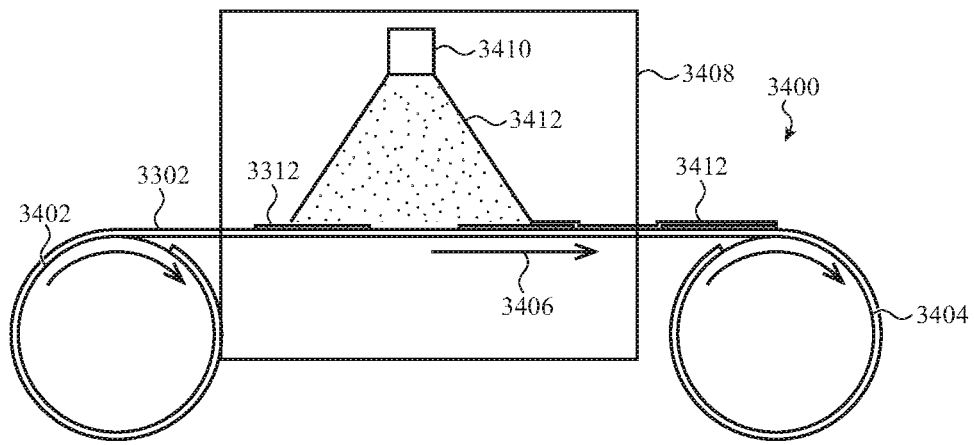
FIGS. 34A-34B show the formation of the conductive material over the film and the masks.
Figure 34B:
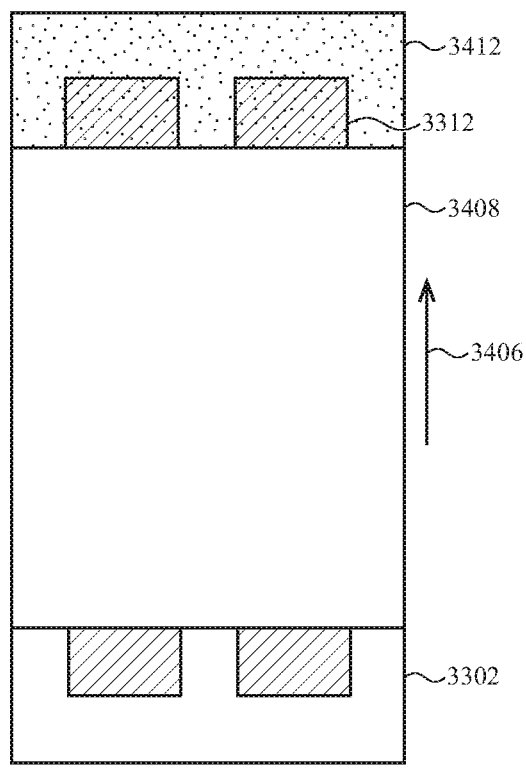

Referring now to block 3202 in FIG. 32, a conductive material is formed over the masks and the surface of the film. The conductive material is the material used to form the conductive borders. FIGS. 34A-34B show the formation of the conductive material over the film and the masks. The formation process 3400 includes moving the film 3302 from a fourth roller 3402 towards a fifth roller 3404 (movement represented by arrow 3406). In one embodiment, the fourth roller 3402 corresponds to the first roller 3304 and the fifth roller 3404 corresponds to the second roller 3306. In such embodiments, the fifth roller 3404 includes a collection of conductive borders formed on the surface of the polarizer film (e.g., the finished product of the method shown in FIG. 32). In other embodiments, the fourth roller 3402 includes the finished product of block 3200.

In the illustrated embodiment, the film 3302 with the masks 3312 enters a deposition chamber 3408 where a nozzle 3410 deposits the conductive material 3412 onto the film 3302 and the masks 3312. The deposition can be a blanket deposition such that the entire film 3302 and masks 3312 have conductive material deposited thereon. FIG. 34B illustrates a top view of the film 3302 after the conductive material 3412 has been deposited onto the film 3302 and the masks 3312 by the deposition chamber 3408.

Figure 35A:
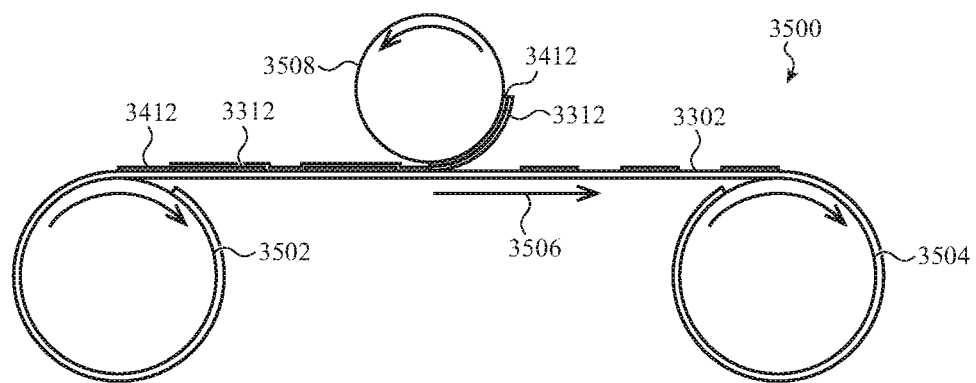
FIGS. 35A-35B show the removal of the masks from the film.
Figure 35B:
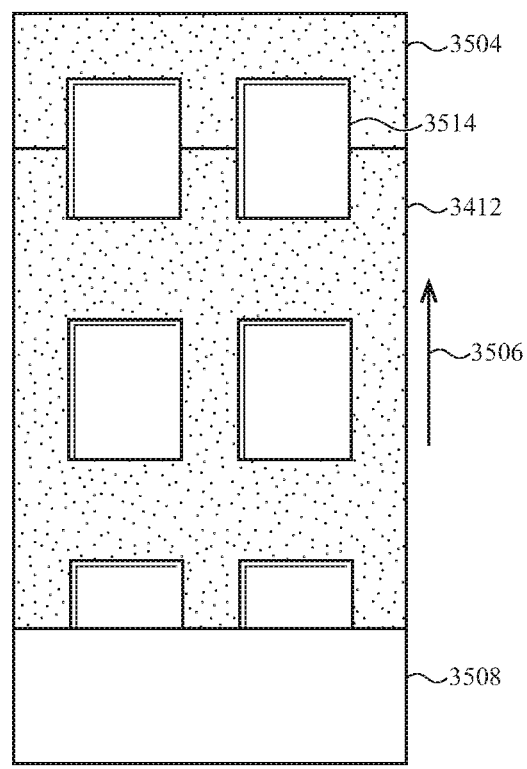

Referring now to block 3204 in FIG. 32, the masks are removed from the surface of the film after the conductive material has been formed over the masks and the film. FIGS. 35A-35B show the removal of the masks 3312 from the film 3302. The removal process 3500 includes moving the film 3302 from a sixth roller 3502 towards a seventh roller 3504 (movement represented by arrow 3506). In one embodiment, the sixth roller 3502 corresponds to the first roller 3304 and the seventh roller 3504 corresponds to the second roller 3306. In such embodiments, the seventh roller 3504 includes the finished product of the method shown in FIG. 32. In other embodiments, the sixth roller 3502 includes the finished product of block 3202.

An eighth roller 3508 is positioned between the sixth and seventh rollers 3502, 3504. The eighth roller 3508 removes the masks 3312, which leaves regions 3514 that include only the film 3302. The conductive material is disposed on the areas around the regions 3514. FIG. 35B illustrates a top view of the film 3302 after the masks 3312 have been removed by the eighth roller 3508.

Any suitable process can be used to remove the masks 3312. For example, in one embodiment, the eighth roller 3508 employs an electrostatic technique to remove the masks 3312.

In some embodiments, an imaging system (e.g., a camera) can be positioned over the film 3302 between the eighth roller 3508 and the seventh roller 3504. The imaging or automated optical inspection system may be used to inspect the film for defects after the masks have been removed by the eighth roller 3508.

Figure 36A:
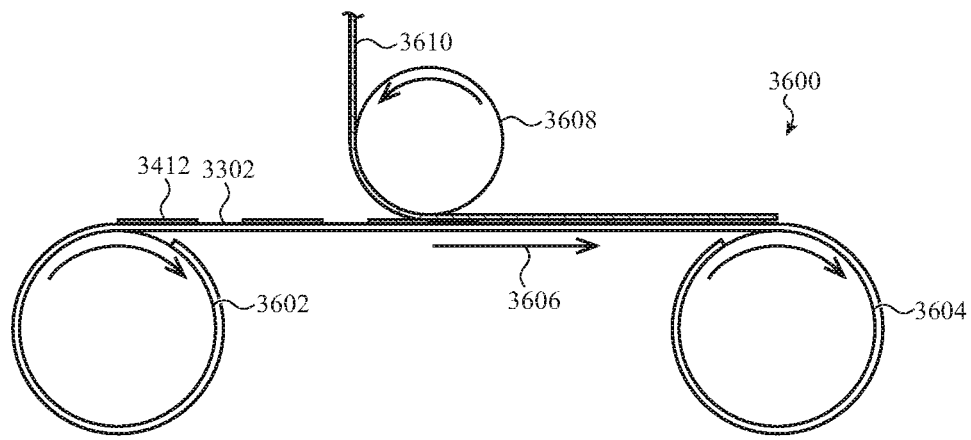
FIGS. 36A-36B show the formation of the protective layer over the film and the conductive material.
Figure 36B:
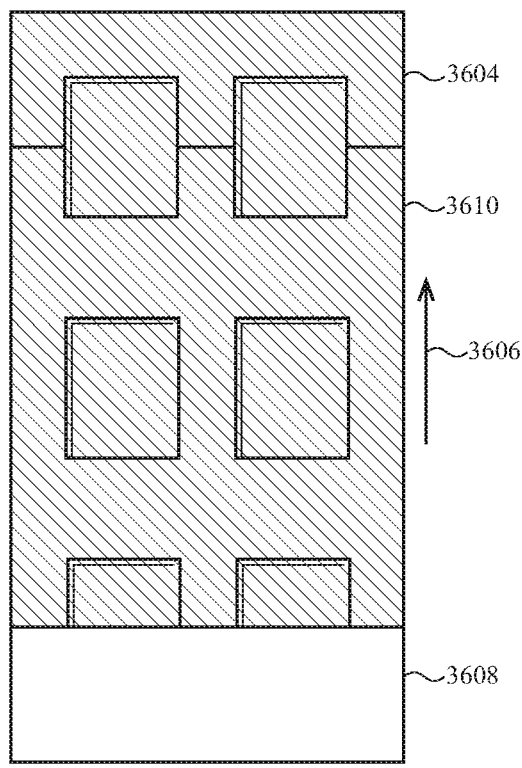

Referring now to block 3206 in FIG. 32, a protective layer is formed over the surface of the film and the conductive material. FIGS. 36A-36B show the formation of the protective layer over the film and the conductive material. The formation process 3600 includes moving the film 3302 from a ninth roller 3602 towards a tenth roller 3604 (movement represented by arrow 3606). In one embodiment, the ninth roller 3602 corresponds to the first roller 3304 and the tenth roller 3604 corresponds to the second roller 3304. In such embodiments, the tenth roller 3604 includes the finished product of the method shown in FIG. 32. In other embodiments, the ninth roller 3602 includes the finished product of block 3204.

An eleventh roller 3608 is positioned between the ninth and tenth rollers 3602, 3604. The eleventh roller 3608 applies the protective layer 3610 over the film 3302 and the conductive material 3412. FIG. 36B illustrates a top view of the film 3302 after the protective layer 3610 has been applied by the eleventh roller 3608.

Figure 37A:
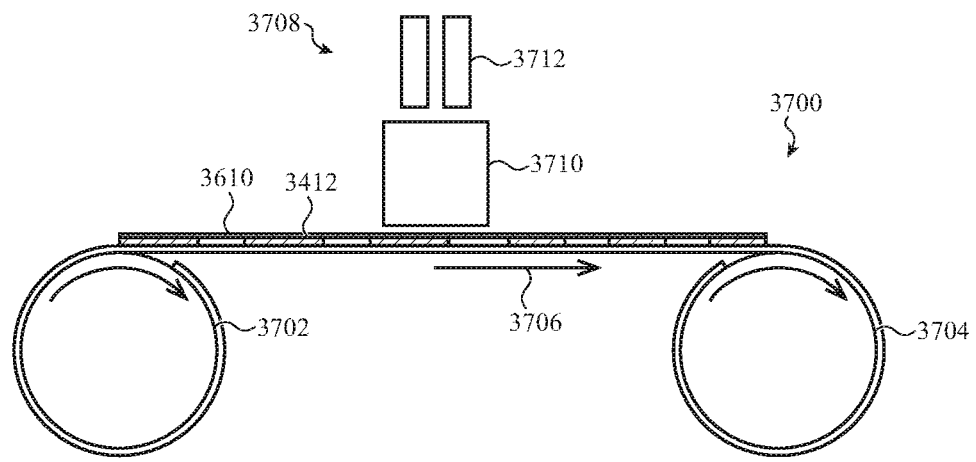
FIGS. 37A-37B show the production of each individual section of film that is surrounded by a conductive border.
Figure 37B:
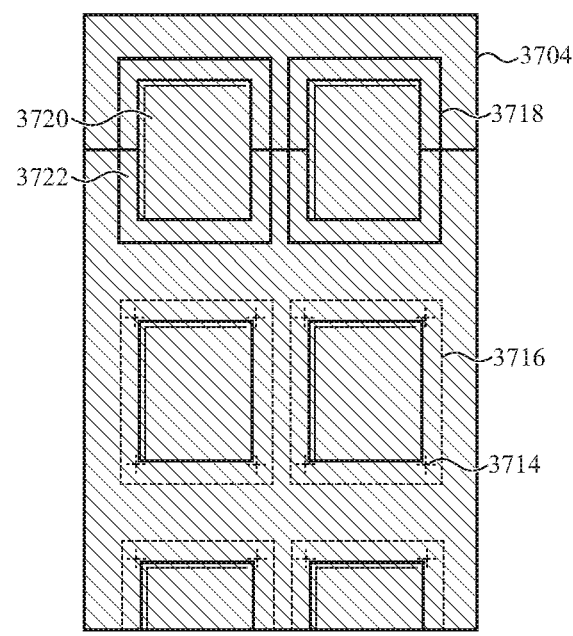

Referring now to block 3208 in FIG. 32, the conductive borders are cut (e.g., singulated) to produce individual sections of film that are each surrounded by a conductive border. FIGS. 37A-37B show the production of each individual section of film that is surrounded by a conductive border. The cutting process 3700 includes moving the film 3302 from a twelfth roller 3702 towards a thirteenth roller 3704 (movement represented by arrow 3706). In one embodiment, the twelfth roller 3702 corresponds to the first roller 3304 and the thirteenth roller 3704 corresponds to the second roller 3306. In such embodiments, the thirteenth roller 3704 includes the finished product of the method shown in FIG. 32. In other embodiments, the twelfth roller 3702 includes the finished product of block 3206.

In the illustrated embodiment, a singulation system 3708 is positioned over the film 3302 between the twelfth roller 3702 and the thirteenth roller 3704. The singulation system 3708 includes a precision die cut tool 3710 that is aligned by one or more alignment cameras 3712.

In one embodiment, the precision die cut tool 3710 uses one or more corners of the regions 3514 (FIG. 35) as a cut reference 3714 to position the die cut pattern 3716. FIG. 37B illustrates top view of the film 3302 with the cut references 3714 and die cut pattern 3716 before the die cut tool 3710 cuts the individual sections. Two singulated sections 3718 are also depicted in FIG. 37B. Each singulated section 3718 includes a section of film 3720 surrounded by a conductive border 3722. As described earlier, the section of film 3720 includes a sheet of conductive material formed over a polarizer film (e.g., the sheet of conductive material 2614 coated over the back polarizer 2610 in FIG. 26).

Referring to block 3210 in FIG. 32, each singulated section may then be attached to a display layer. In particular, each singulated section can be laminated to a back surface of a back polarizer in the display layer.

The geometry of the mask (e.g., mask 3312 in FIG. 33B) and/or the geometry of the die cut pattern (e.g., die cut pattern 3716 in FIG. 37B) can be varied to adjust the geometry of the conductive border. FIGS. 38-40 show example techniques for determining the geometry of the conductive border. In FIG. 38, the die cut pattern 3800 is a rectangular shape that is situated to center the mask 3802 in the center of the die cut pattern 3800. After the singulation process is performed, the film 3806 includes a continuous rectangular conductive border 3804 that extends along the edges of the film 3806.

As shown in FIG. 39, the die cut pattern 3900 is offset from the mask 3902 such that one edge of the mask 3902 is outside the die cut pattern 3900. After the singulation process is performed, the film 3906 includes a U-shaped conductive border 3904. In the illustrated embodiment, the top edge of the mask 3902 is located outside the die cut pattern 3900 to produce a U-shaped conductive border 3904 that extends along the two side edges and the bottom edge of the film 3906. However, other embodiments are not limited to this presentation. The shape and orientation of the conductive border 3804 determines which edge (or edges) of the mask 3902 are located outside of the die cut pattern 3900.

FIG. 40 illustrates a die cut pattern 4000 that situates three of the four edges of the mask 4002 outside of the die cut pattern 4000. After the singulation process is performed, the film 4006 includes a linear conductive border 4004 that extends along one edge of the film 4006. In the illustrated embodiment, only a portion of the bottom edge of the mask 4002 is positioned within the die cut pattern 4000 to produce a linear conductive border 4004 that extends along the bottom edge of the film 4006. However, other embodiments are not limited to this configuration. The shape and orientation of the conductive border determines which edge (or edges) of the mask 4002 are located outside of the die cut pattern 4000.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. Also, when used herein to refer to positions of components, the terms above and below, or their synonyms, do not necessarily refer to an absolute position relative to an external reference, but instead refer to the relative position of components with reference to the figures.

What is claimed is:

1. A sensor assembly for an electronic device, comprising:
    a base;
    a stack;
    a deformable element extending from the base or the stack, the deformable element, comprising:
        deformable material;
        a plurality of protrusions extending from a base portion of the deformable element; and
        a plurality of sense elements, each sense element of the plurality of sense elements extending from and at a free end of a corresponding protrusion of the plurality of protrusions; and
    a plurality of contact sensing regions positioned on the other of the base or the stack, each contact sensing region of the plurality of contact sensing regions, comprising:
        a plurality of leads positioned to receive a corresponding sense element, wherein:
    each sense element of the plurality of sense elements is partially embedded in the free end of the corresponding protrusion of the plurality of protrusions;
    a first cross-sectional length of each sense element is less than a second cross-sectional length of the plurality of leads positioned to receive the corresponding sense element; and
    the first and second cross-sectional lengths are defined with respect to a longitudinal plane corresponding to one of the base or the stack.

2. The sensor assembly of claim 1, wherein the plurality of sense elements are coated on the plurality of protrusions.

3. The sensor assembly of claim 1, wherein the plurality of sense elements comprise a conductive material.

4. The sensor assembly of claim 1, wherein the plurality of sense elements comprise a dielectric material.

5. The sensor assembly of claim 1, wherein the base portion of the deformable element and the plurality of protrusions are a unitary component.

6. The sensor assembly of claim 1, further comprising at least one additional protrusion of the plurality of protrusions that does not include any sense elements.

* * * * *